(12) United States Patent
Alagar et al.

(10) Patent No.: US 7,046,619 B2
(45) Date of Patent: May 16, 2006

(54) METHOD AND SYSTEM FOR BI-DIRECTIONAL PATH SWITCHED NETWORK

(75) Inventors: Sridhar Alagar, Sunnyvale, CA (US); Brian Pheiffer, Santa Jose, CA (US); Rohit Sharma, Sunnyvale, CA (US); Stephane St. Laurent, Santa Clara, CA (US); Holden D. Jessup, Palo Alto, CA (US); Rainer Iraschko, Sunnyvale, CA (US)

(73) Assignee: CIENA Corporation, Linthicum, MD (US)

( * ) Notice: Subject to any disclaimer, the term of this patent is extended or adjusted under 35 U.S.C. 154(b) by 854 days.

(21) Appl. No.: 10/045,955

(22) Filed: Nov. 6, 2001

(65) Prior Publication Data

US 2003/0169470 A1 Sep. 11, 2003

Related U.S. Application Data

(60) Provisional application No. 60/246,675, filed on Nov. 7, 2000.

(51) Int. Cl.
*H04L 1/00* (2006.01)
(52) U.S. Cl. ............... 370/216; 370/252; 370/352; 370/389; 714/4
(58) Field of Classification Search ............... 370/216, 370/218, 222, 242, 248, 352, 389, 289, 221; 359/110, 117, 119; 714/4
See application file for complete search history.

(56) References Cited

U.S. PATENT DOCUMENTS

| | | | | |
|---|---|---|---|---|
| 5,590,118 A | * | 12/1996 | Nederlof | 370/218 |
| 5,914,798 A | * | 6/1999 | Liu | 398/7 |
| 5,999,286 A | * | 12/1999 | Venkatesan | 398/5 |
| 6,026,077 A | * | 2/2000 | Iwata | 370/254 |
| 6,097,696 A | * | 8/2000 | Doverspike | 370/216 |
| 6,269,452 B1 | * | 7/2001 | Daruwalla et al. | 714/4 |
| 6,272,107 B1 | * | 8/2001 | Rochberger et al. | 370/216 |
| 6,292,464 B1 | * | 9/2001 | Elahmadi et al. | 370/223 |

* cited by examiner

*Primary Examiner*—Steven Nguyen
*Assistant Examiner*—Roberta Shand
(74) *Attorney, Agent, or Firm*—Dougherty Clements; Christopher L. Bernard; Tyler S. Brown

(57) ABSTRACT

A system for use in a bi-directional path switched ring network for detecting a failed optical path and establishing a protection path so as to allow signals from the failed optical path to be re-routed via the protection path is provided. According to one aspect of the system, upon detecting a failure relating to an optical path, the destination node generates a connection request message for transmission to the source node. The connection request message is passed to the source node via one or more intermediate nodes, if any. Each intermediate node examines the connection request message accordingly reserves the requisite wavelength from the protection capacity so as to allow signals from the failed optical path to be re-routed. Upon receiving the connection request message, the source node readies its switching equipment to re-route signals from the failed optical path and generates an acknowledgment message and propagates it back to the destination node via the intermediate nodes. The intermediate nodes and the destination node, upon receipt of the acknowledgement message, also ready their respective switching equipment to carry the re-routed signals via the previously reserved wavelength from the protection capacity. According to another aspect of the system, a contention resolution mechanism is provided to resolve contending connection request messages received at a node requesting the same wavelength to be reserved from the protection capacity for different failed optical paths. A message format is used for the connection request which allows the connection request message to include information relating to the type of failure experienced by a failed optical path and other priority data. Such information is then used by a node to determine priority between two contending connection request messages.

34 Claims, 48 Drawing Sheets

| Con request | Source node id | Dest node id | Wavelength | Failure type | Priority |
|---|---|---|---|---|---|

Symbol

1X2 SWITCH

1x3 SWITCH

1X3 SWITCH

1X2 SWITCH 3 dB SPLITTER

METHOD AND SYSTEM FOR BI-DIRECTIONAL PATH SWITCHED NETWORK

CROSS-REFERENCES TO RELATED APPLICATIONS

The present application claims the benefit of priority under 35 U.S.C. § 119 from the provisional patent application, U.S. patent application Ser. No. 60/246,675, filed on Nov. 7, 2000, the disclosure of which is hereby incorporated by reference as if set forth in full in this document for all purposes.

The present application is also related to U.S. Pat. No. 6,046,833 issued on Apr. 4, 2000, entitled METHOD AND APPARATUS FOR OPERATION, PROTECTION, AND RESTORATION OF HETEROGENEOUS OPTICAL COMMUNICATION NETWORKS, the disclosure of which is hereby incorporated by reference as if set forth in full in this document for all purposes.

BACKGROUND OF THE INVENTION

The present invention generally relates to optical networks. More specifically, the present invention relates to a bi-directional path switched ring (or multiple interconnected rings) that determines and switches only failed optical signals in an optical network.

One typical optical network configuration currently used for transporting and protecting traffic is a bi-directional line switched ring (BLSR) network. In a typical embodiment of a BLSR network, two fibers are used to carry traffic. More specifically, one fiber is used to carry working traffic in one direction and another fiber is used to carry protection traffic in the reverse direction.

FIG. 1 is a simplified diagram illustrating a conventional two-fiber BLSR network 100. Working traffic is carried on the optical fibers 102a–f in the clockwise direction, and protection traffic is carried on the optical fibers 104a–f in the counterclockwise direction.

Each node within the BLSR network 100 is generally responsible for detecting transmission problems on an optical fiber. An optical fiber pair, for example, optical fibers 102a and 104a, is more commonly called a link or line. Since a link typically connects two adjacent nodes, the two nodes respectively located at both ends of the link usually detect a transmission problem relating to a link. Once a transmission problem is detected, the two nodes then take appropriate actions to re-route or switch all the traffic intended for transmission on the problematic link via alternate link(s). FIG. 2 illustrates the switching of failed paths in the case of a link failure in the BLSR network 100.

Referring to FIG. 2, for example, if a problem is detected with the link (optical fibers 102b and 104b) connecting nodes 2 and 3, nodes 2 and 3 then re-route all the working traffic via the protection path formed by the optical fibers 104a,f,e,d,c. Hence, all the working traffic originally intended for transmission via the optical fiber 102b is now re-routed to node 3 via nodes 1, 6, 5, 4 and 3 using optical fiber 104a,f,e,d,c.

The foregoing re-routing scheme used by the BLSR network 100 may use spare or protection capacity on the optical network inefficiently. This inefficiency may be attributed to the requirement that all the working traffic (or optical signals or paths) on a problematic link be re-routed even though only some of the optical signals being carried on the link are affected. Thus, partial failure of a link (where only some of the wavelengths fail due to, for example, selective failure of non-redundant band wavelength division multiplexing (WDM) modules) may cause traffic on the entire link to be re-routed or switched. This may result in switching optical signals that have not failed. Hence, spare or protection capacity on the network is inefficiently used or wasted.

The inefficient use of spare capacitor can also be attributed to how the BLSR network detects and corrects transmission problems. Since the re-routing or switching of optical signals is initiated and coordinated by the two nodes respectively situated at both ends of the problematic link, optical signals may unnecessarily be re-routed to these two nodes before they reach their intended destination nodes. This inefficiency is commonly referred to as the backhaul problem.

Referring to FIG. 2, for example, assume that optical signals originating from node 2 are to be transmitted to node 4 via node 3 and that a problem occurs with the optical fiber 102b. As a result, optical signals from node 2 are first re-routed through nodes 1, 6, 5 and 4 and then delivered to node 3 via the protection capacity. Node 3 then forwards the optical signals to the destination node, which is node 4, via the link 102c as it had done before optical signals were diverted from the link 102b. As can be seen, optical signals from node 2 are first routed through node 4, which is the destination node 3 unnecessarily and then from node 3 back to node 4 again. Hence, optical signals are redundantly routed through a destination node and back, thereby wasting wavelength capacity on the network. Similarly, the same inefficiency can arise in connection with node 2. For example, a source node, such as node 1, which transmits optical signals via node 2 to node 3 many, due to re-routing caused by a problem on the link 102b, subsequently receives its previously transmitted optical signals.

BLSR networks also require special hardware that optically switches the signals at every node in the ring. This hardware must switch all traffic at the nodes located adjacent to the link failure to route the working traffic via the protection capacity. In addition, all other nodes must pass this protection traffic through. Moreover, switching all optical signals associated with an affected link also makes it very difficult to plan and estimate an optical budget for the optical network.

The above inefficiency problem may be solved by using a bi-directional path switched ring (BPSR) network. In a BPSR network, only failed optical signals or paths within a link are re-routed or switched. Furthermore, the failure is detected and handled by the source and destination nodes relating to the failed optical signal or path thereby reducing the above backhaul problem. FIG. 3 illustrates the switching of optical signals in the case of a link failure in a BPSR network. Referring to FIG. 3, a problem arises in the link between nodes 2 and 3. In contrast to the situation shown in FIG. 2, for working traffic to be delivered from node 1 to node 4 (which, under normal conditions, would have been routed via nodes 2 and 3), such working traffic is re-routed directly to node 4 via nodes 6 and 5 using the protection capacity without going through node 2 first.

It would be desirable to provide a system and method which is capable of determining failed optical signals within a link and switching such signals more efficiently and reliably in a BPSR network and providing a switching architecture that reduces network complexity and cost.

SUMMARY OF THE INVENTION

The present invention relates to a method and system for use in a bi-directional path switched ring (BPSR) network for detecting a failed optical path and establishing a protection path so as to allow signals from the failed optical path to be re-routed via the protection path.

For clarification purposes, the following terms are defined as follows:

(1) Optical Bi-directional Path Switched Ring (O-BPSR) or simply (BPSR) will be used inrterchangeably with Channel Optical Shared Protection Ring (Ch-OSPR);

(2) Optical Bi-directional Line Switched Ring (O-BLSR) or simply (BLSR) will be used interchangeably with Multiplex Segment Optical Shared Protection Ring (MS-OSPR);

(3) Optical Uni-directional Path Switched Ring (O-UPSR) or simply (UPSR) will be used interchangeably with Channel Optical Dedicated Protection Ring (Ch-ODPR);

(4) "node" and "network element" will be used interchangeably;

(5) "transceiver," "transponder," "wavelength converter interface (WCI)," and "XPDR" will be used interchangeably;

(6) "Trib" stands for tributary;

(7) "Prot" stands for protection;

(8) "PCA" stands for protection channel access; and (9) "WCA" stands for working channel access.

According to one aspect of the present invention, a signaling protocol for detecting a failed optical path in a BPSR network and establishing a protection path so as to allow signals from the failed optical path to be re-routed via the protection path is provided. An exemplary embodiment of the signaling protocol is described as follows. Upon detecting a failure relating to an optical path, the destination node generates a connection request message for transmission to the source node. The connection request message is passed to the source node via one or more intermediate nodes, if any. Each intermediate node examines the connection request message and accordingly reserves or allocates the requisite wavelength or bandwidth from the protection capacity so as to allow signals from the failed optical path to be re-routed. Upon receiving the connection request message, the source node readies its switching equipment to re-route signals from the failed optical path and generates an acknowledgment message and propagates it back to the destination node via the intermediate nodes. The intermediate nodes and the destination node, upon receipt of the acknowledgment message, also ready their respective switching equipment to carry the re-routed signals via the previously reserved wavelength from the protection capacity.

According to the exemplary embodiment of the signaling protocol, a contention resolution mechanism is further provided to resolve contending connection request messages received at a node requesting the same wavelength to be reserved front the protection capacity for different failed optical paths. An exemplary message format is used for a connection request message which allows the connection request message to include information relating to the type of failure experienced by a failed optical path and other priority data. Such information is then used by a node to determine priority between two contending connection request messages.

According to another aspect of the present invention, switching equipment is provided at each node of the BPSR network to route the traffic on either the bandwidth allocated under normal conditions or the bandwidth allocated during a protection switch. At a high level, the switching equipment stands between the tributary client connection and the line access to the optical add/drop multiplexer (OADM). The switching equipment is able to operate under at least four (4) modes, namely, normal mode, ring-switch west mode, ring-switch east mode and bridge mode. Two additional modes, east and west span switch modes, are also available. The operation of each of these modes will be described further below.

The switching equipment used to route the wavelengths in their required direction to provide protection switching in a BPSR network can be implemented using two approaches. One approach is the electrical approach which converts an optical signal into an electrical signal in the electrical domain and then uses the electrical domain to provide the protection switching function to implement the BPSR protection mechanism. The other approach is the optical approach which uses optical switches to provide the protection switching function to implement the BPSR protection mechanism. The switching operations, the protection protocols and the physical implementations of both the electrical and the optical approaches will be described further below.

Under the electrical approach (i.e., when protection switching is implemented electrically by the switching equipment), two wavelengths are used to provide protection switching in a BPSR network. One wavelength is used as a protected channel (working) and the other is used as a protecting channel (protection). As shown in FIG. 15, wavelength $\lambda 1$ is used as a working wavelength around the ring 1500 and wavelength $\lambda 2$ is used as a protection wavelength. Hence, a span in the ring 1500 uses the same wavelength to communicate in both the clockwise (CW) and the counter-clockwise (CCW) direction.

FIG. 16 is en exemplary embodiment of a node or network element 1510a–d in the ring 1500. Each network element 1510a–d provides two optical interfaces to the ring 1500. More specifically, the west side of the network element 1510 receives optical signals from the CCW optical fiber 1602w and transmits optical signals over the CW optical fiber 1604w; the east side of the network 1510 receives optical signals from the CW optical fiber 1604e and transmits optical signals over the CCW optical fiber 1602e. An optical interface is referred to as a line interface or an optical network interface (ONI). For a line interface, there is a west line and an east line.

As shown in FIG. 16, each network element 1510a–d also provides an access interface which is referred to as a tributary interface or an optical user interface (OUI). For a tributary interface, there are two or more west tributaries 1606w and two or more east tributaries 1606e. The west tributaries 1606w are used to communicate with a neighboring network element on the west side and the east tributaries 1606e are used to communicate with a neighboring network element on the east side.

Typically, the tributaries 1606w,e access the network element 1510 using 1310 nm interfaces. The network element 1510 transforms the tributary signal from a wavelength at 1310 nm into a wavelength on the ITU grid in the transmission band provided by the system. The number of tributaries depends on the number of wavelengths supported by the system and by the number of add/drop wavelengths at the network element 1510.

Using an electrical/electronic switch to route the wavelengths at a network element provides flexibility in choosing the wavelengths for working and protection channels. FIG. 17 illustrates an exemplary embodiment of a network element implemented with an electrical switch. As shown in FIG. 17, four transceivers are used per network element.

Using an electrical switch, the wavelengths used for working and protection traffic are not important. A working wavelength used to transmit optical signals between two network elements NE1 and NE2 may be used for a different purpose between another two network elements NE2 and NE3 if the working traffic is terminated at any of these nodes. If the working traffic is not terminated at NE2, the wavelength between NE1, NE2 and NE3 must be the same for this working traffic since it will optically pass through NE2 even with an electrical implementation of the BPSR switch. This is because the electrical switch performs an optical to electrical to optical (OEO) conversion at each network element that traffic is switched. This conversion allows different wavelengths to be selected on each side of the switch.

Under the optical approach (i.e., when using an optical switch to route the wavelengths at a network element), specific wavelengths are to be paired and the maximum number of transceivers are reduced to at most two per network element if there is no lower priority channel access. Optionally, if the lower priority protection channel access is to be made available, two additional transceivers may be added for this purpose. The pairing of wavelengths allows the working traffic in one direction (eastbound) direction to be used as the protection bandwidth in the opposite (westbound) direction. Referring back to FIG. 15, if wavelength λ1 in the clockwise direction is reserved for working traffic, then in the counter-clockwise direction, wavelength λ1 is reserved for the protection traffic. This allows an optical switch to simply change the direction of wavelength λ1 from clockwise to counterclockwise and change its meaning and function at the same time. Since the protection bandwidth is always reserved for working traffic during a network failure, any assigned working traffic in one direction are to be assigned and reserved for protection traffic in the opposite direction. This is referred to as conjugate pairing.

An all-optical switch may also be used at several different levels of granularity instead of only at the individual channel level. This provides for some economy of scale to reduce switching equipment when switching a larger amount of bandwidth on the same optical fiber. For this reason, the optical switch may sit between levels of the OADM. FIG. 18 illustrates an exemplary embodiment of a network element implemented with an optical switch. As shown in FIG. 18, an optional OADM for the channel access sits above the optical switch and an optional band access OADM which is an aggregation of channels sits below the optical switch. Switching at the band level reduces the number of switches and all of the channels in a band are terminated at the same network element.

The switching equipment regardless of how it is implemented (i.e., either under the electrical or the optical approach) may also be implemented in one of two configurations, namely, centralized and distributed. A centralized switch within a network element localizes the routing functions and reduces the signaling communications to dedicated equipment. FIG. 19 illustrates an exemplary embodiment of a centralized switch in accordance with the present invention.

A distributed switch uses each transceiver to participate in the routing functions. There is no separate switch element other than each transceiver. Using the distributed switch increases the signaling communication requirements and the mean time between failures. FIG. 20 illustrates an exemplary embodiment of a distributed switch in accordance with the present invention.

According to another aspect of the present invention, while the BPSR switch is most often used and described for a ring configuration, the BPSR switch and the location at the terminal points of the service can be generalized to any collection of communications paths whether they are in a ring, multiple interconnected rings, or a mesh, as long as there is an identifiable shared protection path for the corresponding working wavelength. Therefore, whether implemented optically or electrically, a network element which is connected to more than two neighboring nodes, as in a mesh or multiple interconnected rings, may send the traffic along a protection path, which is part of a virtual ring, which is defined for each working wavelength.

According to another aspect of the present invention, the communication channel which sends and receives the switching messages can be implemented using in-band or out-of-band signaling. Out-of-band signaling is used when using an all-optical switch architecture or configuration, since the actual signal may not be terminated at every network element and there may not be a guarantee of lower level performance monitoring capabilities to make the switch decision. In contrast, with an electrical switch architecture or configuration, each signal is terminated at each participating network element. Hence, the signaling protocol nay be imbedded in the optical signals. The imbedded optical signals may be implemented using either the standard SONET/SDH bytes reserved for APS switch (K1, K2) or some overhead layer (such as DCC or FEC overhead) in the case of non-SONET traffic.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. In the drawings, like reference numbers indicate identical or functionally similar elements.

DETAILED DESCRIPTION OF THE INVENTION

The present invention in the form of various exemplary embodiments will now be described. According to one aspect of the present invention a signaling protocol is provided to detect and re-route working traffic in a BPSR network. According to another aspect of the present invention, a number of exemplary implementations and configurations for the switching equipment to be used in the BPSR network in connection with the signaling protocol are also provided. More specifically, exemplary electrical and optical implementations of the switching equipment are illustrated; moreover, exemplary centralized and distributed configurations for the switching equipment are also shown. Finally, according to yet another aspect of the present invention, a communication channel is provided to support the signaling protocol.

Signaling Protocol

Figure 1:
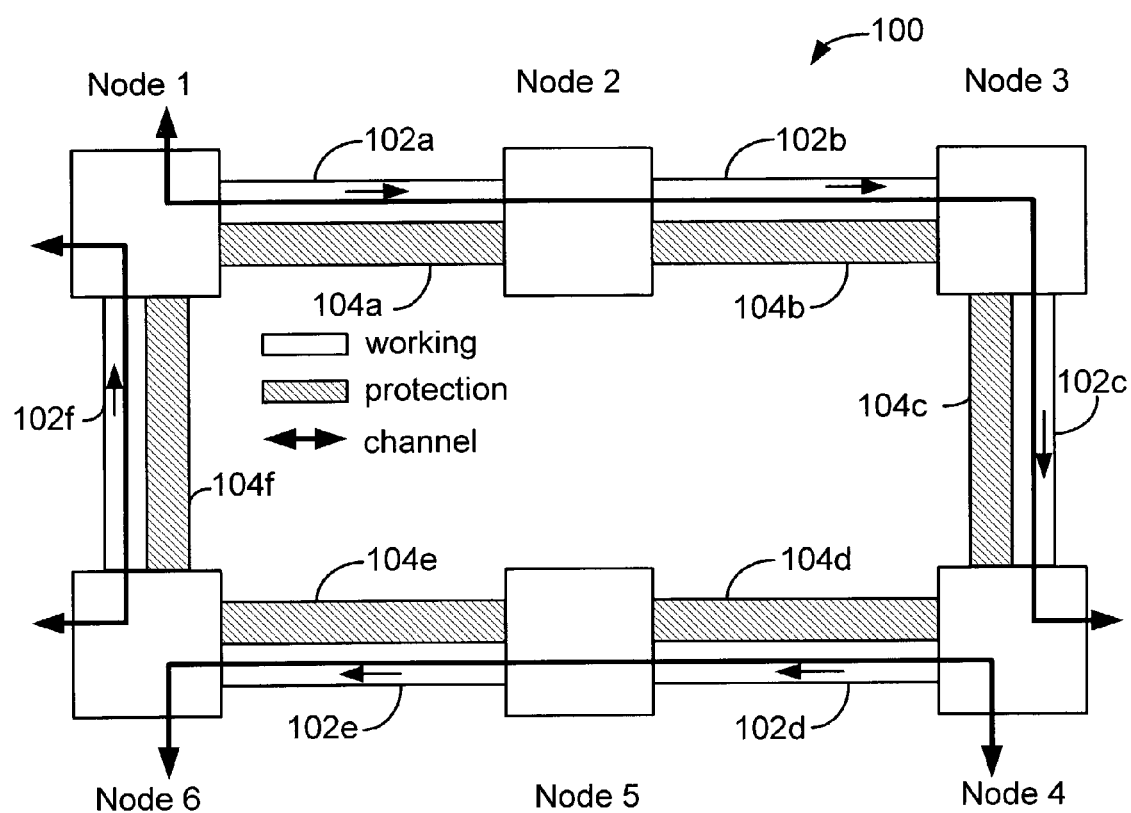
FIG. 1 is a simplified diagram illustrating a conventional two-fiber BLSR network.
Figure 2:
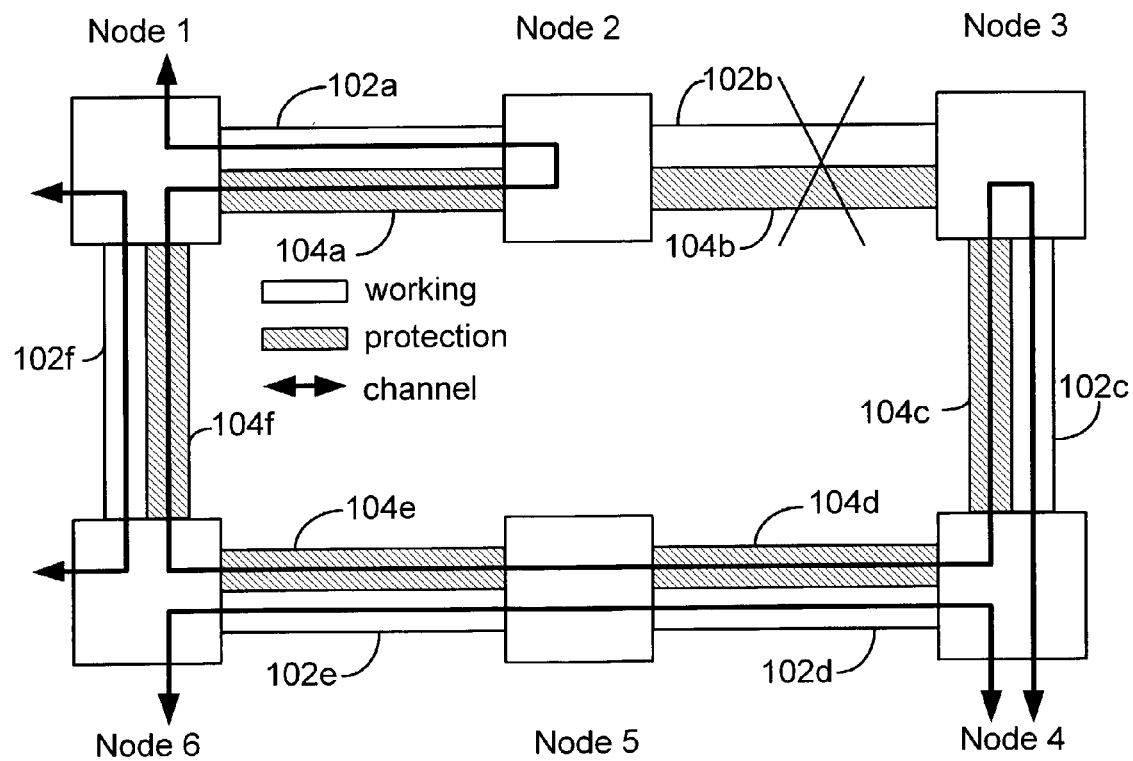
FIG. 2 is a simplified diagram illustrating a situation in which optical signals are switched due to a link failure in a conventional two-fiber BLSR network.
Figure 3:
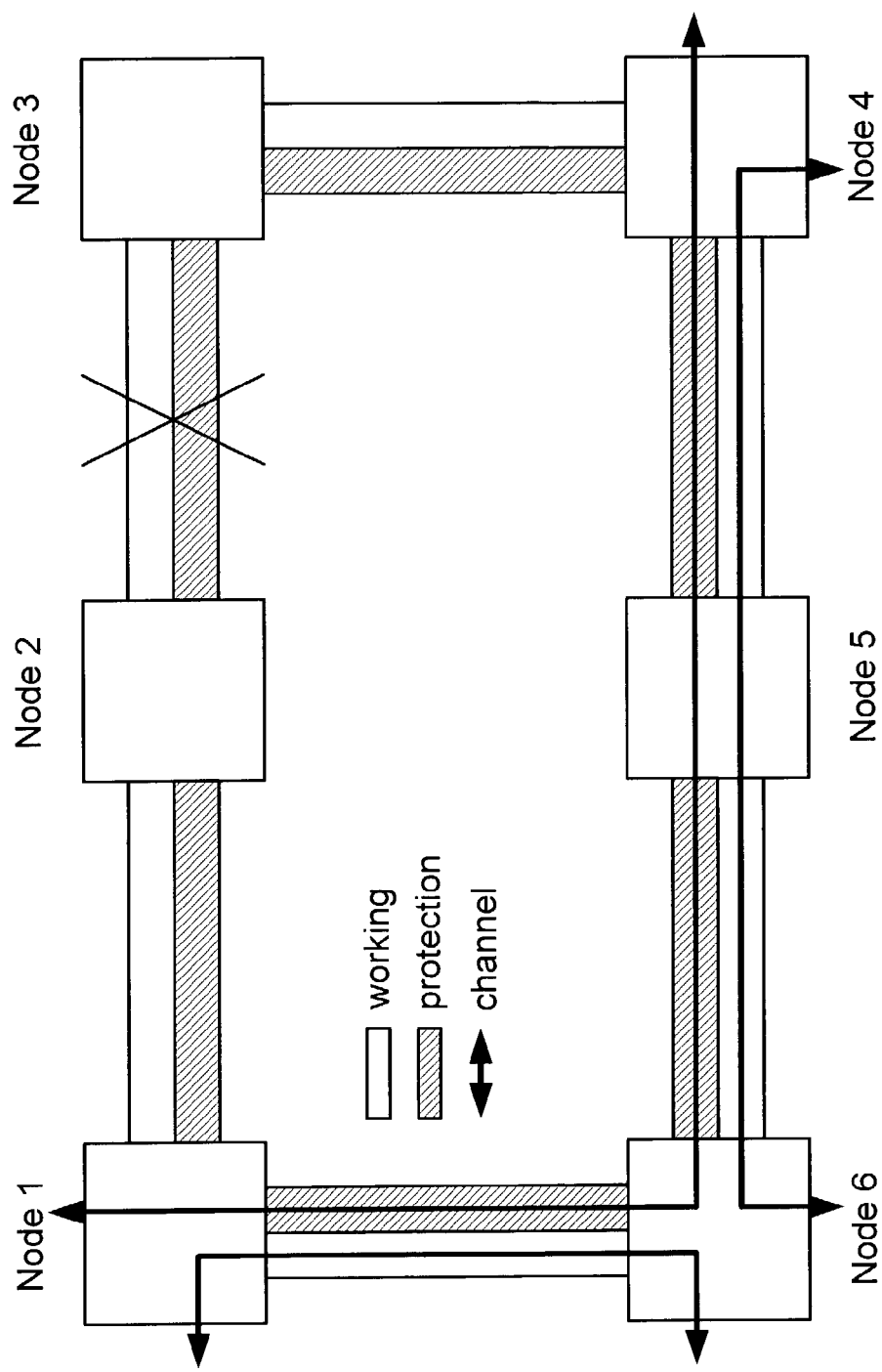
FIG. 3 is a simplified diagram illustrating one situation in which optical signals are switched due to a link failure in a conventional two-fiber BPSR network.
Figure 4:
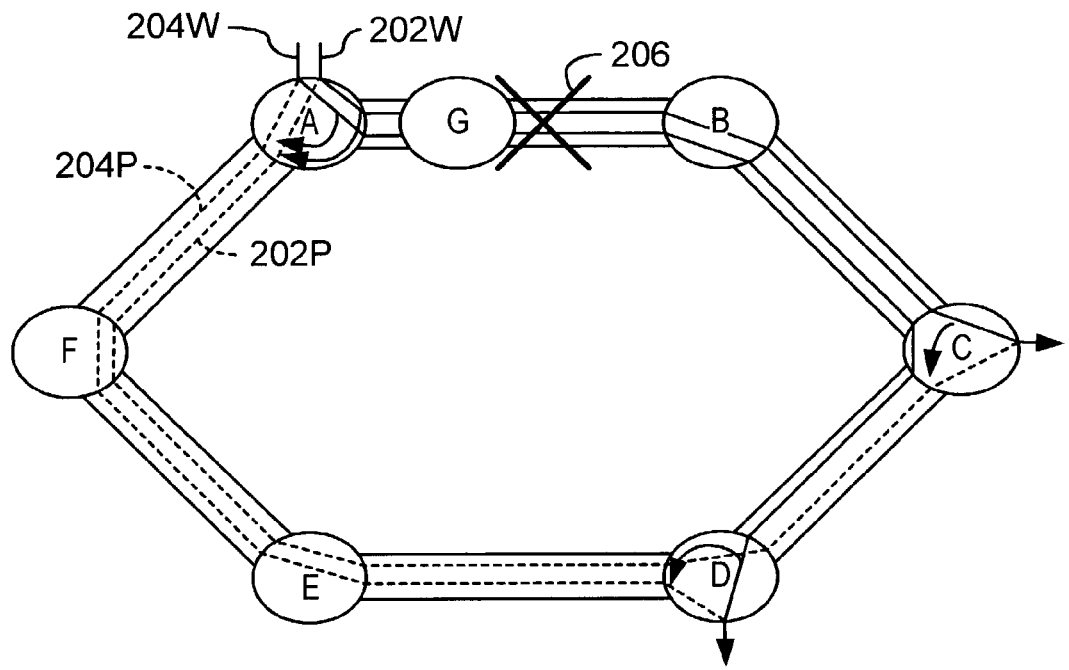
FIG. 4 is a simplified diagram illustrating another situation in which optical signals are switched due to a link failure in a BPSR network.

An exemplary embodiment of the signaling protocol will now be described. FIG. 4 illustrates switching of failed optical paths in the case of a link failure in a EPSR network. Referring to FIG. 4, signals traveling on two optical paths 202w and 204w are originated from node A and are bound for destination nodes C and D respectively. The signals traveling on the two optical paths 202w and 204w are considered to be working traffic, i.e., these signals are transmitted using the working capacity. Nodes G and B are traversed by these signals as intermediate nodes. Subsequently, a failure occurs at point 206 on the link connecting nodes G and B thereby preventing node B from receiving the signals non optical paths 202w and 204w. As a result, nodes A, C aid D engage their respective switching equipment and re-route the signals from the failed optical paths 202w and 204w onto optical paths 202p and 204p so as to allow nodes C and D to receive the signals. The optical paths 202p and 204p are carried as protection traffic via the protection capacity of the network. The concept of working and protection traffic should be well understood by a person of ordinary skill in the art of fiber optics communications.

Figure 5:
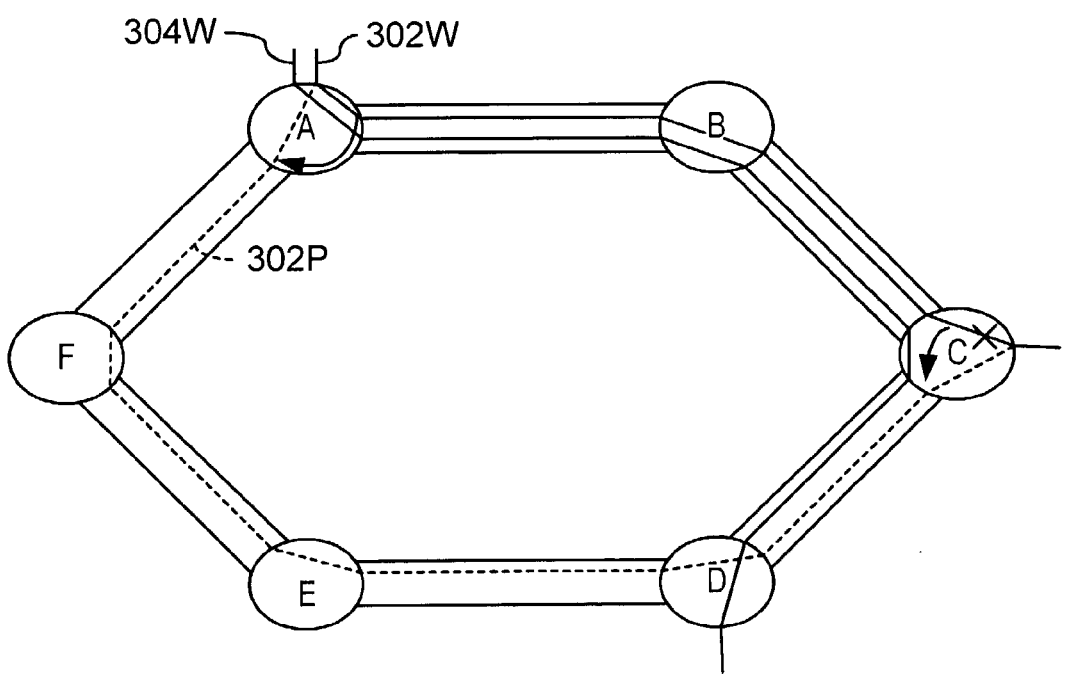
FIG. 5 is a simplified diagram illustrating a situation in which optical signals are switched due to equipment failure in a BPSR network.

FIG. 5 illustrates switching of a failed optical path in the case of equipment failure in a BPSR network according to one exemplary embodiment of the present invention. Referring to FIG. 5, signals traveling on two optical paths 302w and 304w are originated from node A and are bound for destination nodes C and D respectively. The signals traveling on the two optical paths 302w and 304w ale considered to be working traffic. Node B is transversed by these signals as an intermediate node. Subsequently, equipment at node C malfunctions (due to, for example, broken transponders or filter cards) and ceases to properly receive signals on the optical path 302w. Consequently, nodes A and C engage their respective switching mechanism and re-route signals from the failed optical path 302w onto the optical path 302p so as to allow node C to receive the signals. Similarly, the optical path 302p is carried via the protection capacity of the network. In contrast to FIG. 4, the optical path 304w remains intact and operational, hence, signals on the optical path 304w are not re-routed since there was no malfunction on that path.

As illustrated by FIGS. 4 and 5, the source and destination nodes are responsible for detecting the failed optical paths and accordingly establishing the protection paths which are needed for re-routing the signals from the failed optical paths. The signaling protocol used by the source and destination nodes to detect and establish protection paths for re-routing signals from failed optical paths will further be described below.

Figure 6A:
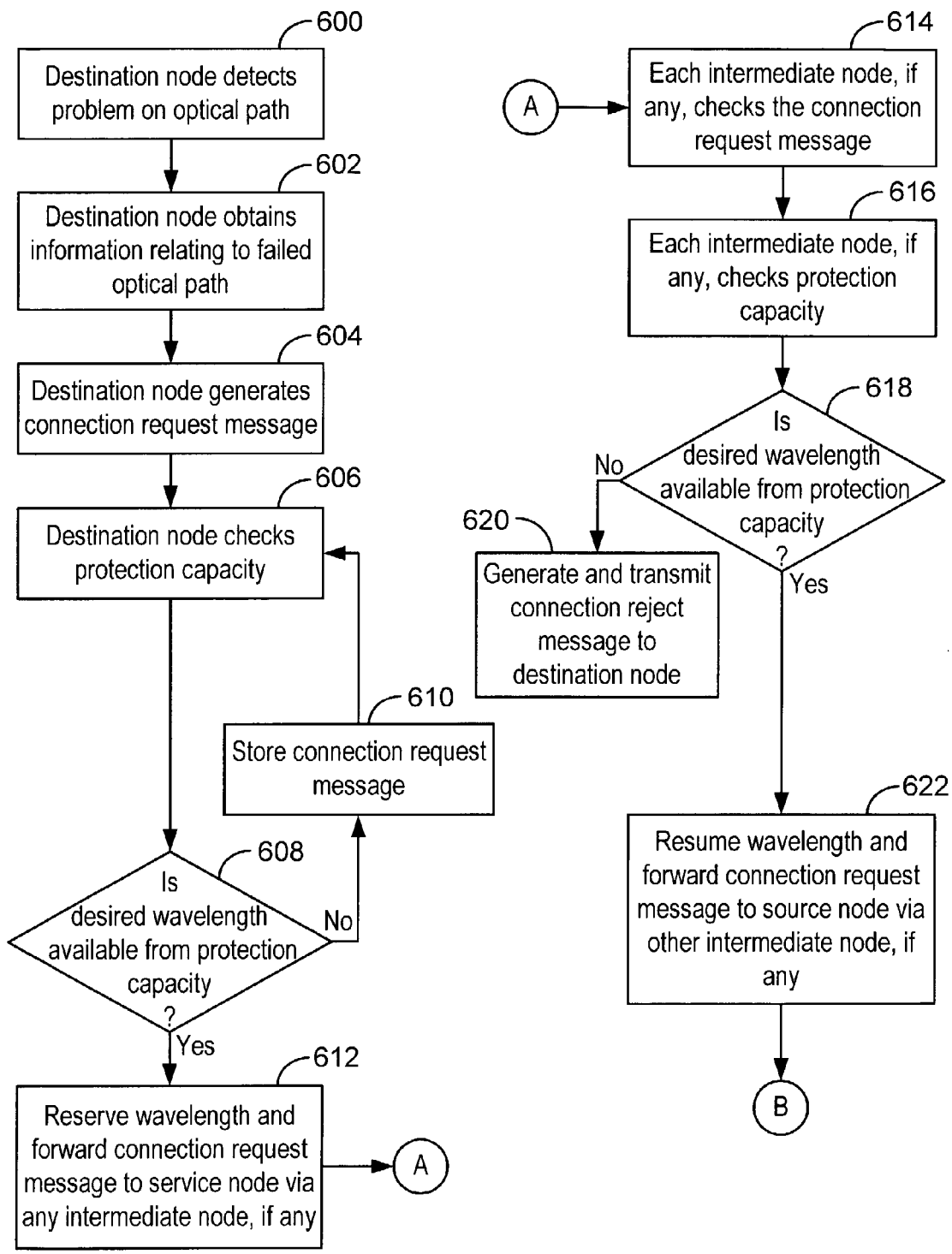
FIGS. 6A and B are a flow diagram illustrating an exemplary sequence of actions which take place according to the exemplary signaling protocol to ensure proper re-routing of signals from a failed optical path between a source node and a destination node.
Figure 6B:
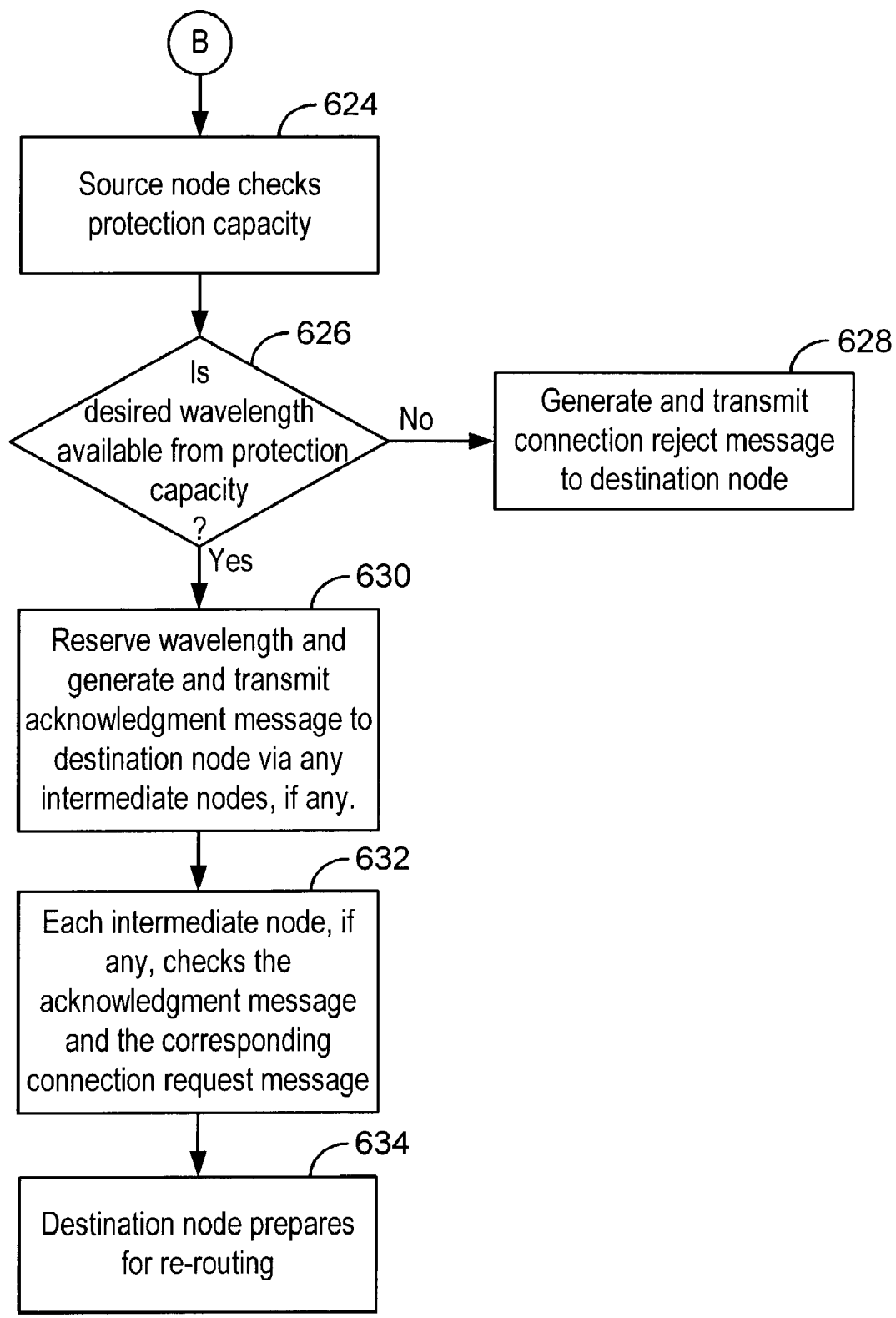

According to one exemplary embodiment of the signaling protocol, a number of messages are exchanged between the source and destination nodes via one or more intermediate nodes. As will be further explained below, the use of these messages by the source, destination and intermediate nodes establishes a protection path and ensures that signals which were to be carried on the failed optical paths are properly re-routed via the protection path. FIG. 6 illustrates an exemplary sequence of actions which take place according to the exemplary signaling protocol to ensure proper re-routing of signals from a failed optical path between a source node and a destination node.

Referring to FIG. 6, at 600, the destination node detects a problem or failure with respect to an optical path coming into the destination node. The detection is performed at the path level, i.e., each optical path (or its corresponding wavelength(s)) coming into the destination node is monitored. A failure with respect to an optical path is generally characterized as loss of signal (LOS) or the inability of the destination node to receive signals from that optical path. The LOS may be attributed to a number of factors. For example, there may be problems relating to the optical fiber which carries the failed optical path, such as, a defect or break in the optical fiber; or, there may be problems with the equipment associated with any intermediate nodes or the destination node which prevent the destination node from receiving signals transmitted along a particular optical path or wavelength.

For ease of reference, a node is arbitrarily defined as having two sides, namely, the downstream side and the upstream side or the east side and the west side, respectively. Signals coming from a downstream node is receive, via the downstream or east side and signals coming from an upstream node are received via the upstream or west side.

Referring to FIG. 4, for example, with respect to node B, node G is its upstream node and node C is its downstream node.

In any event, upon detecting the failure, at 602, the destination node obtains information relating to the source and destination nodes of the signals traveling on the failed optical path, the identity of the failed optical path or its corresponding wavelength, the type of failure and the severity or priority of the failure. Upon obtaining such information, at 604, the destination node then generates a connection request message which is to be transmitted to the source node.

At 606, before the connection request message is transmitted to the source node, however, the destination node checks the availability of the protection capacity which is needed to carry the re-routed signals so as to allow such signals to be received via the other side of the destination node, i.e., the side opposite to the one which is supposed to receive signals from the failed optical path. More specifically, at 608, the protection capacity is checked to determine whether the wavelength or bandwidth needed to carry re-routed signals from the failed optical path is available for use on the protection path. If the desired wavelength is not available from the protection capacity, then, at 610, the connection request message is stored or queued up by the destination node for later servicing should the desired wavelength become available. The connection request message queue is periodically checked to ensure that all the pending connection request messages are still valid or otherwise continue to require service.

A desired wavelength may not be available from the protection capacity for a number of reasons. For example, such wavelength may have been reserved for use by another connection request message. This other connection request message may have come from the destination node or any other node. As will be discussed further below, a node may become part of a protection path to be utilized for re-routing signals from a failed optical path. Hence, in determining whether a desired wavelength from the protection capacity is available for use in connection with the connection request message, the connection request message is compared with this other connection request message to determine which of the two messages should have priority in using the desired wavelength.

If it is determined that the wavelength desired by the connection request message is available (i.e., the connection request message has priority in using the desired wavelength), at 612, the destination node forwards the connection request message to the source node. One function of the connection request message is to inform the source node that the destination node is having problems receiving signals transmitted along the failed optical path. This connection request message is transmitted to the source node via a number of intermediate nodes, if any. The connection request message may be transmitted from the destination node to the source node via either in-band or out-of-band signaling. An out-of-band signaling example is an optical supervisor channel (OSC) which provides a separate communication channel (apart from the channels which are used to transmit the optical signals) for nodes on a network.

In addition to passing the connection request message to the source node, at 614, each intermediate node also examines the connection request message and takes appropriate actions. More specifically, upon examining the connection request message, the intermediate node is able to ascertain that a failed optical path has been detected by the destination node and that a desired wavelength from the protection capacity is needed. At 616, the intermediate node then also checks to determine if the desired wavelength from the protection capacity is available for use in connection with the connection request message. Again, the desired wavelength may not be available because it is being used in connection with another connection request message. At 618, to determine the availability, the intermediate node compares the connection request message with this other connection request message to see which of the other messages has a higher priority. If it is determined that the other connection request message takes precedence over the connection request message, then, at 620, the intermediate node generates a connection reject message and transmits it back to the destination node. The connection reject message is propagated back to the destination node via other intermediate nodes, if any. On the other hand, if it is determined that the connection request message has a higher priority over the other connection request message, then, at 622, the desired wavelength is made available or otherwise reserved by the intermediate node for use in connection with the connection request message to re-route signals from the failed optical path and the connection request is forwarded to the next intermediate node or the source node.

It should be noted that after the desired wavelength has been reserved in connection with the connection request message, the intermediate node has the ability to invalidate the connection request message and release the desired wavelength at any subsequent point in time. This may be caused by the subsequent arrival of a connection request message which has a higher priority. Once the intermediate node invalidates the current connection request message, a connection reject message is generated and transmitted to the destination node via other intermediate nodes, if any.

Returning to the situation where the connection request message is forwarded source node also checks to determine if the desired wavelength protection capacity is available for use in connection with the connection request message. Again, the desired wavelength may not be available because it is being used in connection with another connection request message. At 626, to determine the availability, the source node compares the connection request message with this other connection request message to see which of the two messages has a higher priority. If it is determined that the other connection request message takes precedence over the connection request message, then, at 628, the source node generates a connection reject message and transmits it back to the destination node. The connection reject message is propagated back to the destination node via other intermediate nodes, if any.

On the other hand, if it is determined that the connection request message has a higher priority over the other connection request message, then, at 630, the desired wavelength is made available or otherwise reserved by the source node for use in connection with the connection request message to re-route signals from the failed optical path. The source node also readies its switching equipment to re-route or switch the signals from the failed optical path for transmission via the protection capacity. Moreover, the source node generates and forwards an acknowledgment message to the destination node informing the destination node that the signals from the failed optical path are ready to be re-routed. The acknowledgment request message is sent to the destination node via the intermediate nodes, if any.

Similarly, in addition to passing the acknowledgment request message or the connection reject message to the destination node, at 632, each intermediate node also examines the acknowledgment message or connection reject message and takes appropriate actions. For example, if a connection reject message is received, the intermediate node invalidates the corresponding connection request message and releases the reserved wavelength in the protection capacity for use for other purposes.

If the acknowledgment message is received, the intermediate node still needs to check the connection request message which corresponds to the acknowledgment message to ensure that the connection request message is still valid. The connection request message becomes invalid if it is pre-empted, for example, by another connection request message with a higher priority, or it is invalidated or canceled by the destination node. If the connection request message has become invalid, the intermediate node releases the reserved protection capacity which may now be used for otherpurposes. If the connection request message is confirmed to be still valid, the intermediate node further examines the acknowledgment message and then is able to ascertain that the source node is now ready to re-route and transmit the signals from the failed optical path through the protection capacity which has been previously reserved upon receipt of the connection request message. Consequently, the intermediate node readies its switching equipment for transmitting the re-routed signals via the protection capacity.

At 634, the destination node, upon receipt of the acknowledgment message, also readies its switching equipment for receiving the re-routed signals. That is, the destination node prepares its switching equipment to receive the re-routed signals via the protection capacity from the side of the destination node opposite the side which was supposed to receive signals from the failed optical path before such signals were re-routed.

After sending the acknowledgment message, the source node begins to re-route the signals which were originally to be transmitted along the failed optical path via the reserved protection capacity established along the intermediate and destination nodes.

Preferably, the destination node validates the previously issued connection request message on a regular basis by periodically or intermittently re-sending the connection request message even after the protection path has been established. By doing so, the desired wavelength from the protection capacity will continually be reserved by the intermediate nodes thereby allowing the re-routed signals to be successfully transmitted via the protection path to the destination node.

Figures 7, 8:
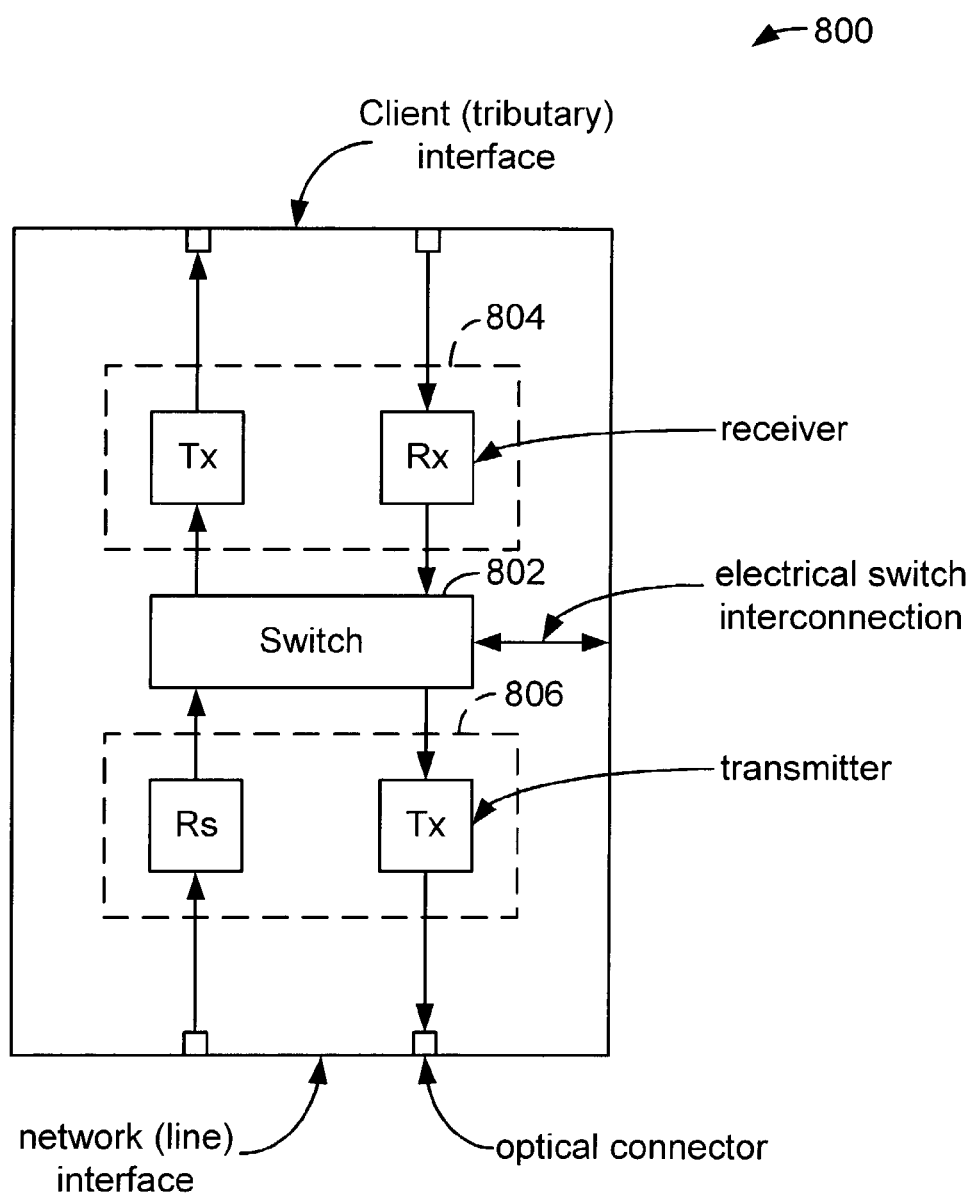
FIG. 7 is a diagram illustrating an exemplary message format which is used for both a connection request message and an acknowledgment message.
FIG. 8 is a simplified diagram showing the general components of a portion of the switching equipment.

As described above, the destination node and the source node exchange a connection request message and an acknowledgment message in order to establish a protection path for re-routing the signals from the failed optical path. FIG. 7 illustrates an exemplary message format which can be used for both the connection request message and the acknowledgment message. This exemplary message format includes six fields, namely, message type, source node ID, destination node ID, wavelength ID, failure type and priority.

The message type field contains information which denotes the message type. The message type can be a connection request message or an acknowledgment message. The source node ID field contains information identifying the source node which originates the signals that are to be re-routed from the failed optical path. The destination node ID field contains information identifying the destination node which is to receive the re-routed signals. The wavelength ID field includes information relating to the failed optical path. More specifically, the wavelength ID field provides information on the wavelength which corresponds to the failed optical path. This information is provided so that the failed optical path can be identified and the requisite wavelength can be reserved from the protection capacity so as to allow the protection path to be established to re-route the signals. The failure type field is used to provide information relating to the type of failure associated with the failed optical path. For example, types of failure may include signal failure, signal degradation, forced switch and manual switch. The priority field provides priority information relating to the connection request message. The failure type and priority fields together provide the necessary information which can be used to determine priority when contention between two connection request messages arises as described above. For example, priority can be determined based on the type of failure experienced by the failed optical path.

In an exemplary embodiment, the exchange of the messages between the source node and the destination node can be optimized to reduce communication traffic on the network. In one example, instead of sending a connection request message separately, a destination node may aggregate all the connection request messages into one single message and then forward the single message to the intermediate nodes, if any, for delivery to the source node. Similarly, the same scheme can be applied to consolidate the number of acknowledgment messages.

In another example, for the case of a bi-directional path, a source node may piggyback a acknowledgment message of a protection path with a connection request message of the corresponding protection path in the opposite direction.

The present invention as described at above can be implemented in a number of ways. In an exemplary embodiment, the various operations and functions as described above are performed by control logic associated with each node. Preferably, the control logic is implemented using software. Software implementation may be done using various computer programming languages and designed in a modular or integrated manner or a combination of both. However, it should be understood that the control logic may also be implemented using hardware or a combination of hardware and software. Based on disclosure provided herein, a person of ordinary skill in the art should know of other ways and/or methods to implement the control logic and the present invention.

It should be understood that while the above description is provided with respect to a failed optical path, the present invention can be applied to establish a protection path in a BPSR network under other circumstances. For example, if maintenance work is required to be done on (1) a link which may affect transmission of signals between a source node and a destination node or (2) equipment at the destination node which may temporarily suspend reception of signals from an optical path or wavelength, the present invention as described above can be used to establish a protection path to ensure proper re-routing of signals. Based on the description and disclosure provided herein, it should be apparent to those persons with ordinary skill in the art how the present invention can be applied in other ways and/or methods to other situations.

Switching Equipment Implementations

Switching Equipment Functionality

According to one aspect of the present invention, switching equipment is provided at each node of the BPSR network where traffic is accessed to route the traffic either on the bandwidth allocated under normal conditions or the bandwidth allocated during a protection switch. At a high level, the switching equipment stands between the tributary client connection and the line access to the Optical Add/Drop Multiplexer (OADM).

FIG. 8 shows the general components of a portion of the switching equipment 800 which handles either the working or protection traffic. Portion of the switching equipment 800 generally includes a switch 802, a first transceiver 804 (including a first pair of transmitter and receiver) coupled between a client (tributary) interface and the switch 802 and a second transceiver 806 (including a second pair of transmitter and receiver) coupled between a network (line) interface and the switch 802.

Figure 9:
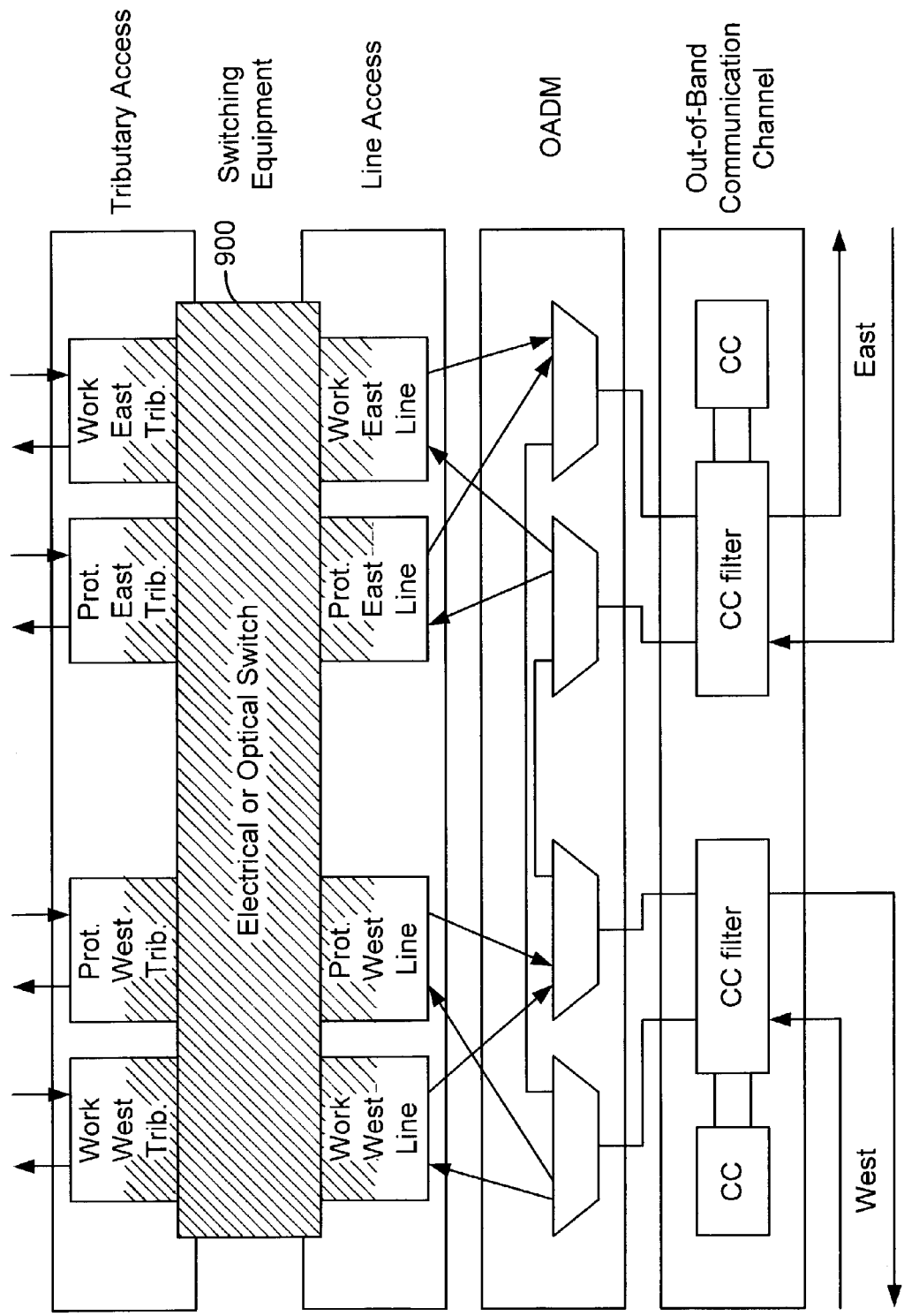
FIG. 9 is a simplified schematic diagram showing the switching equipment as an element in a network architecture.

FIG. 9 shows the switching equipment 900 as an element within a network architecture. Referring to FIG. 9, it should be noted that the locations of the transceivers (i.e., the combination of transmitters and receivers) are not specified because the transceivers are integrated within the switch itself. However, it should be understood that the transceivers may be on either edge of the switch (tributary or line) or integrated within the switch itself. A person of ordinary skill in the art will know how to implement the transceivers at various locations within a network.

The switching equipment 900 has at least four modes to support a BPSR network, namely, (i) normal mode, (ii) ring-switch west mode, (iii) ring-switch east mode, and (iv) bridge mode. In addition, two other modes are also available, namely, the (v) east and (vi) west span switch modes. Each of these modes will be described in further details below.

Normal Mode

Figure 10:
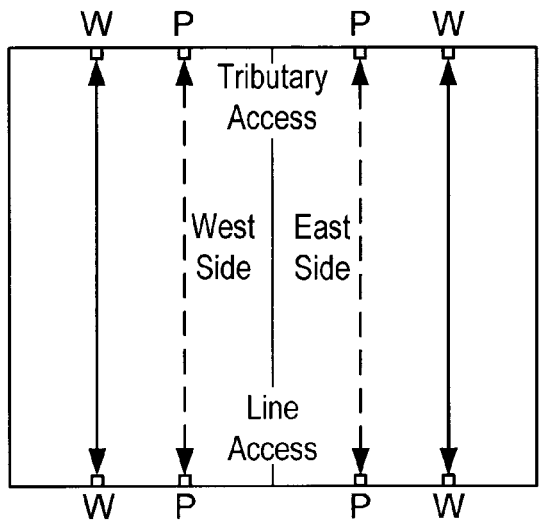
FIG. 10 is a simplified diagram illustrating the normal mode of the switching equipment.
Figure 13:
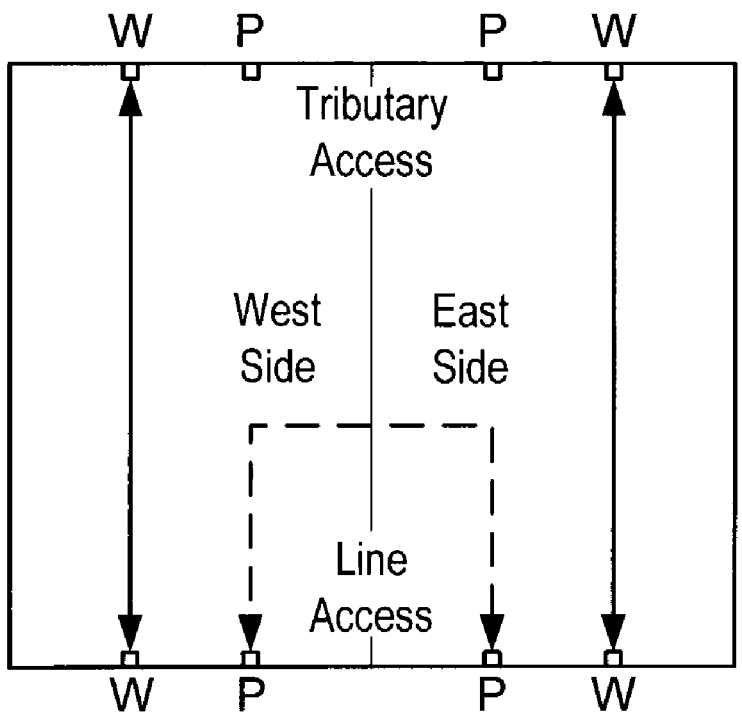
FIG. 13 is a simplified diagram illustrating the bridge mode of the switching equipment.

FIG. 10 illustrates the normal mode of the switching equipment 900. During the normal mode, the switch passes working traffic directly from the tributary access ports to the line access ports and vice-versa. Lower priority traffic may be carried on the unused bandwidth or wavelength during normal operation. The lower priority traffic when accessed at the tributary ports is shown as the dotted line in FIG. 10. FIG. 13 shows how the protection traffic may be bridged while the working traffic is accessed for normal operation. During a network failure, the lower priority traffic is dropped so that additional bandwidth can be made available to remedy the network failure.

Ring-Switch West Mode

Figure 11:
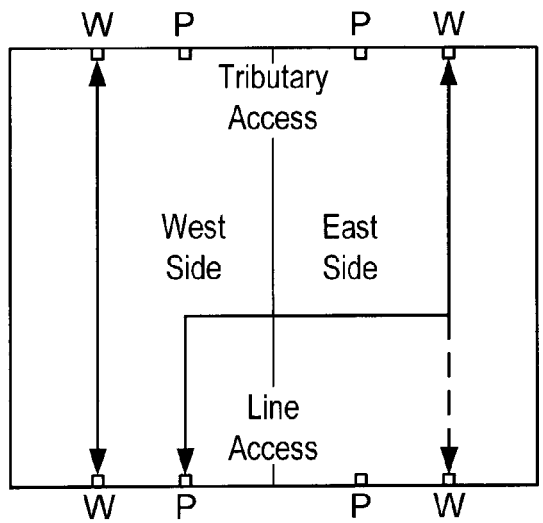
FIG. 11 is a simplified diagram illustrating the ring-switch west mode of the switching equipment.

FIG. 11 illustrates the ring-switch west mode of the switching equipment 900. During the ring-switch west mode, the switch passes west working traffic to the west working OADM and east working traffic to the west protection OADM. The protection tributary client traffic is not used. An optional bridging of traffic to both the protection and working line access at the same time is possible (as shown by the dotted line) in both the optical and electrical implementations as will be further described below. This optional bridging is useful for keeping the working line access signal alive to determine when the link is restored. If this bridging is not implemented, an out-of-band communication signaling is used.

Ring-Switch East Mode

Figure 12:
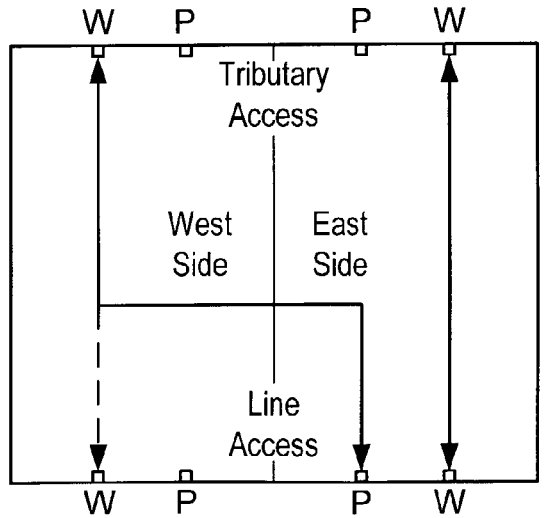
FIG. 12 is a simplified diagram illustrating the ring-switch east mode of the switching equipment.

FIG. 12 illustrates the ring-switch east mode of the switching equipment 900. During the ring-switch east mode, the switch passes east working traffic to the east working OADM and west working traffic to the east protection OADM. The protection tributary client traffic is not used. As with the ring-switch west mode, an optional bridging to the original working line access may be implemented.

Bridge Mode

FIG. 13 illustrates the bridge mode of the switching equipment 900. Intermediate nodes use the bridge mode to pass protection traffic straight through the network element. This connects the working east and west tributary access ports to the working east and west line access ports. Traffic from the protection tributary access ports is dropped. However, traffic from the protection line access ports is passed through as shown by the dotted line FIG. 13. This mode may also be used as the normal mode if the lower priority protection traffic is not being accessed.

East and West Span Switch Modes

Figure 14:
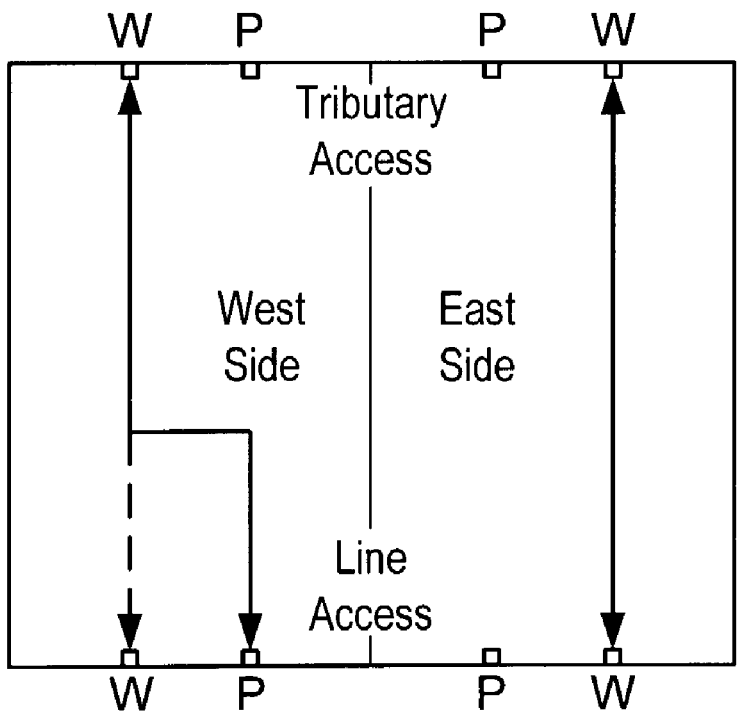
FIG. 14 is a simplified diagram illustrating the east and west span switch modes of the switching equipment.
Figure 15:
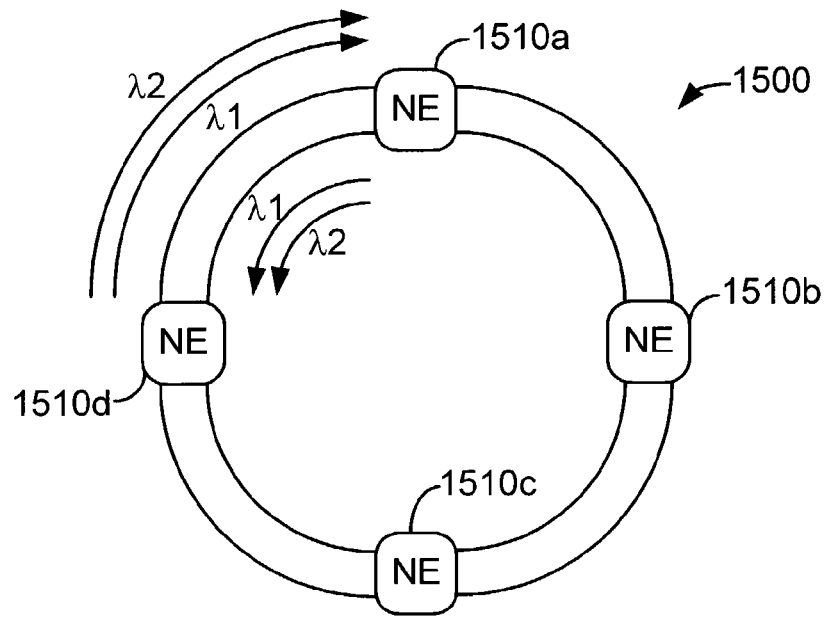
FIG. 15 is a simplified diagram illustrating wavelength assignment in a BPSR network.
Figure 16:
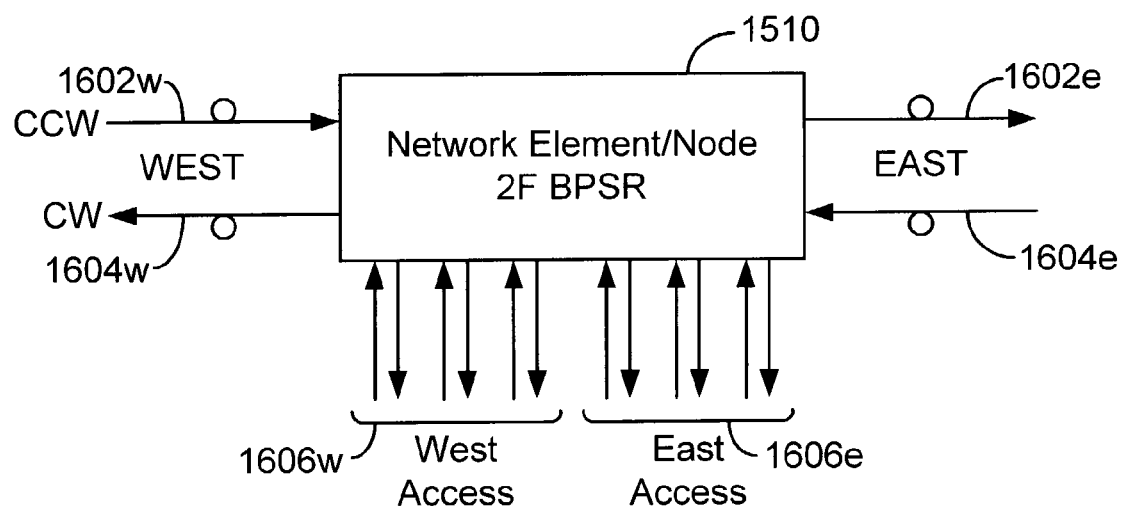
FIG. 16 is a simplified diagram illustrating an exemplary embodiment of a network element in a BPSR network.
Figure 17:
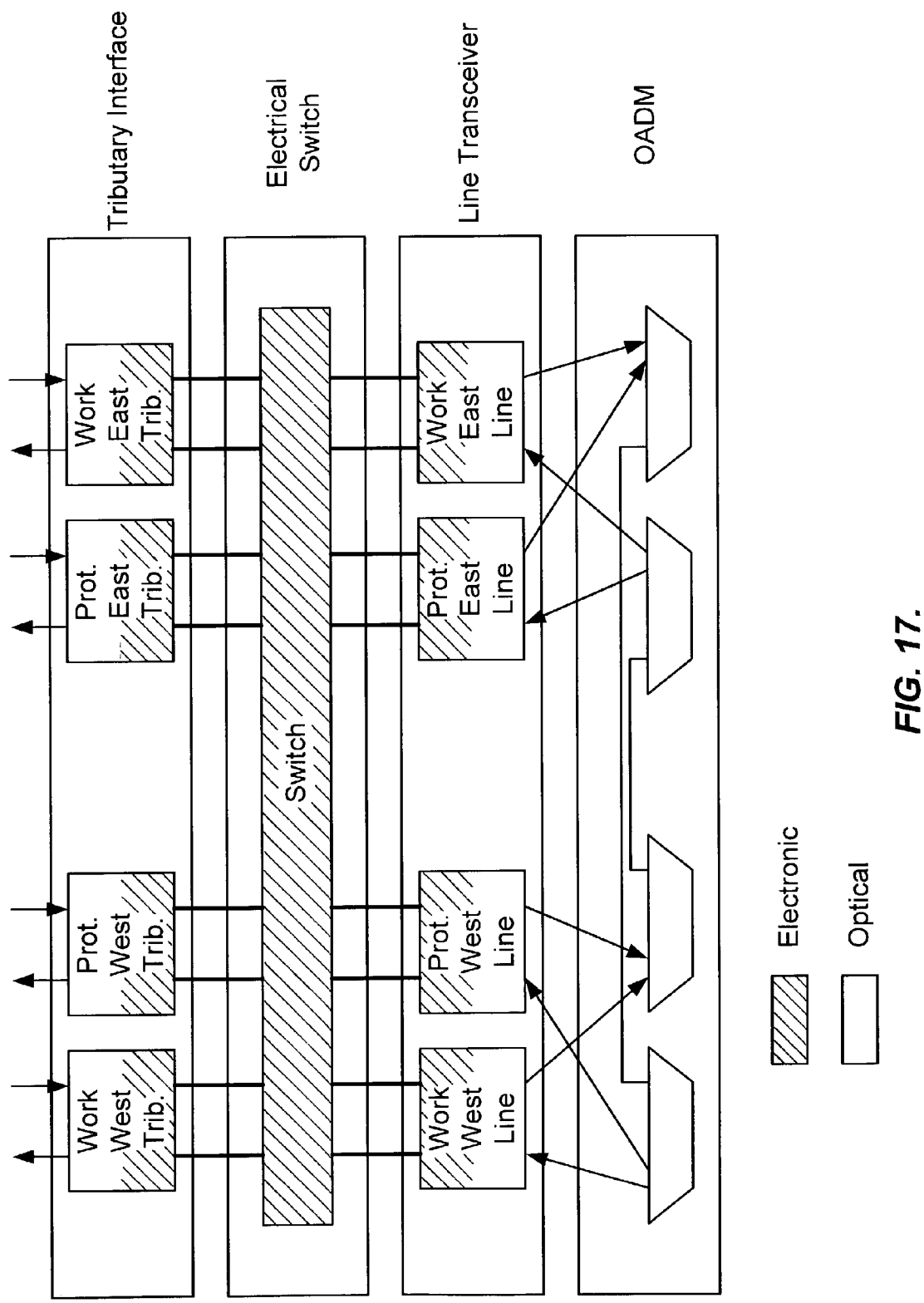
FIG. 17 is a simplified diagram illustrating an exemplary embodiment of a network element implemented with an electrical switch.
Figure 18:
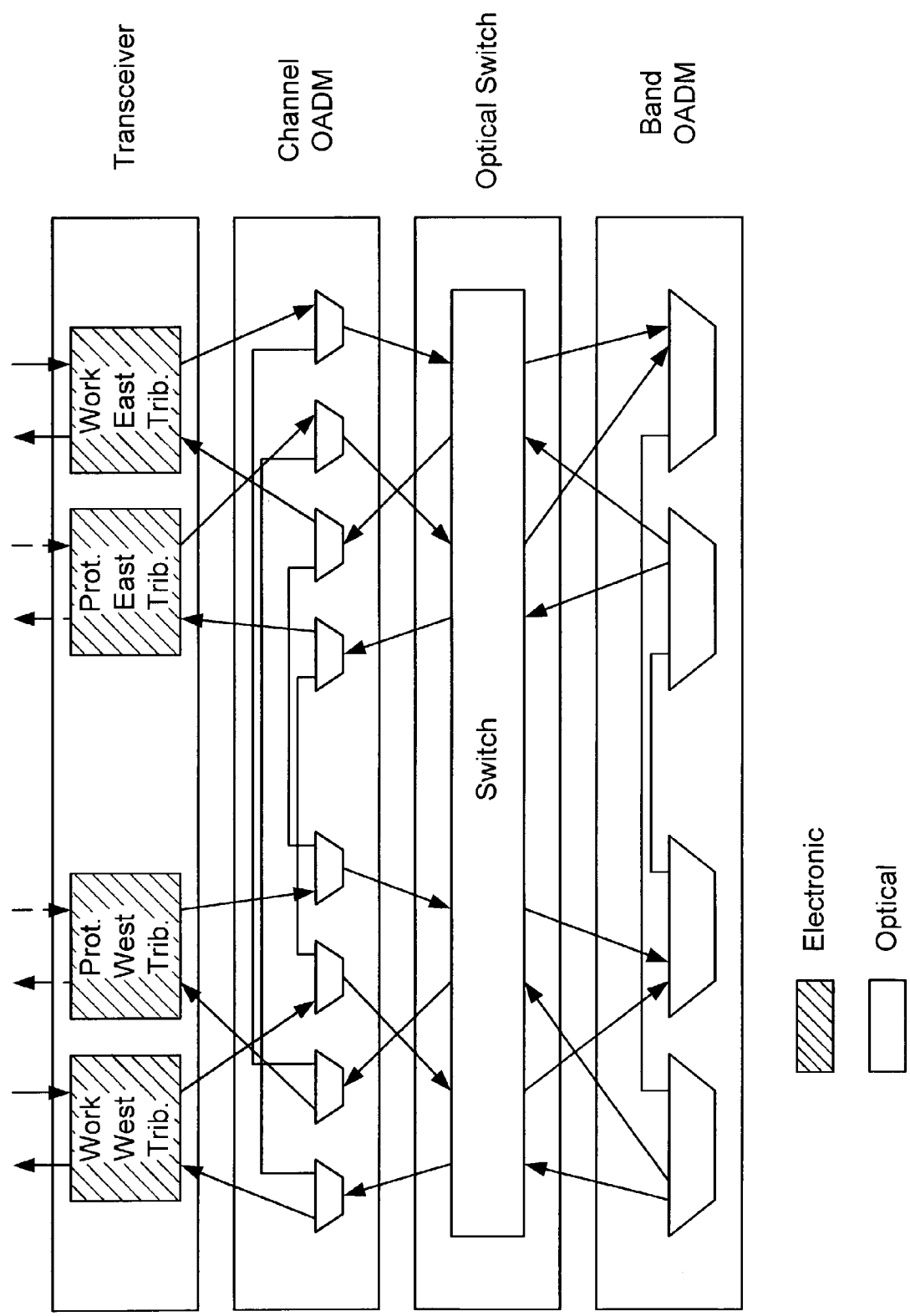
FIG. 18 is a simplified diagram illustrating an exemplary embodiment of a network element implemented with an optical switch.
Figure 19:
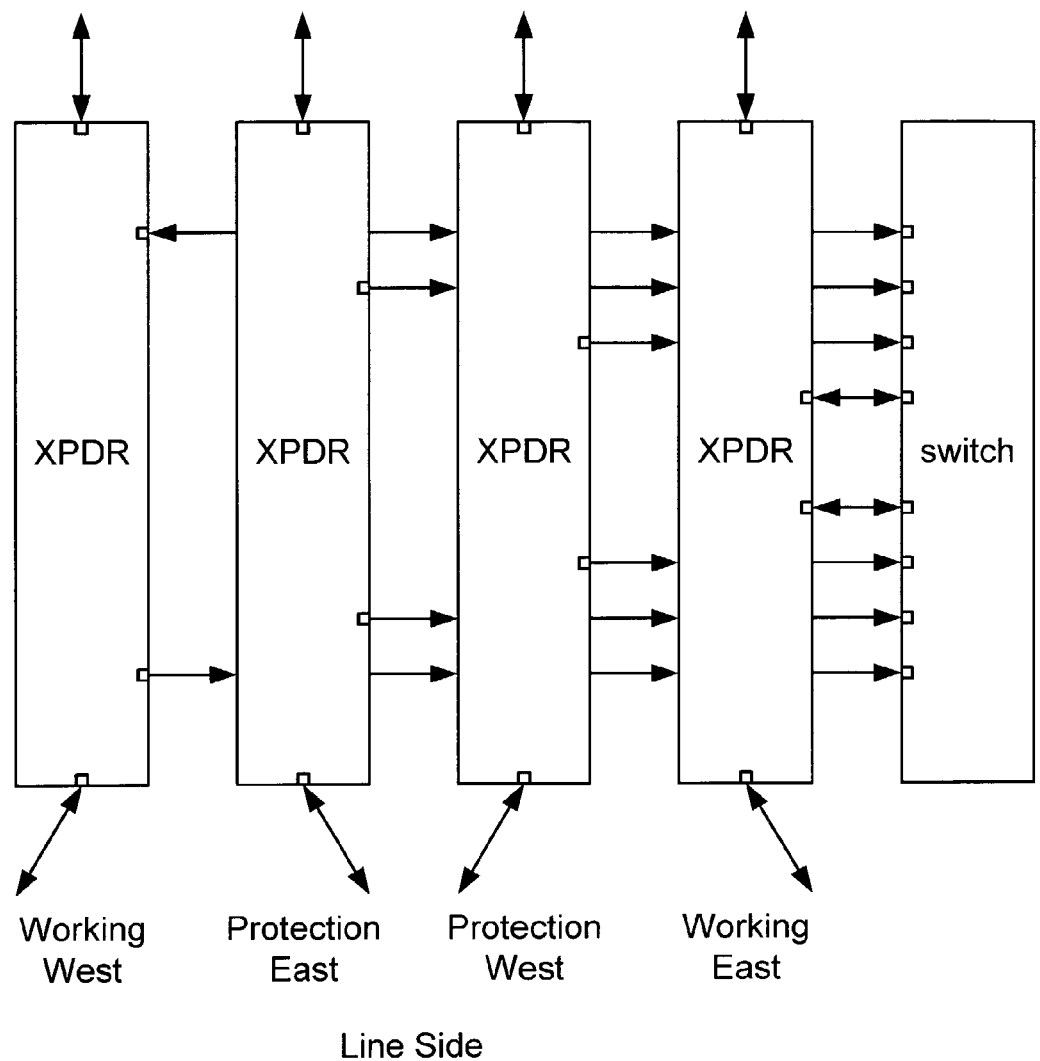
FIG. 19 is a simplified diagram illustrating an exemplary embodiment of a central switch.
Figure 20:
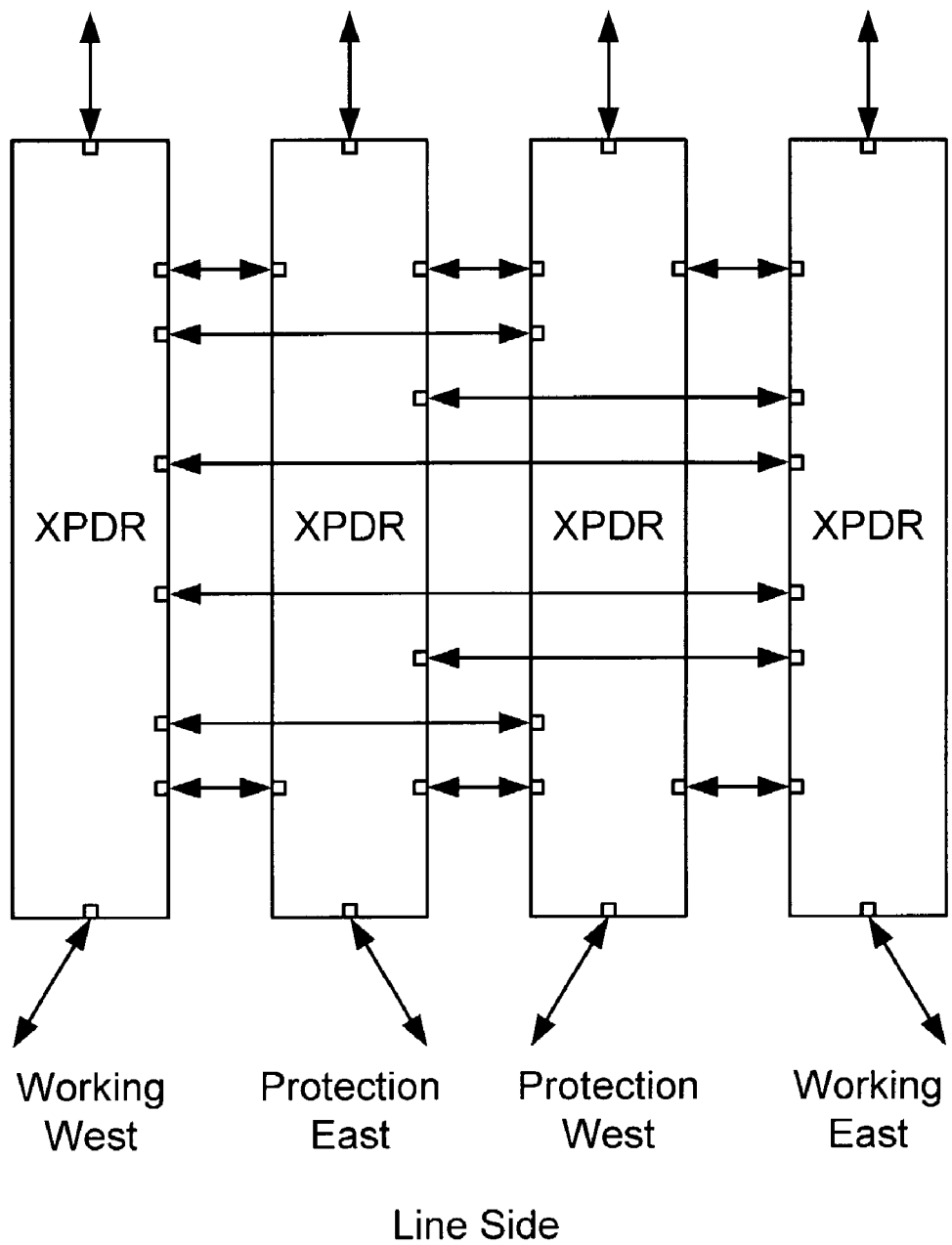
FIG. 20 is a simplified diagram illustrating an exemplary embodiment of a distributed switch.

FIG. 14 illustrates the east and west span switch modes of the switching equipment 900. The east and west span switch modes are useful in an electrical implementation of the switching equipment 900 to recover from some additional failures. These failures include, for example, a fiber failure if the network is implemented as 4-fiber BPSR or a equipment or fiber failure in the OADM, that drops the working traffic but allows the protection traffic to survive. Both the east and west span switch modes put the normal working traffic on the protection line access port for the same direction (east or west) as the normal working traffic's direction.

In general, reuse of the working wavelength around the ring (or virtual ring with a mesh) determines the number of line interfaces necessary at the network element. The number of line interfaces can be determined in a number of ways as follows: (1) If the working wavelength is only used for one service around the ring, then only two line interfaces are needed at both terminal nodes of the service: one for the working interface on one side and one for the protection interface on the opposite side. This is the simplest implementation which is identical to O-UPSR. (2) if the working wavelength is used for more than one service around the ring and the network element terminates two working services on this wavelength (one on the east and one on the west), the network element requires all four line interfaces. (3) If the working wavelength is used for more than one service around the ring and the network element terminates only one working service on this wavelength, then the network element requires only three line interfaces: one for the working traffic and both protection interfaces.

BPSR Automatic Protection Switching (APS) Protocol

According to an exemplary embodiment of the present invention, there is provided an APS protocol to be used in connection with a BPSR network when in-band signaling is available. The current well-defined SONET 4F-BLSR protocol is used for channel providing a bit-oriented protocol like SONET signal and Digital Wrapper signal. As will be described below, the SONET 4F-BLSR protocol may be adopted for use with the BPSR architecture.

In a SONET 4F-BLSR system, multiple working connections may be defined per ring segment. A ring segment is a section between 2 nodes or network elements. In a BPSR system, there is only one working channel per working wavelength. This APS protocol when used for BPSR provides channel switching with no backhaul since the only node participating in the APS protocol is the node terminating a working channel. There are no BPSR nodes that terminate the APS protocol and provide passthrough function for the working channel at the same time. This is one high-level difference between BPSR and BLSR. It is assumed that there is one BPSR protection mechanism per pair of wavelengths (working and protection) and only the node terminating those two wavelengths is using the BPSR protection mechanism. Based on the disclosure provided herein, a person of ordinary skill in the art will be able to adopt the SONET 4F-BLSR protocol to provide an APS protocol for use in a BPSR architecture.

In order to describe the APS protocol for use in a BPSR architecture, the following information relating to the SONET 4F-BLSR protocol is provided. Three types of Quality of Service (QoS) are offered to a user by the optical user interface (OUI), namely, working-protected channel access (WCA), unprotected channel access (UCA) and protecting channel access (PCA).

In a failure situation, the WCA will be protected. With respect to UCA, if there is a failure between two end points, the channel is lost and may only be restored by other protection mechanisms. UCA traffic can only be defined on a WCA for which the protection is disabled. With respect to PCA, it may be lost under a failure between two end points or if the path requires to protect a failure on a working (protected) channel.

Figure 21:
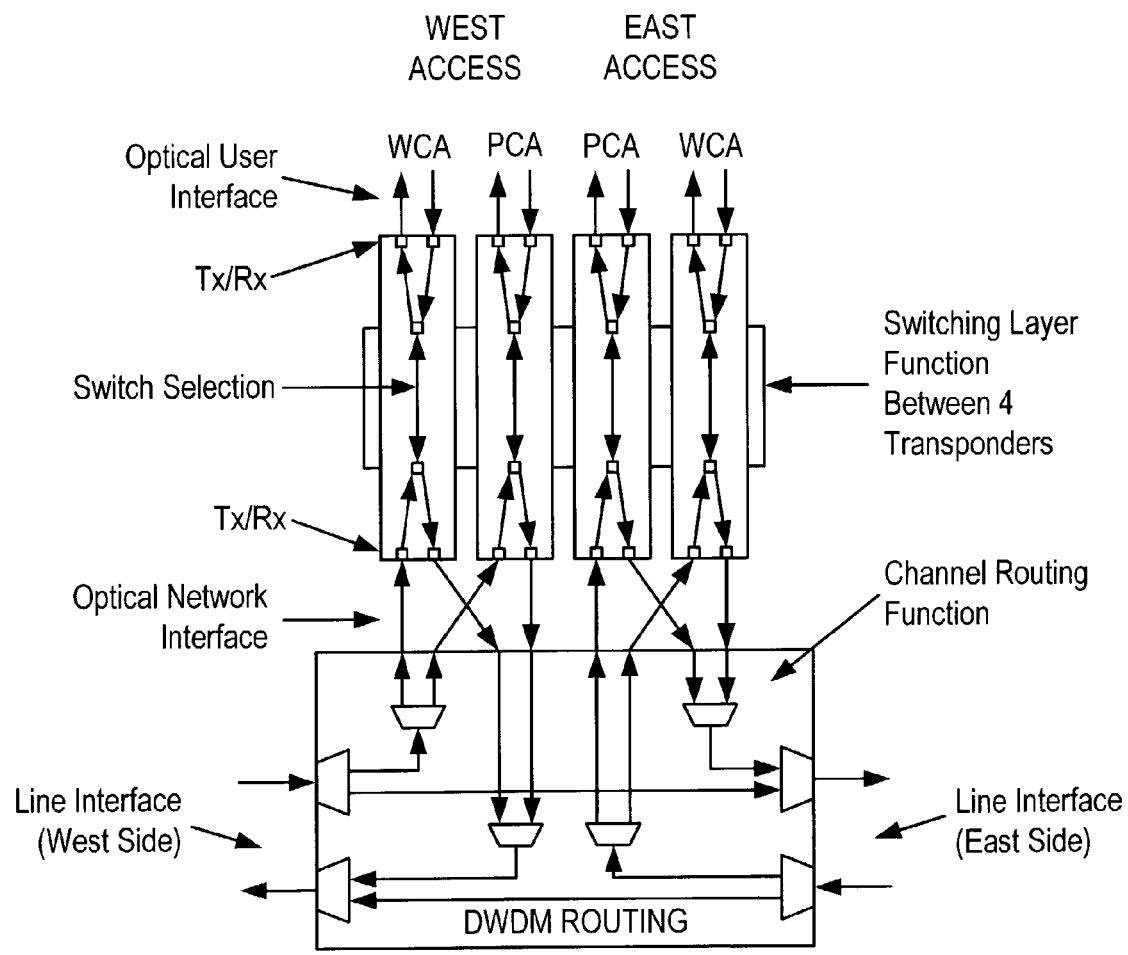
FIG. 21 is a simplified diagram illustrating an exemplary embodiment of a network element which offers three types of QoS.

FIG. 21 illustrates an exemplary embodiment of a network element which offers the three types of QoS in accordance with the present invention. The network element provides a WCA for the west side, a WCA for the east side, a PCA for the west side and a PCA for the east side through four transponders. The transponders are connected to the AODM through the optical network interface. The WCA transponder is configured to terminate the wavelength assigned to the working traffic and the PCA transponder is configured to terminate the wavelength assigned to the protection traffic. The switching layer is shown by an arrow that connects the OUI to the ONI. The switching function presented in FIG. 21 shows the normal condition of the switch when no failure is present in the ring.

The transponder terminates the signal and provides access to the APS bytes. For example, it can be the SONET K1/K2 bytes for transponder supporting SONET signal or it can be the Digital Wrapper K1/K2 bytes for transponder supporting the OTN signal.

Figure 22:
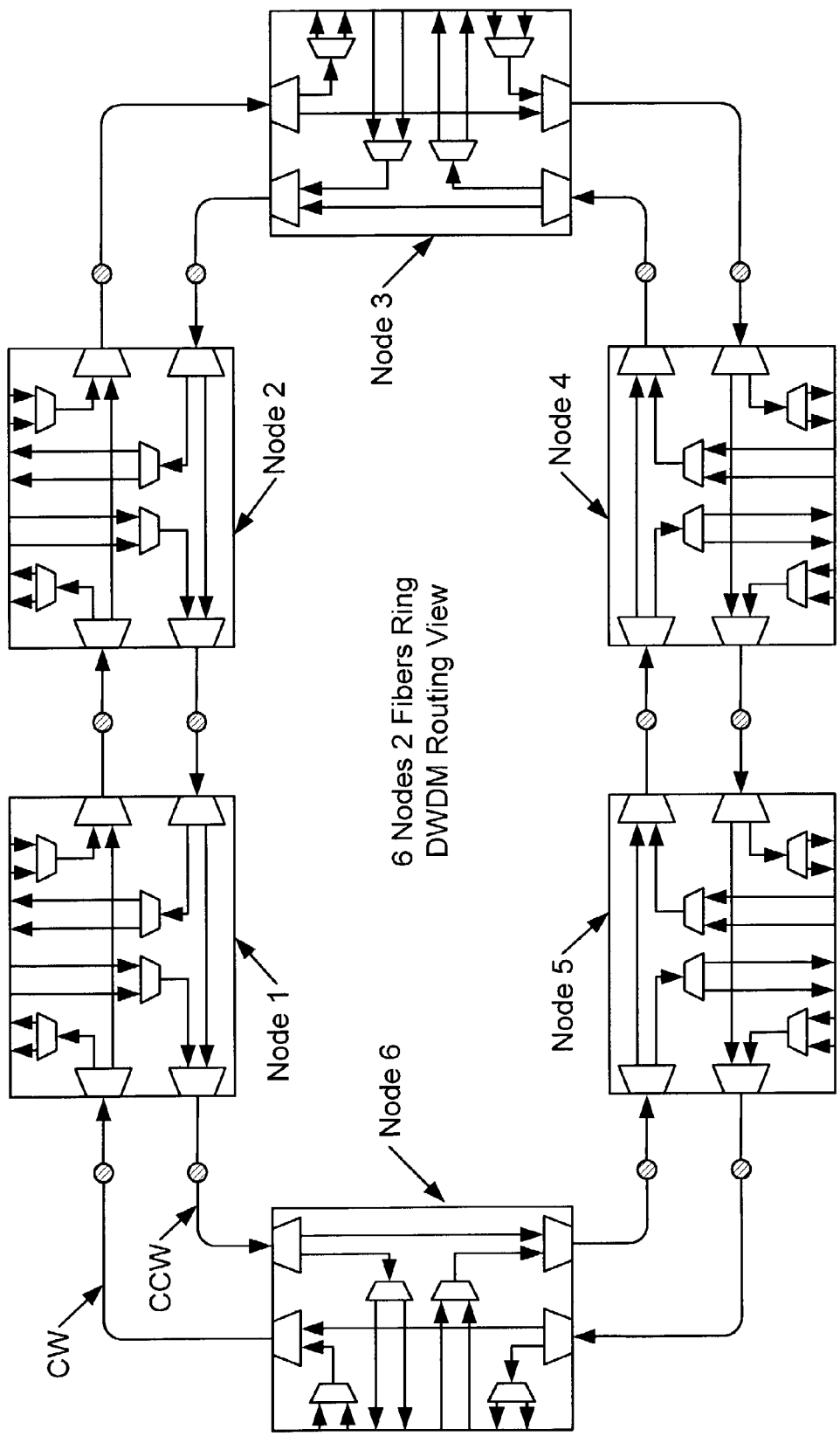
FIG. 22 is a simplified diagram illustrating an exemplary embodiment of a six-node ring in accordance with the present invention.

FIG. 22 illustrates an exemplary embodiment of a six-mode ring in accordance with the present invention. The ring is a 2-fiber ring having six nodes. FIG. 22 shows the OADM view. At each node, the OADM function provides access to the working wavelength and the protection wavelength on both side of the node.

Figure 23:
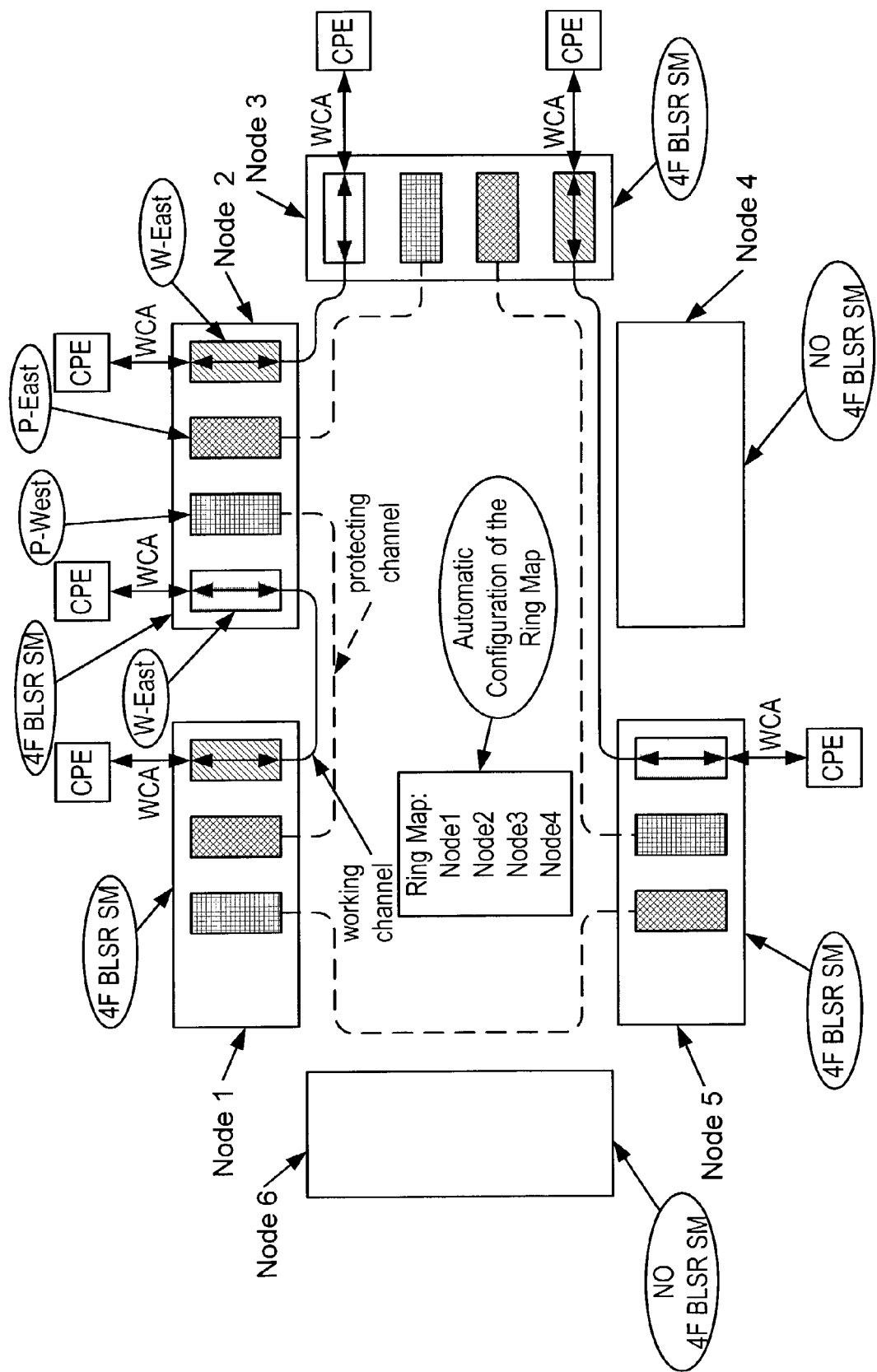
FIG. 23 is a simplified diagram illustrating traffic allocation in the ring shown in FIG. 22 in accordance with the present invention.

FIG. 23 illustrates the traffic allocation in the ring shown in FIG. 22 in accordance with the present invention. For illustrative purposes, only the transponders are represented in the node and the line interconnecting the node represents the working or the protection traffic. W-East represents the transponder providing WCA on the west side; P-West represents the transponder providing PCA on the west side, and so on. Nodes 1, 2, 3 and 5 are configured to terminate the BPSR for those two wavelengths (working and protection). As shown in FIG. 23, there is a working channel (WCA) between node 1 and 2, between node 2 and 3 and between node 3 and 4. There is no failure condition and the arrow on each transponder represents the switch selection for a no failure condition. Node 1 only contains three transponders since no WCA is needed on the west side of the ring. Each node that terminates the BPSR implements a 4-fiber BLSR APS state machine (SM). The ring map contains nodes 1, 2, 3 and 5.

Figure 24:
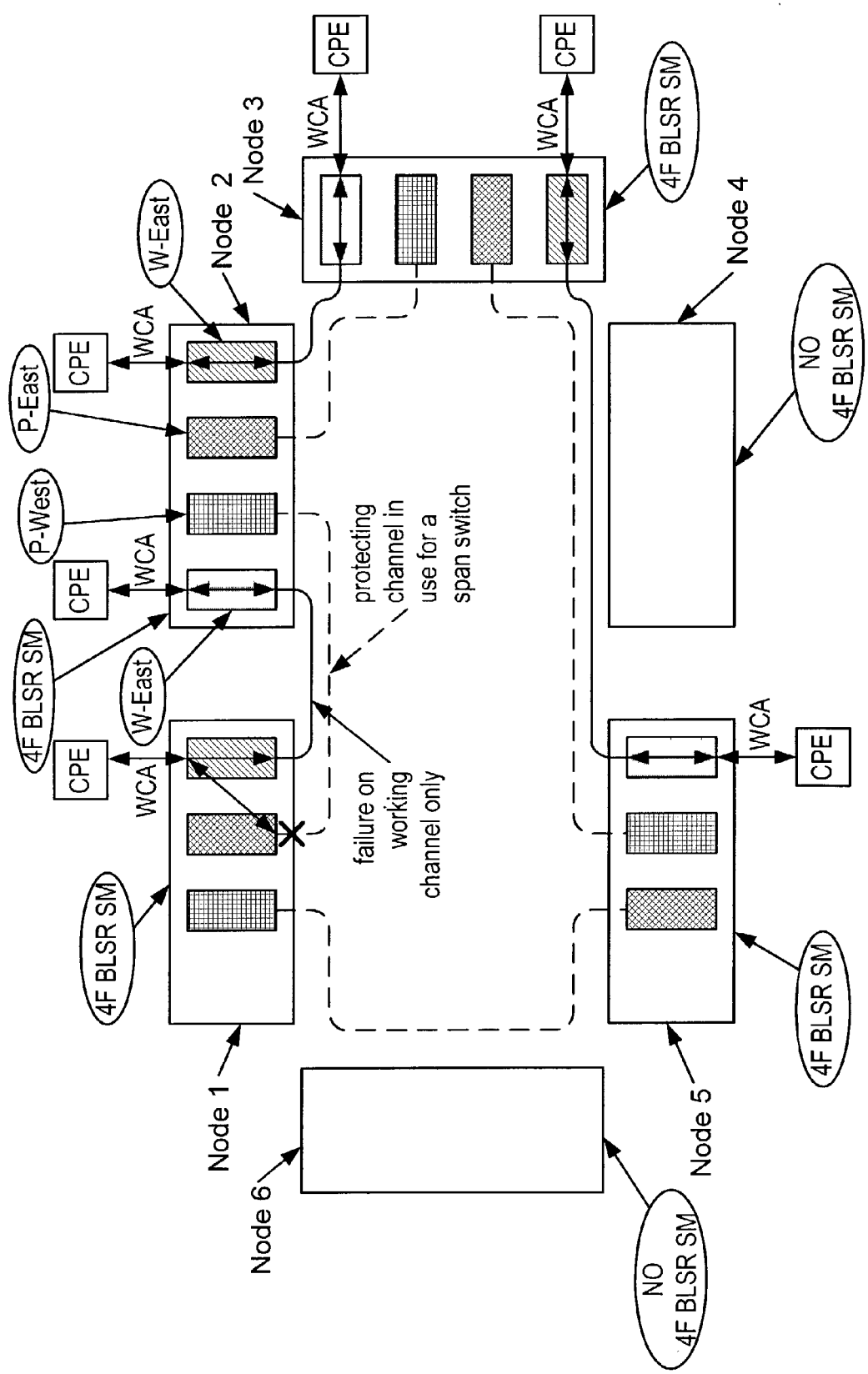
FIG. 24 is a simplified diagram illustrating use of the span switch to protect the working traffic in accordance with the present invention.

Under a failure condition that affects the working traffic between node 1 and node 2, the BPSR will initiate a span switch to protect the working traffic. FIG. 24 illustrates use of the span switch to protect the working traffic in accordance with the present invention. Even if the ring is a 2-fiber ring, this type of failure may occur due to equipment failure or any other failure that will only affect the working traffic but not the protection traffic between node 1 and node 2. The node that detects the failure of the working traffic will request a span switch through the APS. Under this failure condition, node 1 and node 2 will select the traffic on the optical network interface from the protection east (P-East) and west (P-West) respectively.

Figure 25:
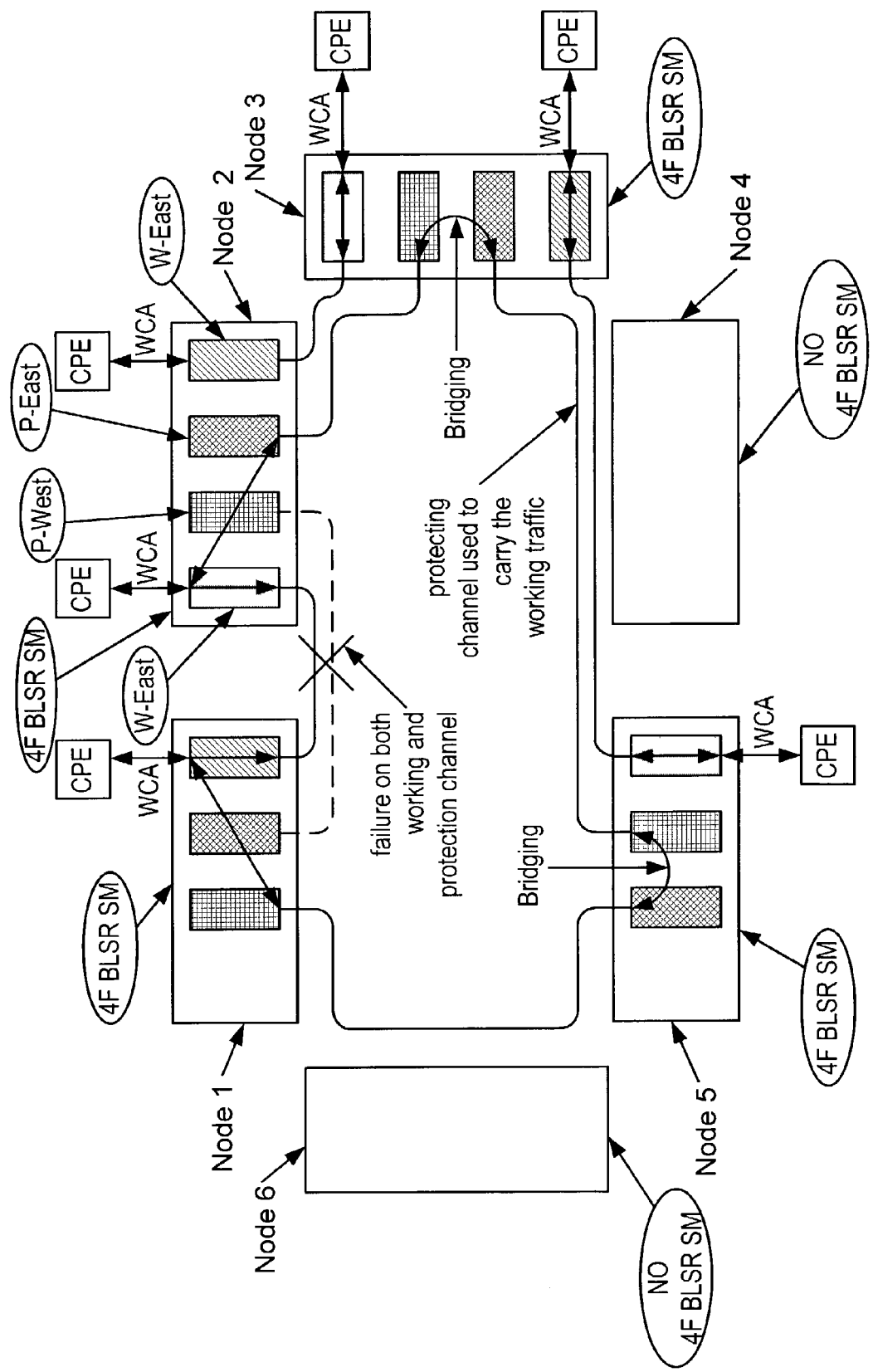
FIG. 25 is a simplified diagram illustrating use of the ring switch to protect the working traffic in accordance with the present invention.

Under a failure condition that affects the working traffic and the protection traffic between node 1 and the node 2, the BPSR will initiate a ring switch to protect the working traffic. FIG. 25 illustrates use of the ring switch to protect the working traffic in accordance with the present invention. The node that detects the failure of the working traffic will initiate a bridge request through the APS. Under this failure condition, node 1 and node 2 will select the traffic on the optical network interface from the protection west (P-West) and east (P-East) respectively. Nodes 3 and 5 will bridge their respective protection transponder to provide a passthrough for the protection traffic. All other WCA in the ring are unaffected by the switch.

Figure 26:
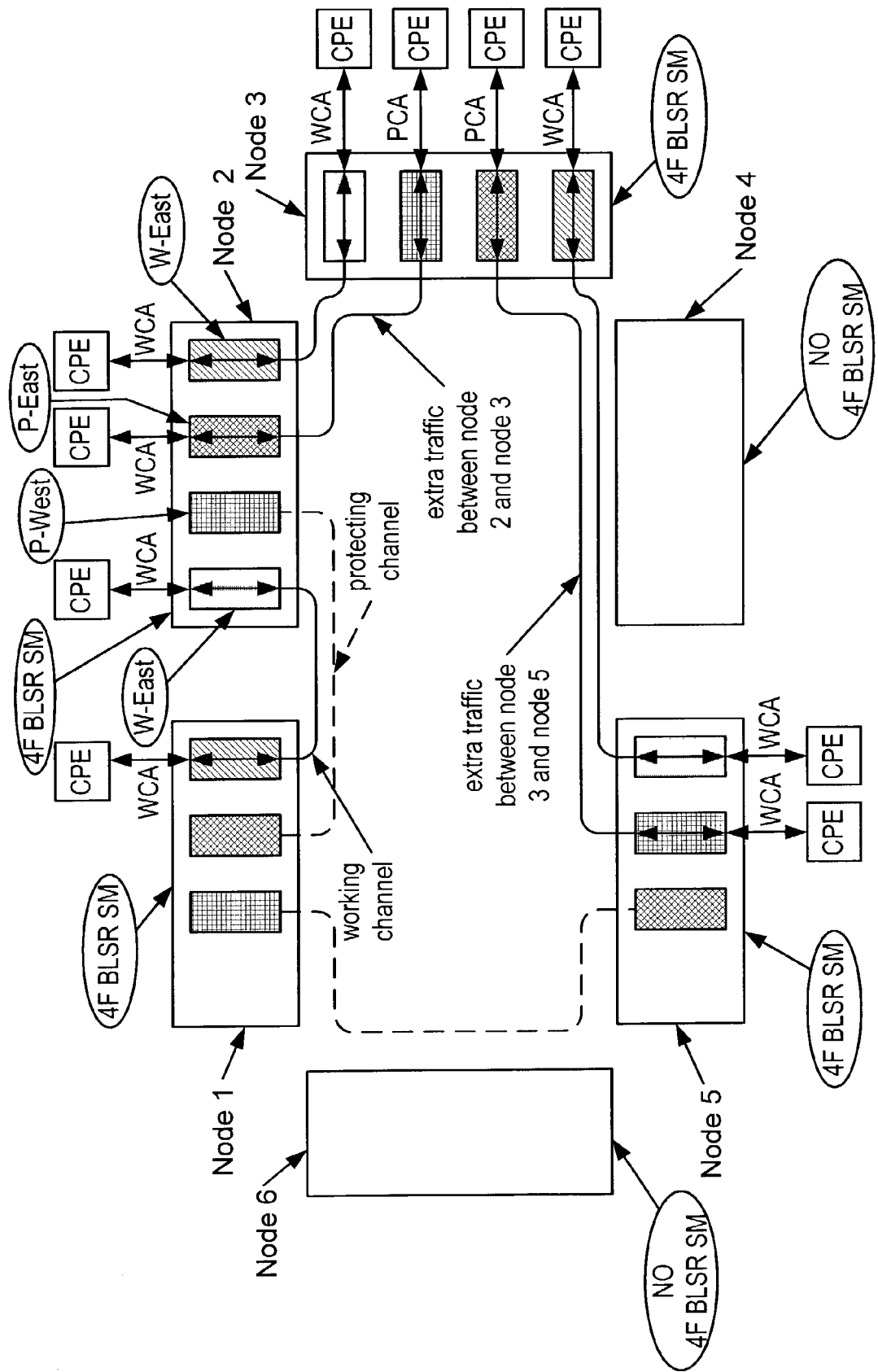
FIG. 26 is a simplified diagram illustrating allocation of PCA traffic in the ring shown in FIG. 22 in accordance with the present invention.

FIG. 26 illustrates allocation of PCA traffic in the ring in accordance with the present invention. PCA is assigned between node 2 and node 3 and PCA is assigned between node 3 and node 5. PCA is provided by setting the switch on the protection transponder to connect the OUI to the ONI.

Figure 27:
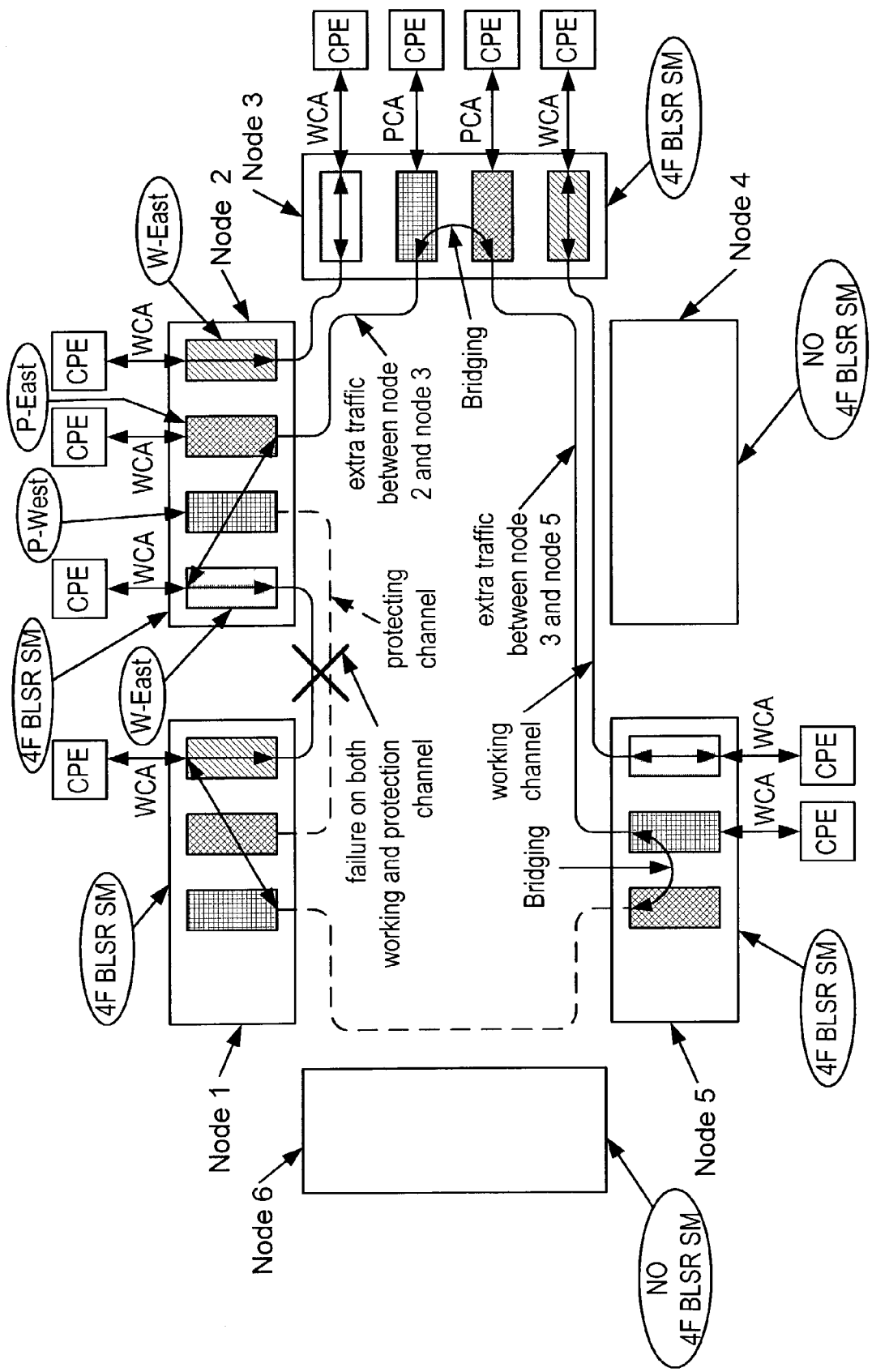
FIG. 27 is a simplified diagram illustrating use of a ring switch with PCA traffic present in the ring shown in FIG. 22 in accordance with the present invention.

FIG. 27 illustrates use of a ring switch with PCA traffic present in accordance with the present invention. Under a failure condition that affects the working traffic and the protection traffic between node 1 and node 2, the BPSR will initiate a ring switch to protect the working traffic. The node that detects the failure of the working traffic will initiate a bridge request through the APS. Under this failure condition, node 1 and node 2 will select the traffic on the optical network interface from the protection west (P-West) and east (P-East) respectively. Node 3 and node 5 will bridge their respective protection transponder to provide a passthrough for the protection traffic. All other WCA in the ring are unaffected by the switch. PCA traffic that was present in the ring is dropped since the switch on the protection transponder is not selecting the optical user interface.

Physical Implementation of Electrical Switching

The electrical switching functions required to implement the BPSR protection mechanism are implemented using two techniques. The first technique is to centralize the switching functions in a switch module and to interconnect all the transponders to the switch module. The second technique is to distribute the switching functions through the transponder. These two techniques will be described with reference to switching equipment which is implemented under the electrical approach.

(i) Centralized Electrical Implementation

Figure 28:
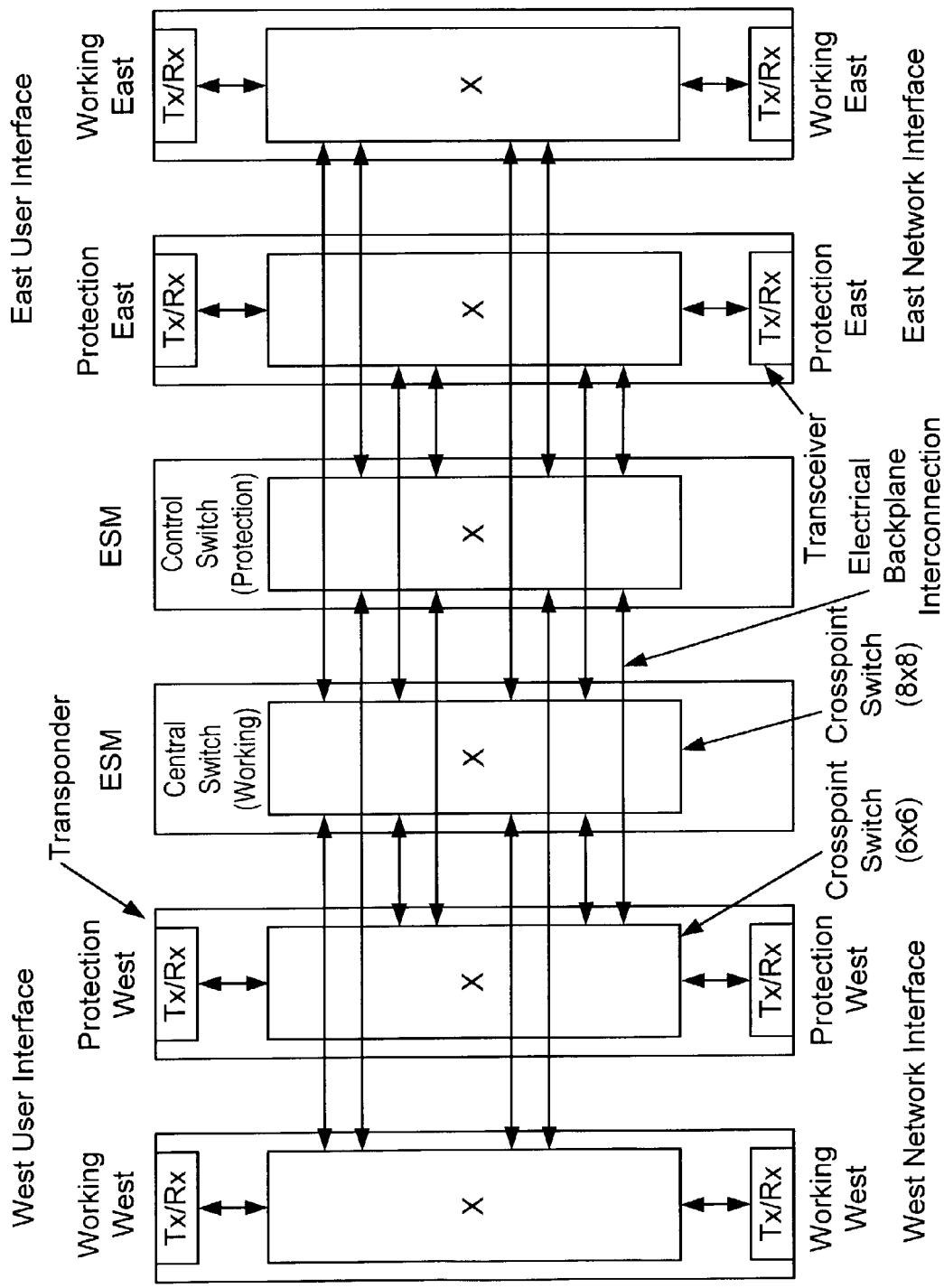
FIG. 28 is a simplified diagram illustrating an exemplary embodiment of a centralized switch implementation using a group of four transponders in accordance with the present invention.

The centralized switch implementation uses an electronic switching module (ESM). Each transponder in a BPSR group is interconnected to the ESM. FIG. 28 illustrates an exemplary embodiment of the centralized switch implementation using a group of four (4) transponders in accordance with the present invention. The ESM is duplicated to provide system redundancy so there is no single point of failure. One of the ESMs is the active one and the other is the standby one. It should be understood that FIG. 28 represents the minimal implementation to support BPSR protection mechanism using four (4) transponders. Each user interface and network interface of a transponder is connected to two ESMs. That represents four (4) bi-directional (eight (8) unidirectional) interconnections per transponder. The ESM provides the routing function for the line side and the tributary side. Traffic from the tributary or the line side of a transponder can be routed to any other transponder belonging to the group of four (4). The ESM has two (2) interconnections per transponder. In total, there are eight (8) bi-directional sixteen (16) unidirectional) interconnections per ESM when supporting a group of four (4) transponders.

As shown in FIG. 28, since each transponder is connected to two (2) ESMs, the transponder also has a switch. Furthermore, a 6×6 crosspoint is used on the transponder. In another implementation, an 8×8 crosspoint is used which renders the transponder compatible between centralized and distributed implementations. Details with respect to the distributed implementation will be provided below. The crosspoint on the transponder also provides bridging of signals to the two (2) ESMs. Since the routing function is the same on both ESMs, each transponder is able to switch locally when a failure of an ESM is detected. If both ESMs need to be removed for maintenance, this implementation will provide the normal routing from the network to the user interface. The ESM crosspoint can be made bigger to allow more transponders to handle multiple BPSRs.

Figure 29:
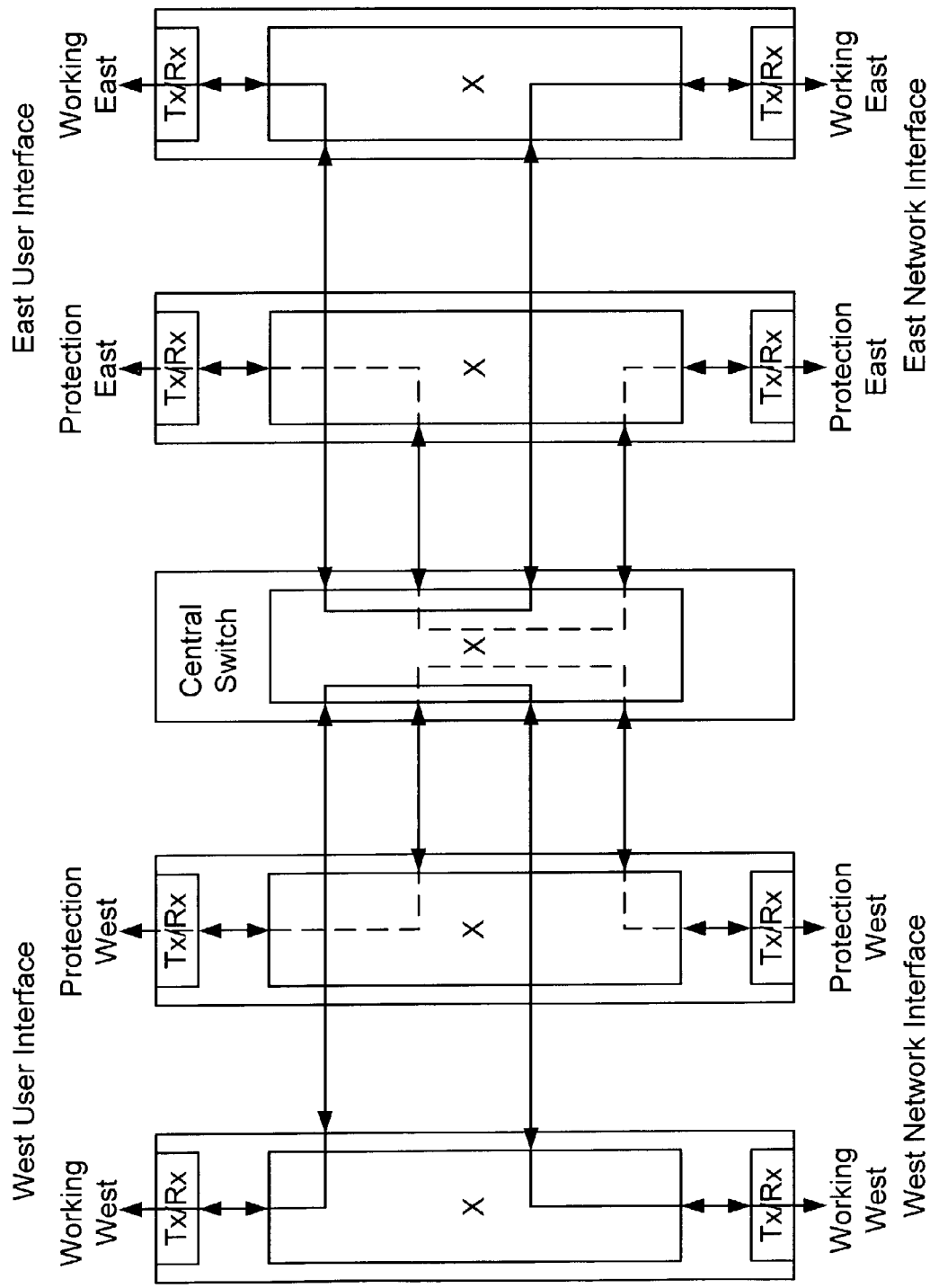
FIG. 29 is a simplified diagram illustrating the normal situation where the working and the protection access ports are used in the centralized switch as shown in FIG. 28 in accordance with the present invention.

The BPSR protection operations performed by the centralized switch are described as follows. FIG. 29 illustrates the normal situation where the working and the protection access ports are used. There is no failure in the network that requires this specific node to provide protection support.

Figure 30:
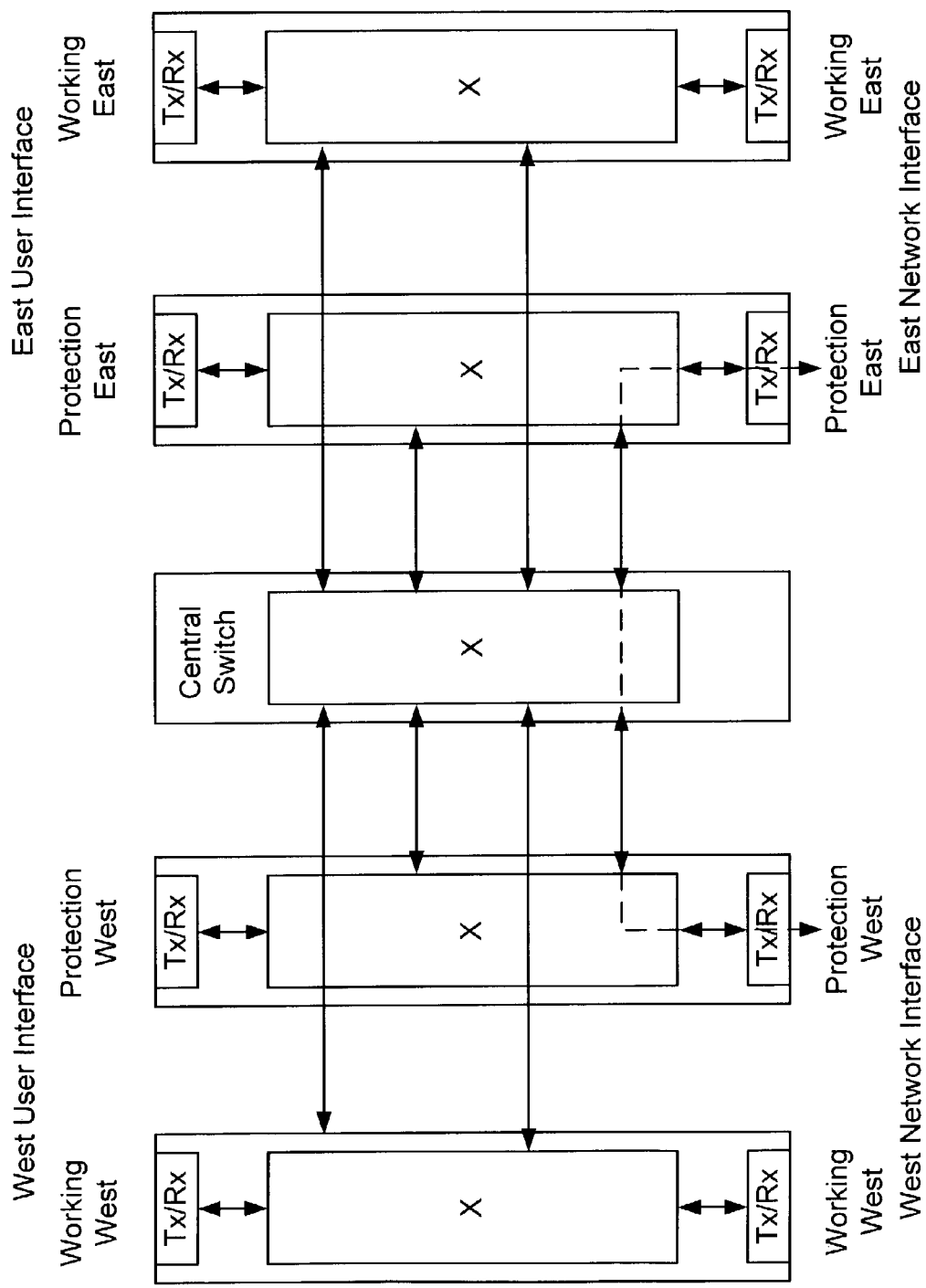
FIG. 30 is a simplified diagram illustrating actions taken by the centralized switch, as shown in FIG. 28, located in an intermediate node during a failure in accordance with the present invention.

FIG. 30 illustrates actions taken by an intermediate node during a failure. The protection transponder is switched to connect the east and the west protection channels to place them in tandem (bridge). The protection ring is closed and provides a protection path for the working channel under a failure situation.

Figure 31:
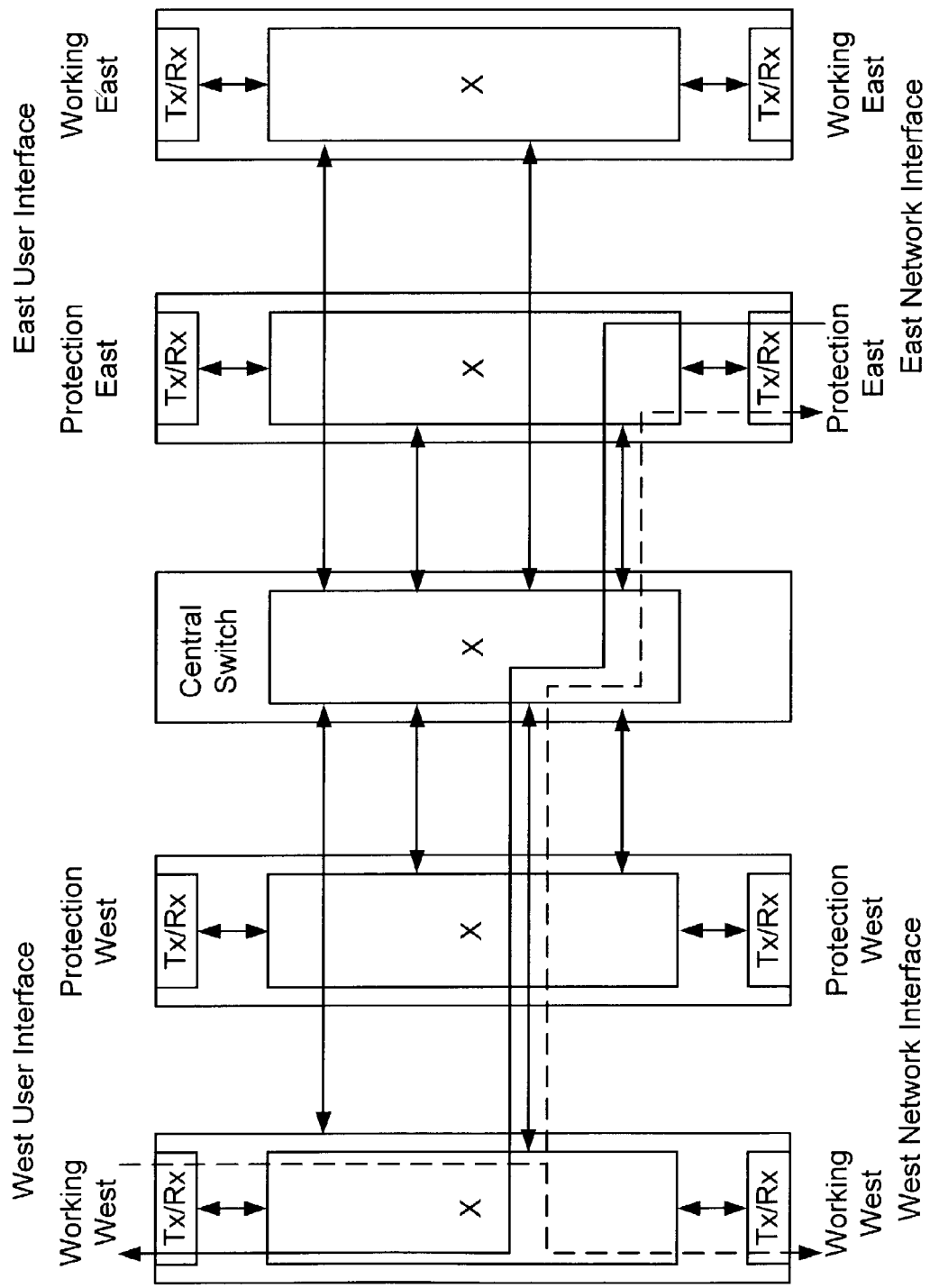
FIG. 31 is a simplified diagram illustrating a failure situation of the working channel and the protection channel or the west side in the centralized switch as shown in FIG. 28 in accordance with the present invention.

FIG. 31 illustrates a failure situation of the working channel and the protection channel on the west side. In this situation, a switch to the protection channel on the opposite side of the ring is requested. The traffic from the user interface is bridged on both the working channel and the protection channel on the opposite side and only the protection channel is selected.

Figure 32:
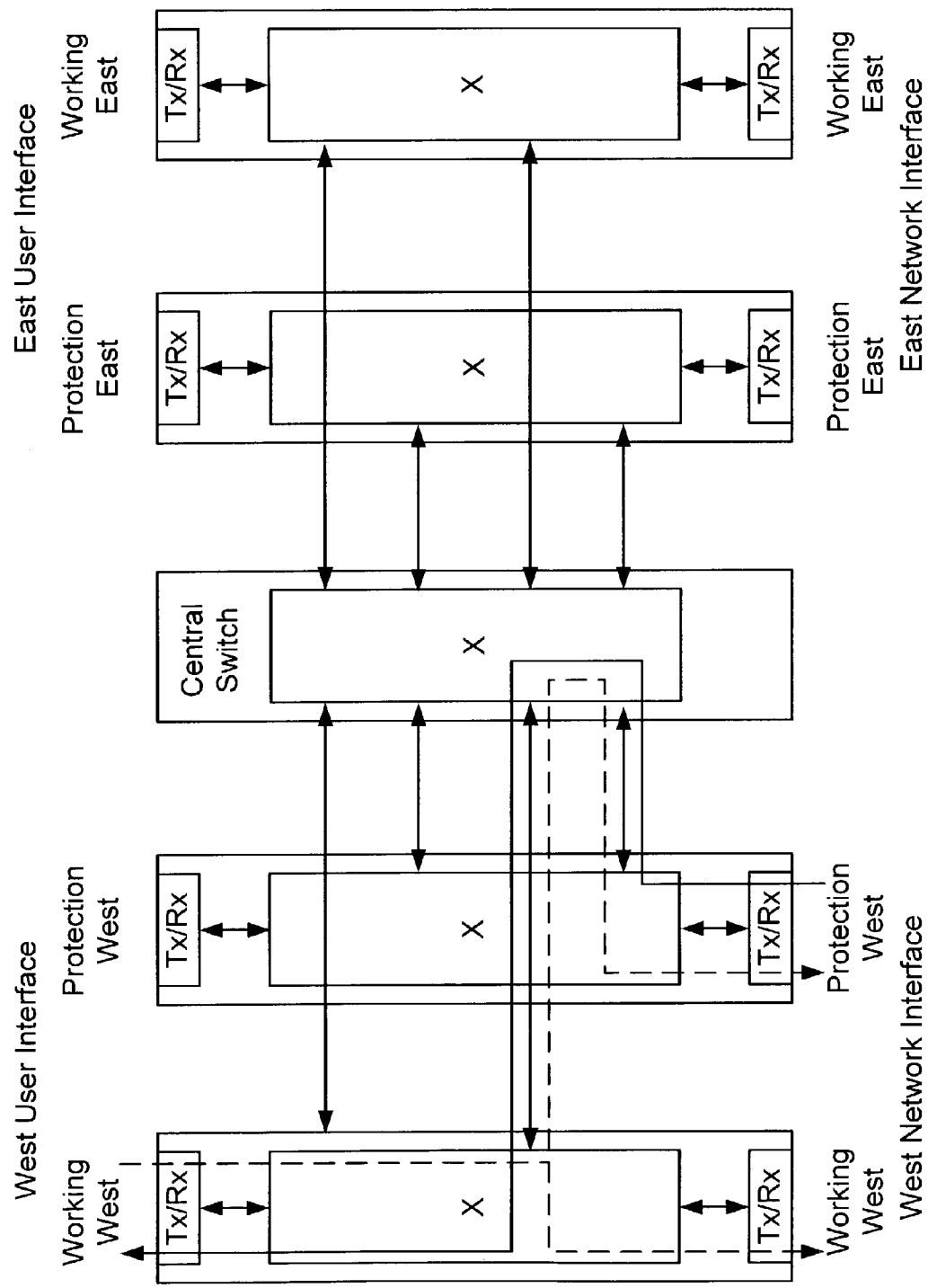
FIG. 32 is a simplified diagram illustrating how the centralized switch shown in FIG. 28 handles a failure condition of the working channel in accordance with the present invention.

FIG. 32 illustrates a failure condition of the working channel only. Under this condition, the traffic from the user interface is bridged on both the working channel and the protection channel of the same side and only the protection channel is selected.

(ii) Distributed Electrical Implementation

The distributed technique requires relatively fewer components to implement the BPSR protection mechanism. It is suitable in a network element that terminates few wavelengths and where the space is limited. The distributed implementation is compact since it does not require additional module. The distributed technique can be implemented in two different ways, as will be further described below.

(ii)(a) Implementation as a BPSR Switch

Figure 33:
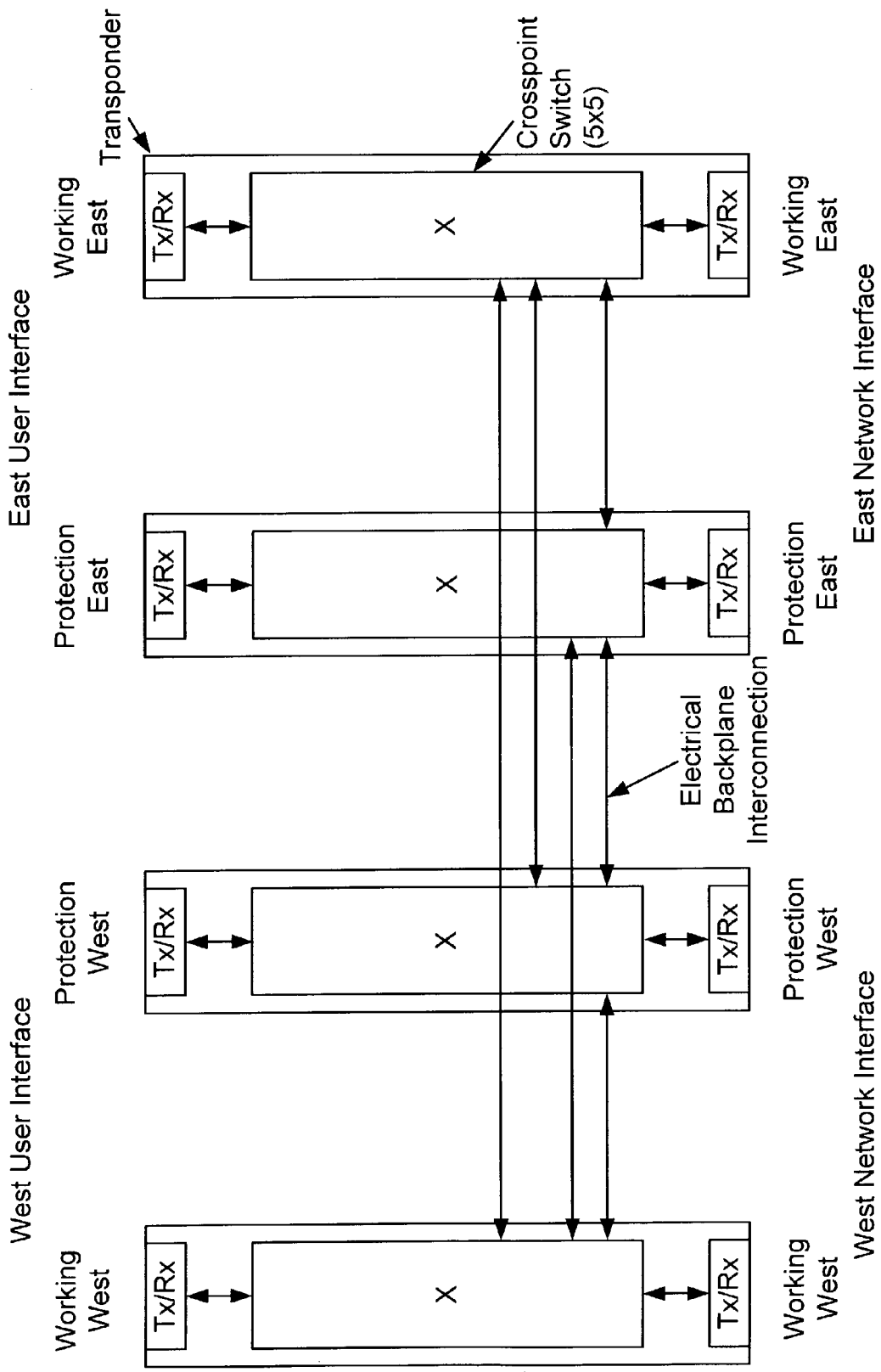
FIG. 33 is a simplified diagram illustrating an exemplary embodiment of a distributed electrical switch in accordance with the present invention.

In one embodiment of the distributed electrical switch, the transponders perform the functions needed to support the BPSR protection mechanism. Each transponder includes a crosspoint switch to interconnect the transceiver from the network interface, the transceiver from the user interface and to connect to the other transponders. The interconnections to the other transponders are done using backplane interconnections. The minimal number of interconnections to the other transponders is three (3). FIG. 33 illustrates an exemplary embodiment of a distributed electrical switch. The interconnections between the working interface on the east and the west are provided to support a regeneration mode but is not required for the BPSR protection.

Figure 34:
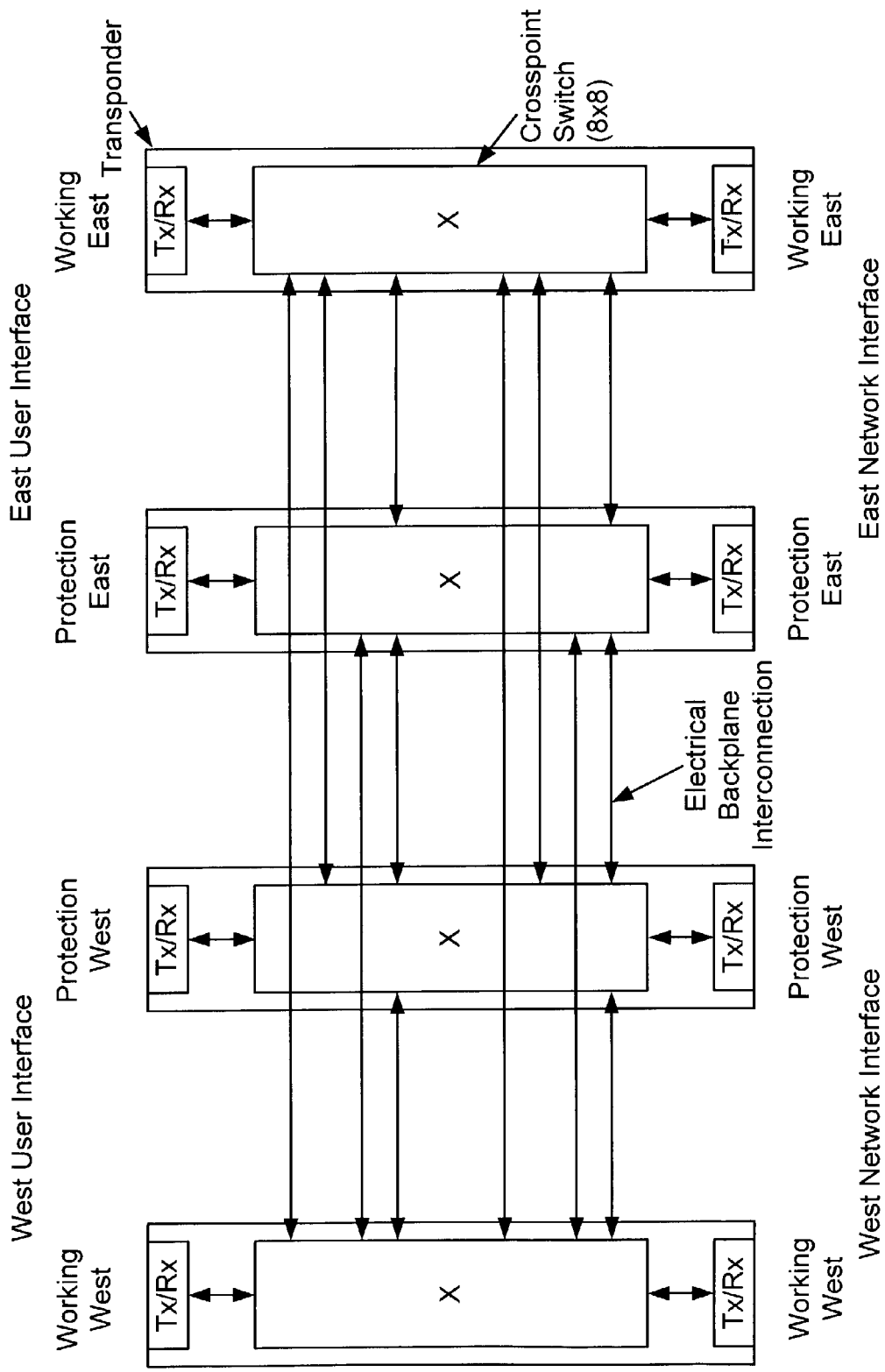
FIG. 34 is a simplified diagram illustrating an exemplary embodiment of the distributed electrical switch with redundant interconnections between transponders.

FIG. 34 illustrates an exemplary embodiment of the distributed electrical switch with redundant interconnections between the transponders in accordance with the present invention. This implementation has the advantage of offering loopback on both the user and the network interface at the same time. Also, since there are redundant interconnections, diagnostic can be performed on the unused interconnections during live operation. The minimal switch size is and 8×8 crosspoint.

Figure 35:
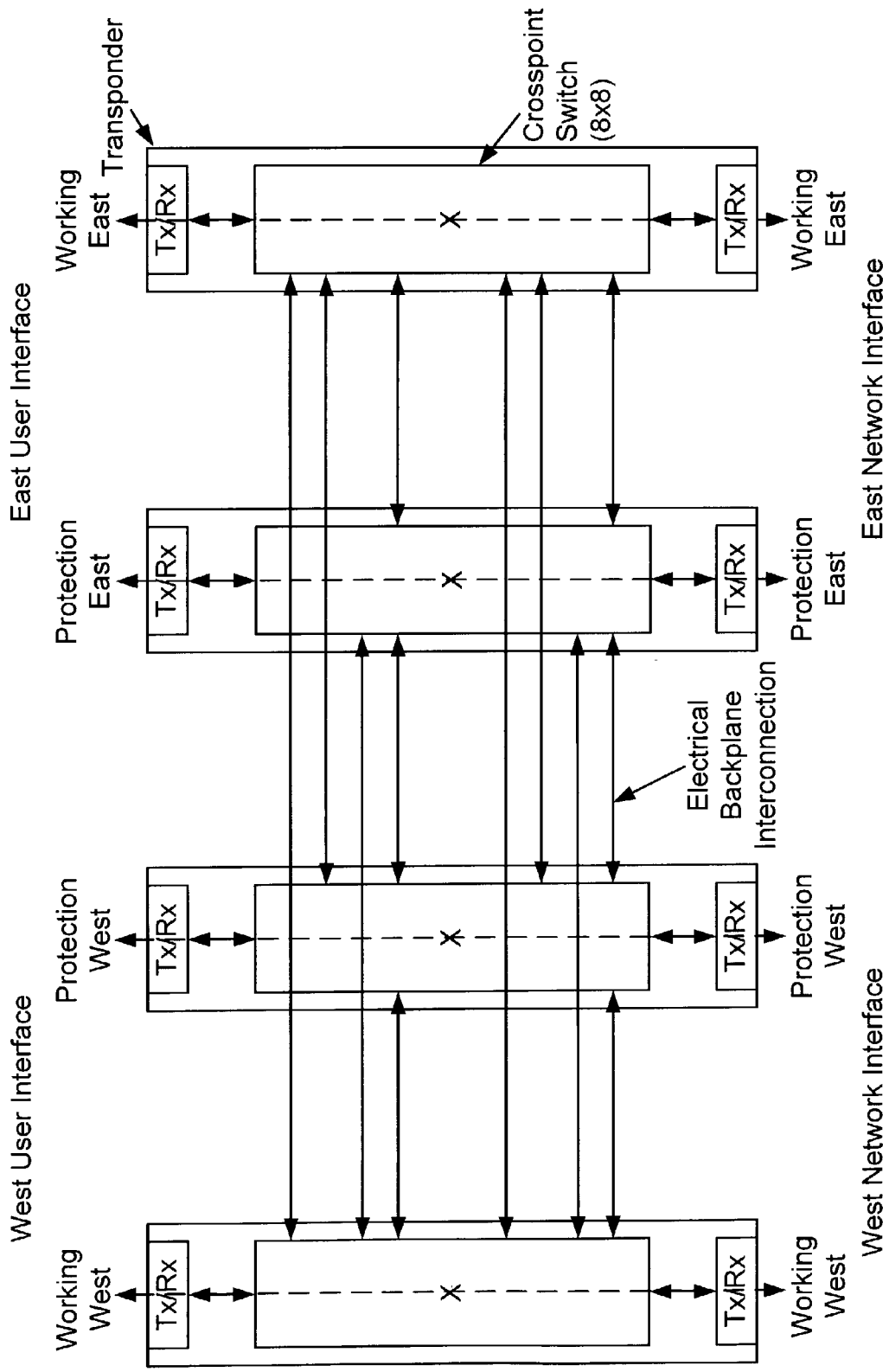
FIG. 35 is a simplified diagram illustrating how the distributed electrical switch shown in FIG. 33 handles the normal situation where the working and the protection access ports are used in accordance with the present invention.

The DPSR protection operations performed by the distributed electrical switch are described as follows. FIG. 35 illustrates the normal situation where the working and the protection access ports are used. There is no failure in the network that requires this specific node to provide protection support.

Figure 36:
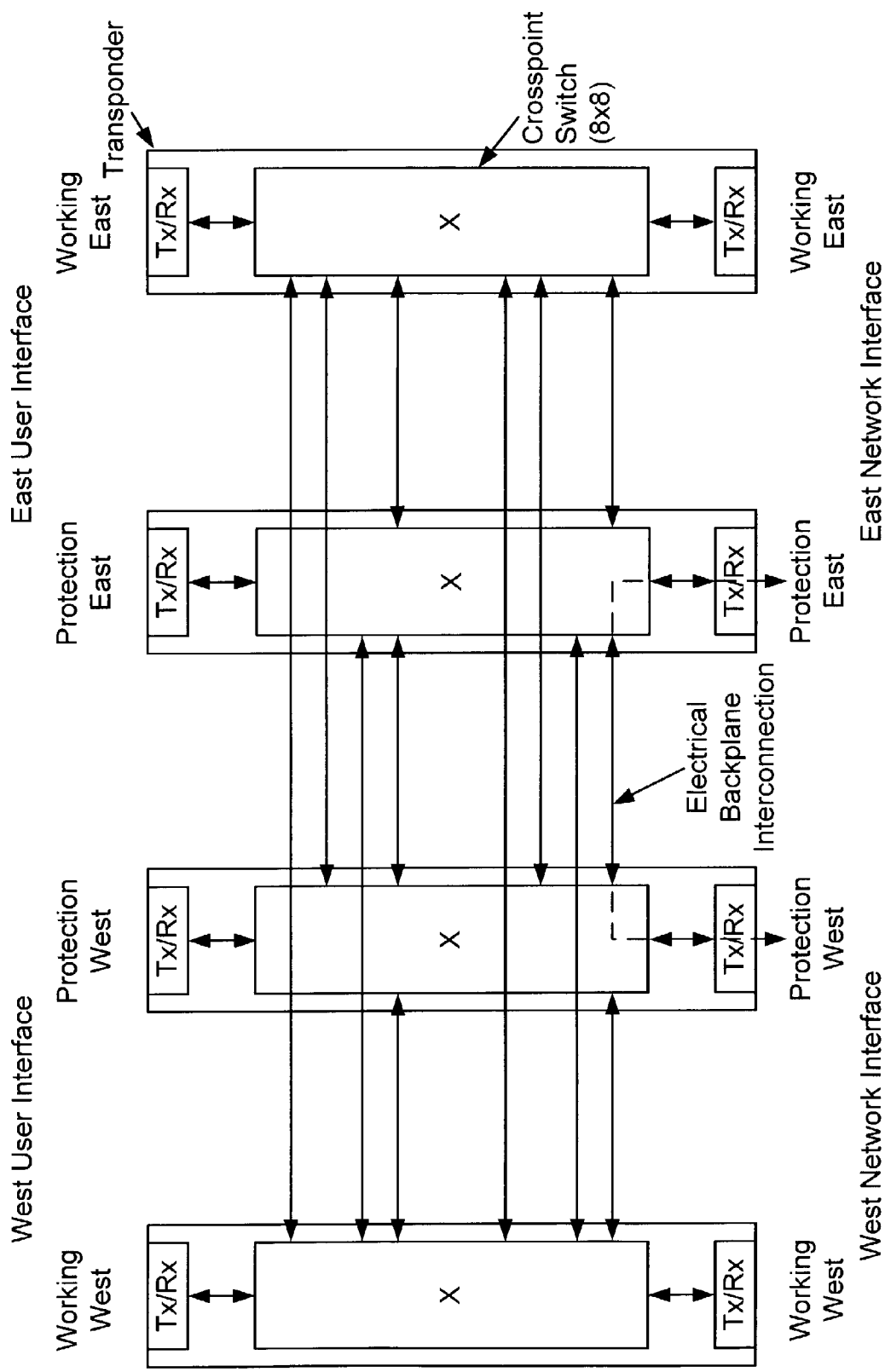
FIG. 36 is a simplified diagram illustrating how the distributed electrical switch shown in FIG. 33 and located in an intermediate node handles a bridge request on the protection channel during a failure in accordance with the present invention.

FIG. 36 illustrates an exemplary embodiment of an intermediate node during a failure. The protection transponder is switched to connect the east and the west protection channels to place them in tandem (bridge). The protection ring is closed thereby providing a protection path for the working channel under a failure situation.

Figure 37:
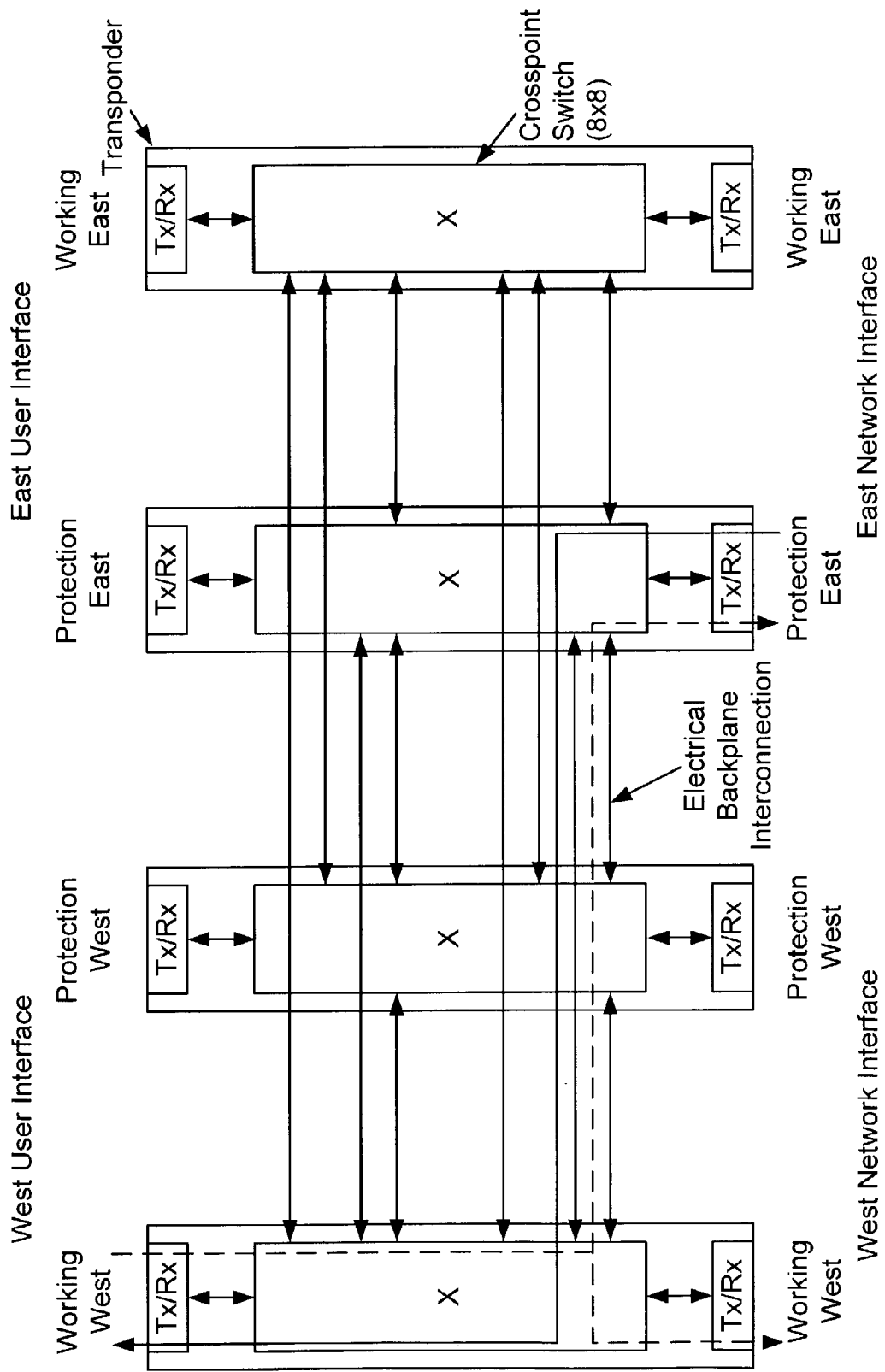
FIG. 37 is a simplified diagram illustrating how the distributed electrical switch shown in FIG. 33 handles a failure situation of the working channel and the protection channel on the west side in accordance with the present invention.

FIG. 37 illustrates a failure situation of the working channel and the protection channel on the west side. In this situation, a switch to the protection channel on the opposite side of the ring is requested. The traffic from the user interface is bridged on both the working channel and the protection channel on the opposite side and only the protection channel is selected.

Figure 38:
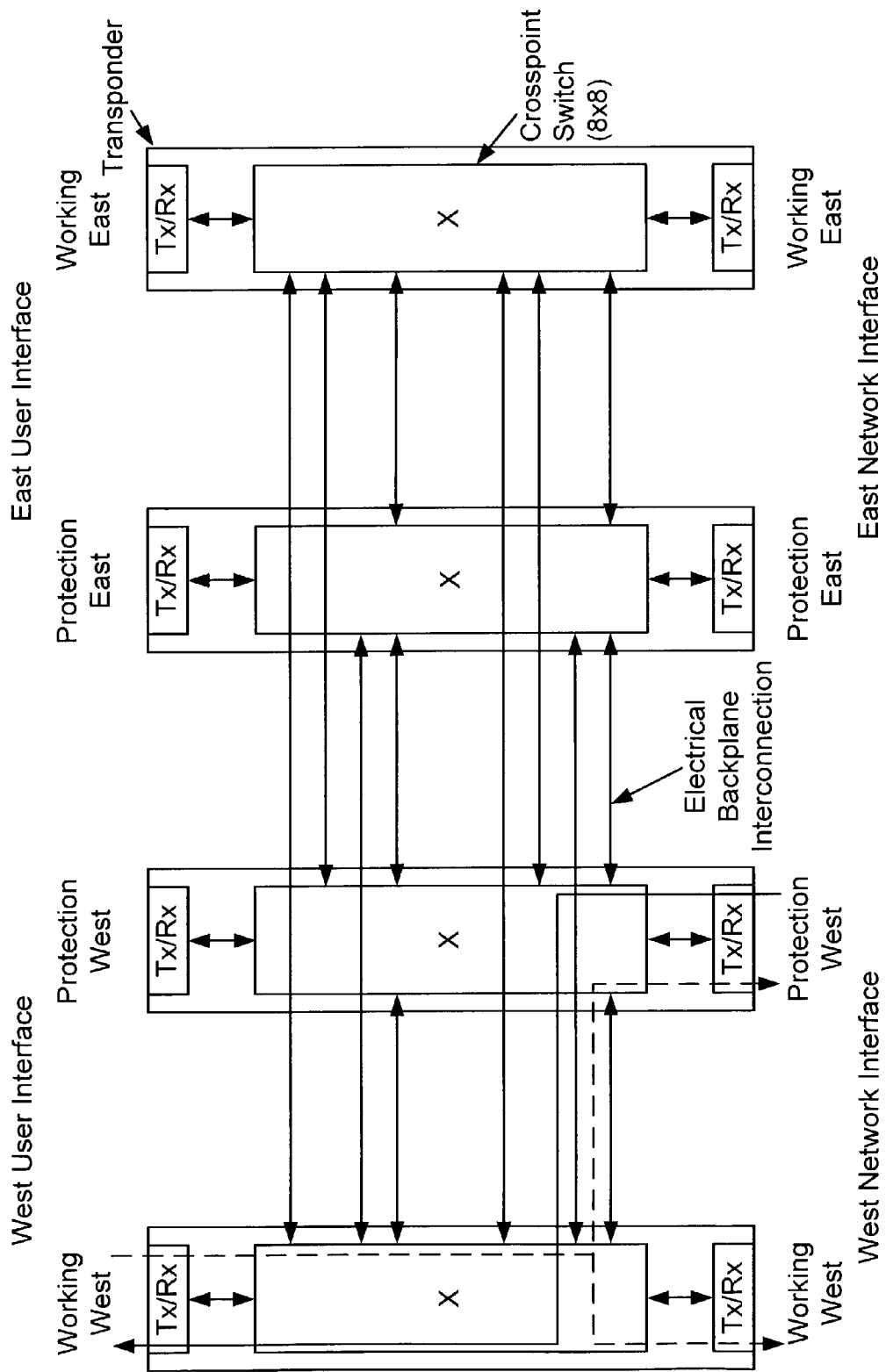
FIG. 38 is a simplified diagram illustrating how the distributed electrical switch shown in FIG. 33 handles a failure condition of the working channel in accordance with the present invention.

FIG. 38 illustrates a failure condition of the working channel only. Under this condition, the traffic from the user interface is bridged on both the working channel and the protection channel of the same side and only the protection channel is selected.

(ii)(b) Implementation as an Overlay to O-UPSR

Figure 39:
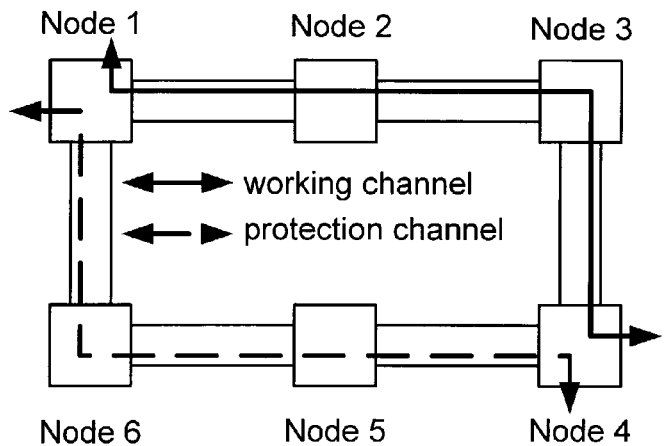
FIG. 39 is a simplified diagram illustrating an exemplary embodiment of a O-UPSR network in normal mode.

Another embodiment of the distributed electrical switch can make use of existing Optical Unidirectional Path Switch Ring (O-UPSR) technology and overlay a BPSR network on top of an existing O-UPSR ring. FIG. 39 illustrates an exemplary embodiment of a O-UPSR network in normal mode. The O-UPSR network has a dedicated path diversely routed around the ring. The protection bandwidth is not shared as with O-BLSR or O-BPSR. Thus, there is no switching on the line side. The terminal transceiver is responsible for making a choice as to which signal is the better of the two dedicated paths.

Figure 40:
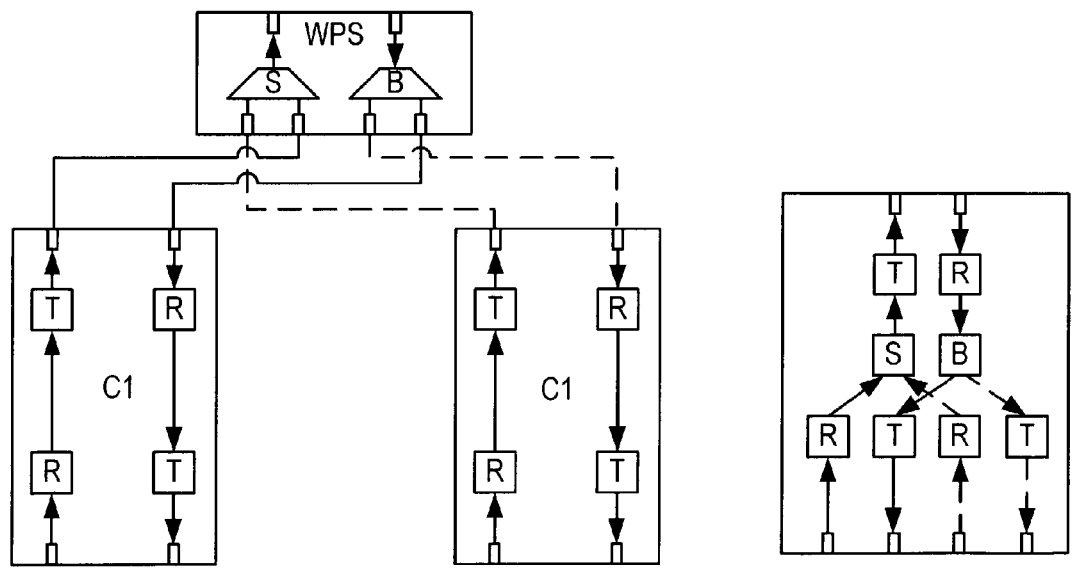
FIG. 40 is a simplified diagram illustrating how an O-UPSR working-protect splitter is used to implement the distributed electrical switch in accordance with the present invention.

In one implementation of a O-UPSR optical service, there are two transceivers at the terminal node: one for the working channel and one for the protection channel. The two transceivers compare signal quality and choose the better signal from the two transceivers to pass to the tributary port either optically or electrically. The working-protect splitter then sends one signal to the client on the tributary port. This is illustrated in FIG. 40.

In another implementation the two transceivers can be either combined or connected before the tributary transceiver and performs the working-protect splitter function before the tributary transceiver. This is also illustrated in FIG. 40.

Both implementations of the O-UPSR switching will perform the ring-switch modes for normal (as shown in FIG. 10) excluding the protection access, ring-switch east (RS-E) as shown in FIG. 12 and ring-switch west (RS-W) as shown in FIG. 11, which only leaves BPSR bridge ring-switch mode to be supported.

Figure 41:
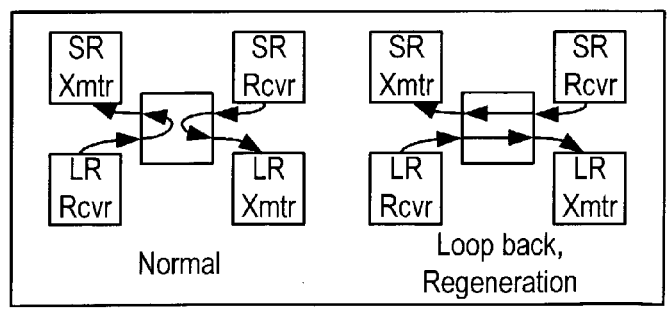
FIG. 41 is a simplified diagram illustrating how an O-UPSR working-protect splitter is used to implement the distributed electrical switch to provide a bridge ring-switch mode in accordance with the present invention.
Figures 42, 43:
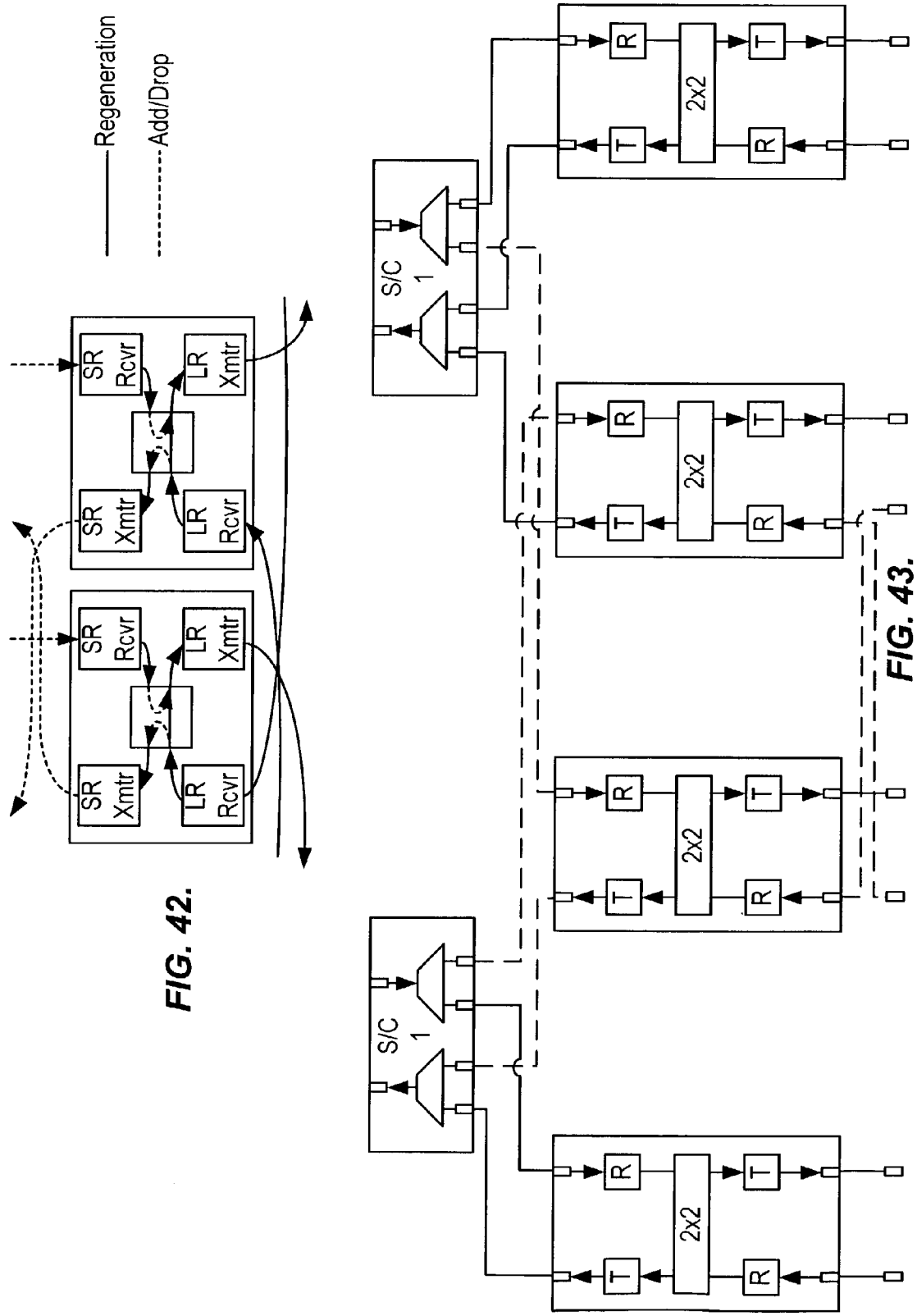
FIG. 42 is a simplified diagram illustrating how to implement crossover add/drop regeneration using O-UPSR in accordance with the present invention.
FIG. 43 is a simplified diagram illustrating how to implement the distributed electrical switch using O-UPSR and crossover add/drop regeneration in accordance with the present invention.

The bridge ring-switch mode only requires the normal ring-switch mode as shown in FIG. 10 with protection traffic passing through. Since the protection transceivers are already there to be used with the O-UPSR working-protect splitter function, the traffic needs to be switched between these two transceivers or, in one implementation, use an electrical switch in each transceiver to either loopback or pass through the traffic as shown in FIG. 41. This feature with a cross-over pairing of fibers allows the transceiver to be used as an electrical pass through (regeneration) or as an add/drop, as illustrated in FIG. 42.

Combining a method of O-UPSR protection switching and the crossover add/drop regeneration allows the O-USPR equipment to be configured as a O-BPSR switch. This is illustrated in FIG. 43.

Figure 44:
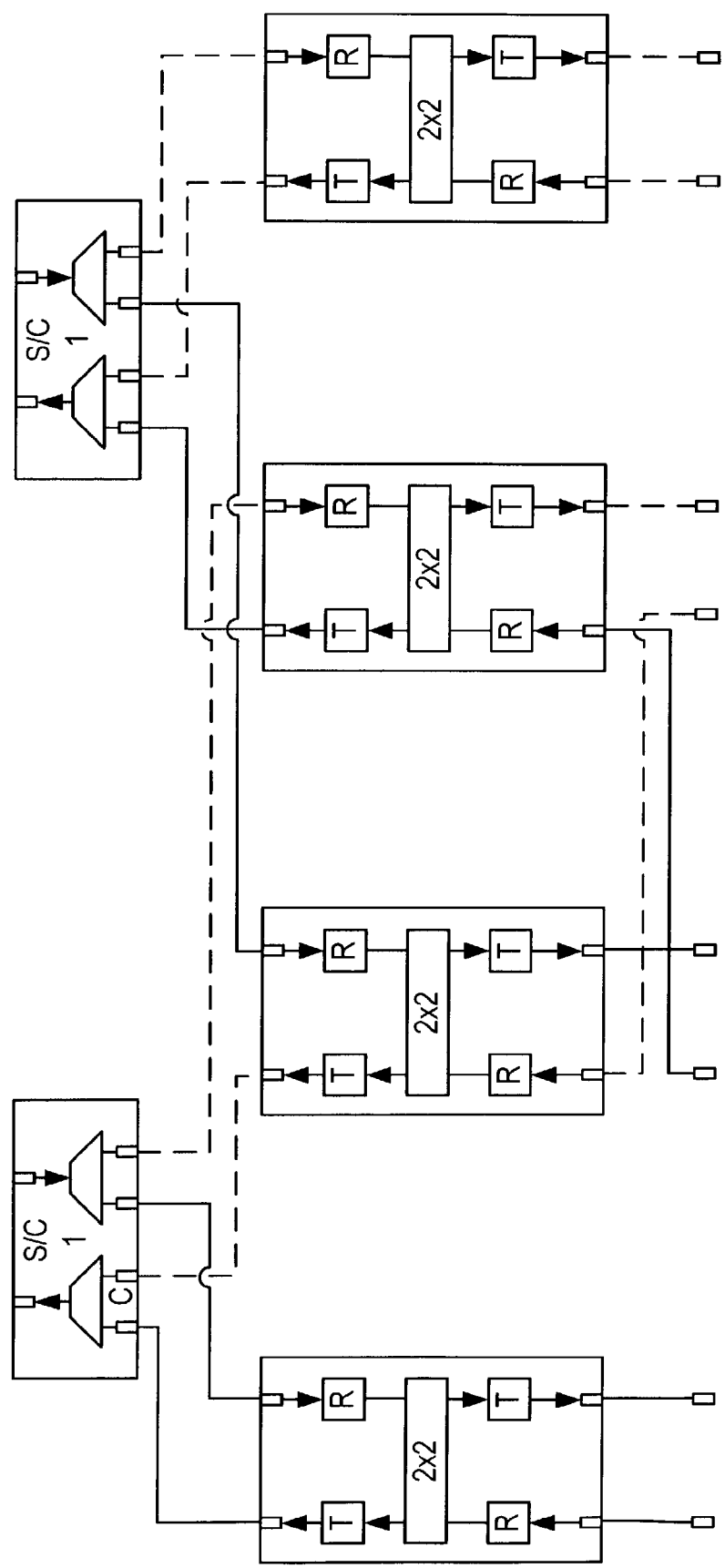
FIG. 44 is a simplified diagram illustrating how to implement the ring-switch west mode of the distributed electrical switch using O-UPSR and crossover add/drop regeneration in accordance with the present invention.

When a link fails, the O-BPSR switch will change to a ring-switch mode at the terminal ends of the service as shown in FIG. 44. Using this O-UPSR equipment in this configuration can thus create a BPSR switch and allow a BPSR network to be overlaid on top of an O-UPSR network.

Physical Implementation of Optical Switching

The optical switching functions required to implement the BPSR protection mechanism are implemented using two techniques. The first technique is to centralize the switching functions in a switch module and to interconnect the transmission equipment to the switch module. The second technique is to distribute the switching functions through the wavelength channel access (WCA) and the protection channel access (PCA) equipment. These two techniques will be described with reference to switching equipment which is implemented under the optical approach.

(i) Centralized Optical Implementation

The centralized implementation is realized using a protection module. The protection module provides the necessary switching functions to implement the BPSR protection mechanism. To implement the BPSR protection, the centralized implementation includes two modules. The partitioning used to implement the switching functions into the protection switch module (PSM) provides fault resilience to a failure of one module.

Figure 45:
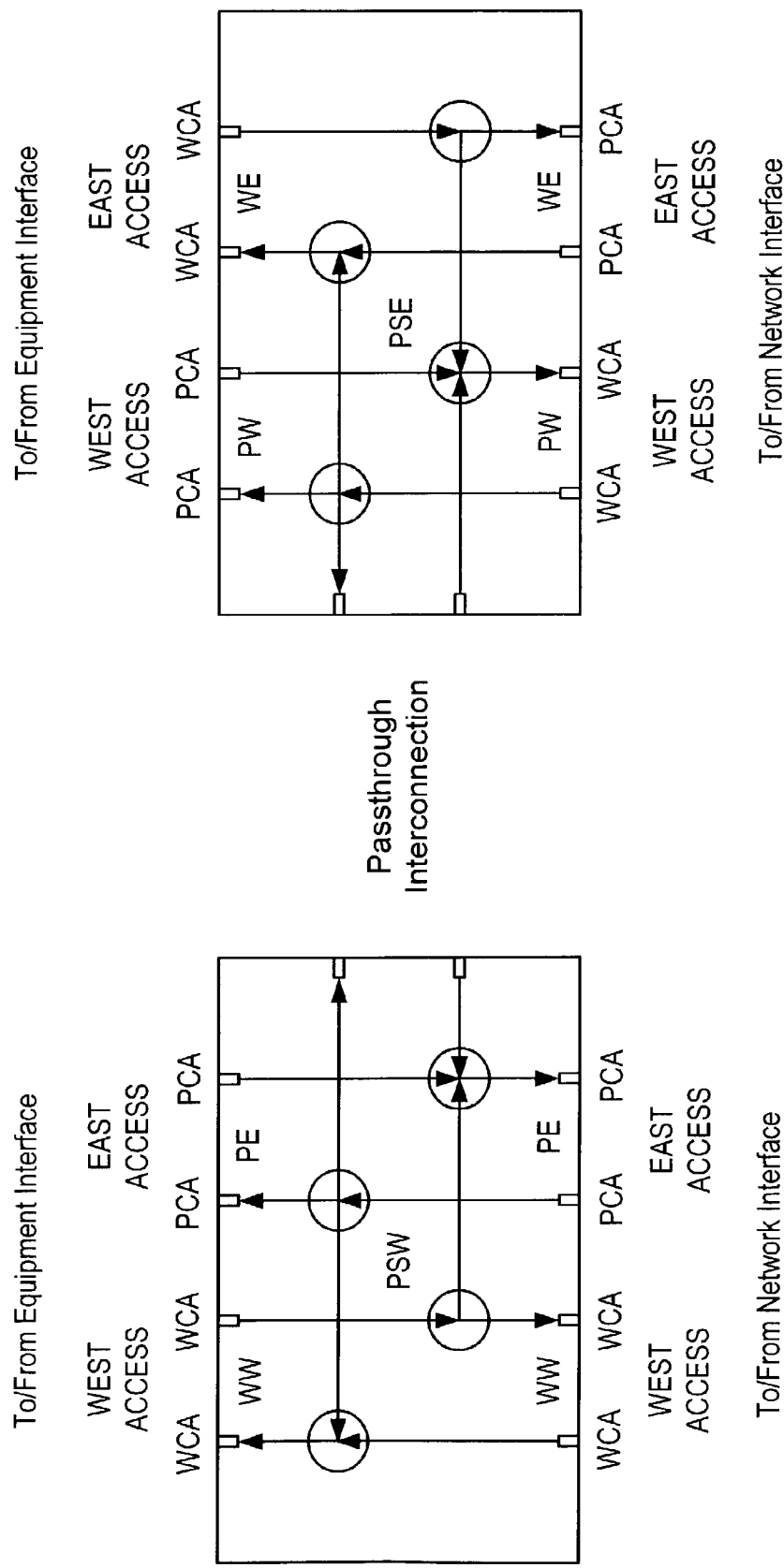
FIG. 45 is a simplified diagram illustrating an exemplary embodiment of the protection switch module in accordance with the present invention.
Figure 46:
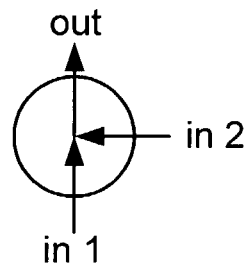
FIG. 46 is a diagram showing the term definitions used in connection with FIG. 45.
Figure 46:
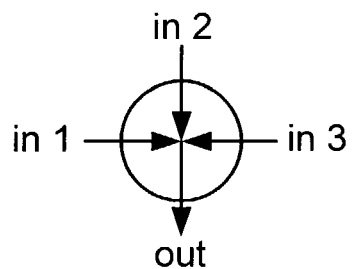
Figure 46:
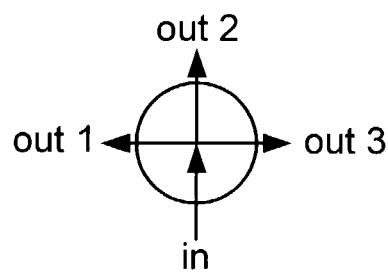
Figure 46:
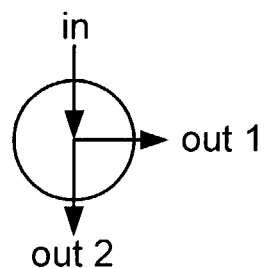
Figure 46:
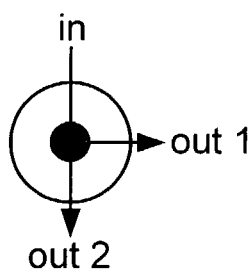

FIG. 45 illustrates an exemplary embodiment of the protection switch module implemented using optical switches in accordance with the present invention. The symbols and the acronyms shown in FIG. 45 are described in FIG. 46. The protection switch module can be implemented using either multiple 1×2 optical switches or a larger single optical switch. The protection switch module is partitioned into two modules to provide fault tolerance. The protection switch module provides access to the working channel and to the protection channel for PCA purpose. The protection switch module also provides access to the protection channel for PCA purposes. A reduced protection switch module can be implemented if protection access channel is not supported on the "To/From Equipment Interface". The protection switch module is able to perform the following protection operations, namely, (1) no failure condition, (2) bridge of protection, and (3) protection on opposite side.

Figure 47:
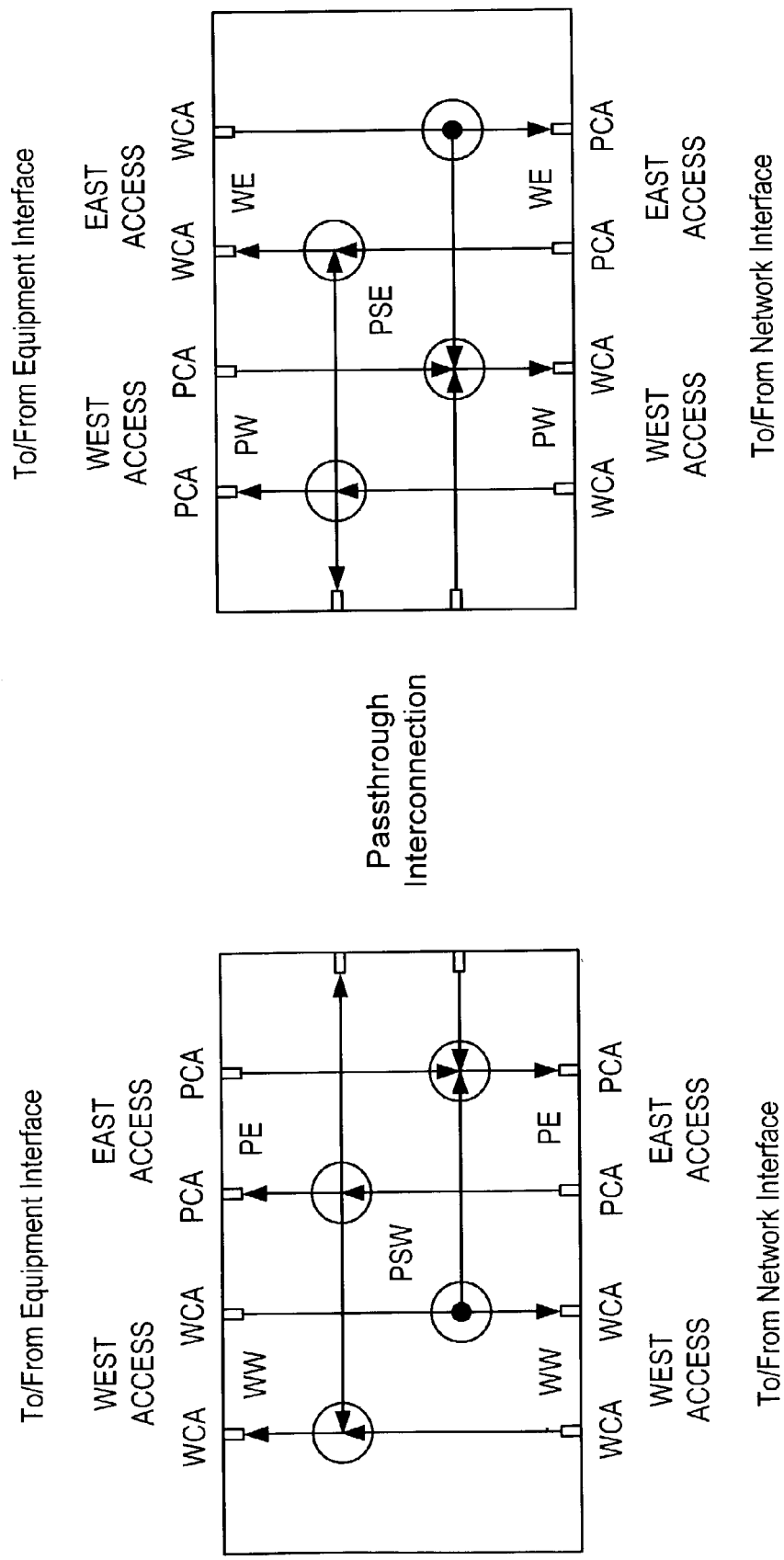
FIG. 47 is a simplified diagram illustrating a second exemplary embodiment of the protection switch module in accordance with the present invention.

FIG. 47 illustrates another exemplary embodiment of the protection switch module in accordance with the present invention. In this embodiment, instead of switching the outgoing traffic on the network for the WCA, the traffic is bridged on the working channel and on the protection channel. This provides the capability to use in-band signaling and to revert the traffic from the working channel.

Figure 48:
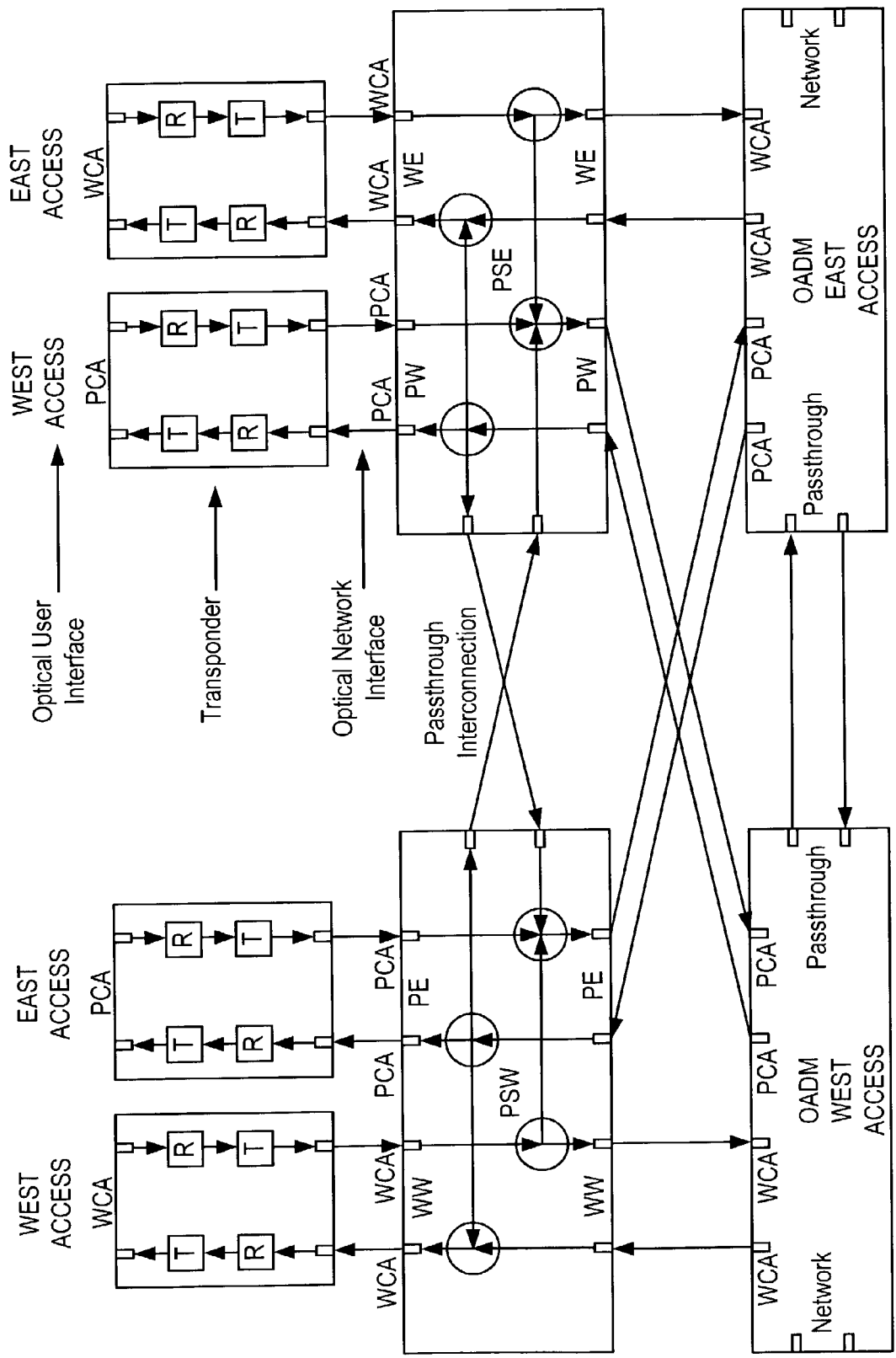
FIG. 48 is a simplified diagram illustrating an exemplary embodiment of system interconnections in accordance with the present invention.

FIG. 48 illustrates an exemplary embodiment of an interconnected system having the protection switch module coupled to the transponders in accordance with the present invention. It should be noted that the protection switch module provides BPSR for the traffic that has been accessed at the node. Hence, another assembly of the system can place the protection switch module between the band optical filter and the channel optical filter to provide switching of all the traffic that is dropped at the node using only two protection switch modules.

Referring to FIG. 48, two protection switch modules are used to provide working access from both the east and the west side. The transponders providing access to PCA are optional. If PCA is not used, the transponders are not needed and no interconnection changes need to be made to the two protection switch modules. In a failure situation relating to the working channel on the west network side, the protection switch module will select the protection traffic from the east side. If a bridge request is needed for the protection channel, both protection switch modules will select the passthrough interconnections between them to provide the passthrough of the PE to/From PW.

Figure 49:
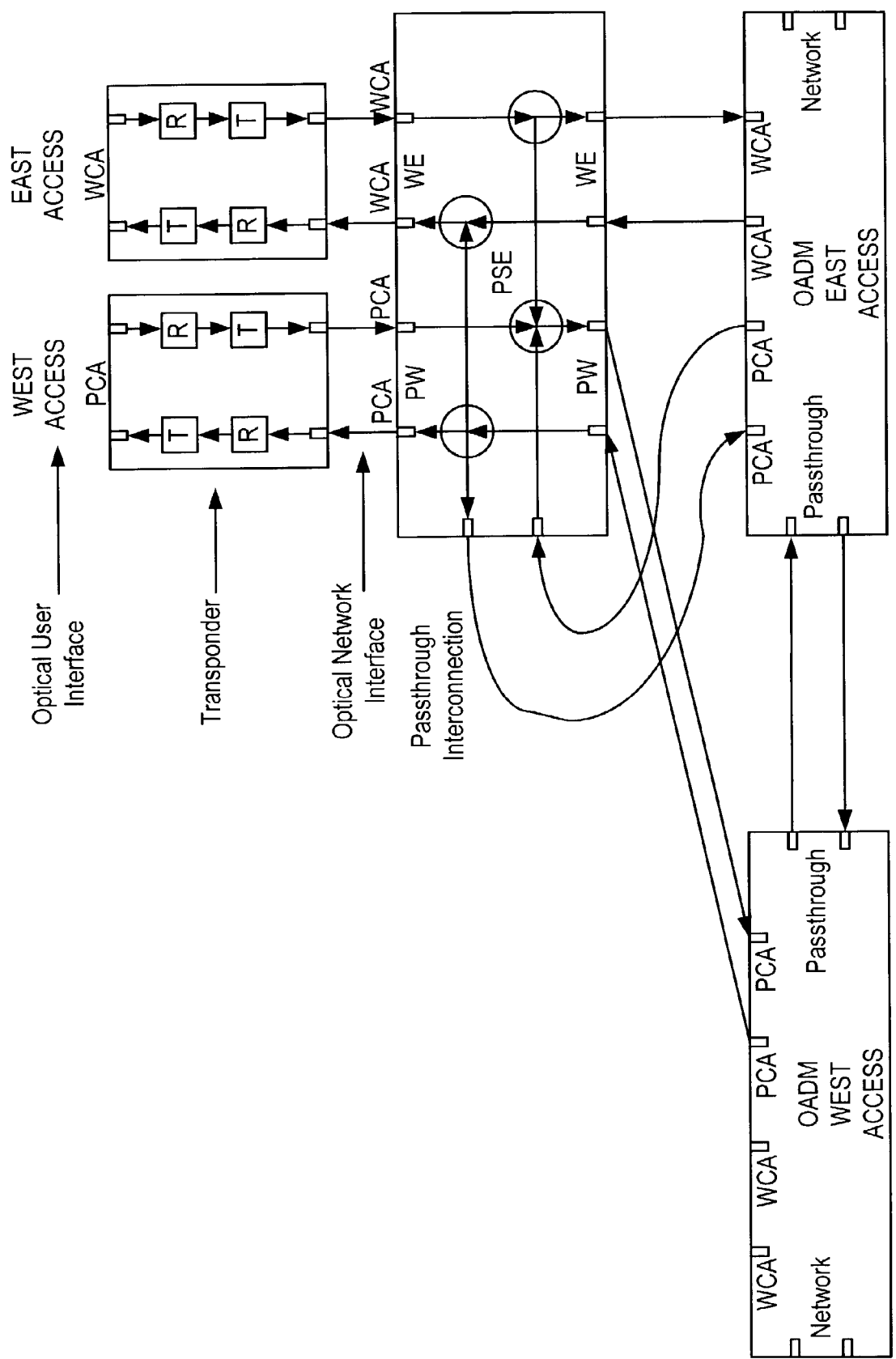
FIG. 49 is a simplified diagram illustrating an exemplary embodiment of system interconnections providing working east access in accordance with the present invention.

FIG. 49 illustrates an exemplary embodiment of an interconnected system when only the east side of the network is needed. Again, in this situation, the transponder for the PCA is optional. The protection switch module and the transponder represent single points of failure in the system. If one protection switch module fails, the traffic supported by such module will be lost. There are two ways to protect against this type of failure. If the customer equipment provides protection and the working and the protection transponders are used to access the same segment of the ring, then the failure of either one of the protection switch modules or one of the transponders will be protected.

If the customer equipment only uses a single pair of optical fibers, then the O-UPSR splitter card can be used to connect the customer equipment to the working and the protection transponders that use the same segment in the ring.

(ii) Distributed Optical Implementation

In the distributed optical implementation, the optical switching functions are associated with each transponder, either physically implemented on the transponder itself, or physically separate but logically associated with the transponder. In either case, the combined function includes not only the transponder function of converting the tributary wavelength to the line (DWDM) wavelength, but also the switching functions needed to implement the BPSR protection switching. The switching functions provide protection for the traffic carried by the local transponder and support for protection of the traffic transported by another transponder sharing the same wavelength on the ring. The transponder is able to perform the following protection operations, namely, (1) no failure condition, (2) bridge of protection, and (3) protection on opposite side.

The switching functions are implemented in one of two ways. One way to implement the switching functions is to use a switch architecture that provides the ability to open the protection ring so no traffic will pass from the protection port (P) to the expansion port (E). Another way to implement the switching functions is to use a 2×2 optical switch.

Figure 50:
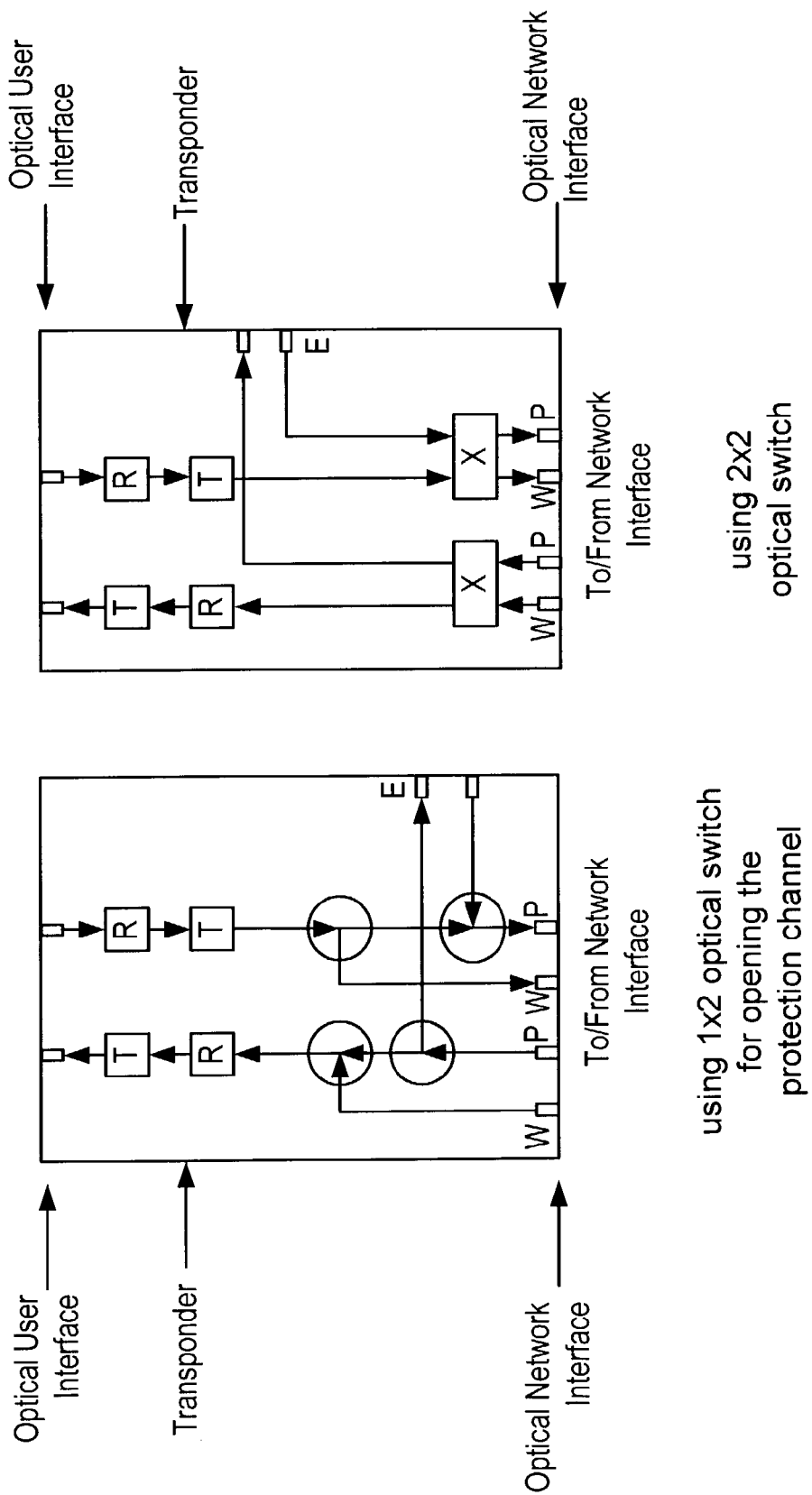
FIG. 50 is a simplified diagram illustrating exemplary embodiments of a transponder having switching functions incorporated therein in accordance with the present invention.

FIG. 50 illustrates an exemplary embodiment of a transponder with optical switching functions in accordance with the present invention. The transponder includes a number of switches. The switches allow selection to be made between two sets of signals on the optical network interface: a working connection (W) and a protect connection (P). The switches also provide a pass-through connection through an expansion port (E) to allow the protected traffic to bypass the transponder, thereby providing the bridge connection to the protecting wavelength during a bridge request.

Figure 51:
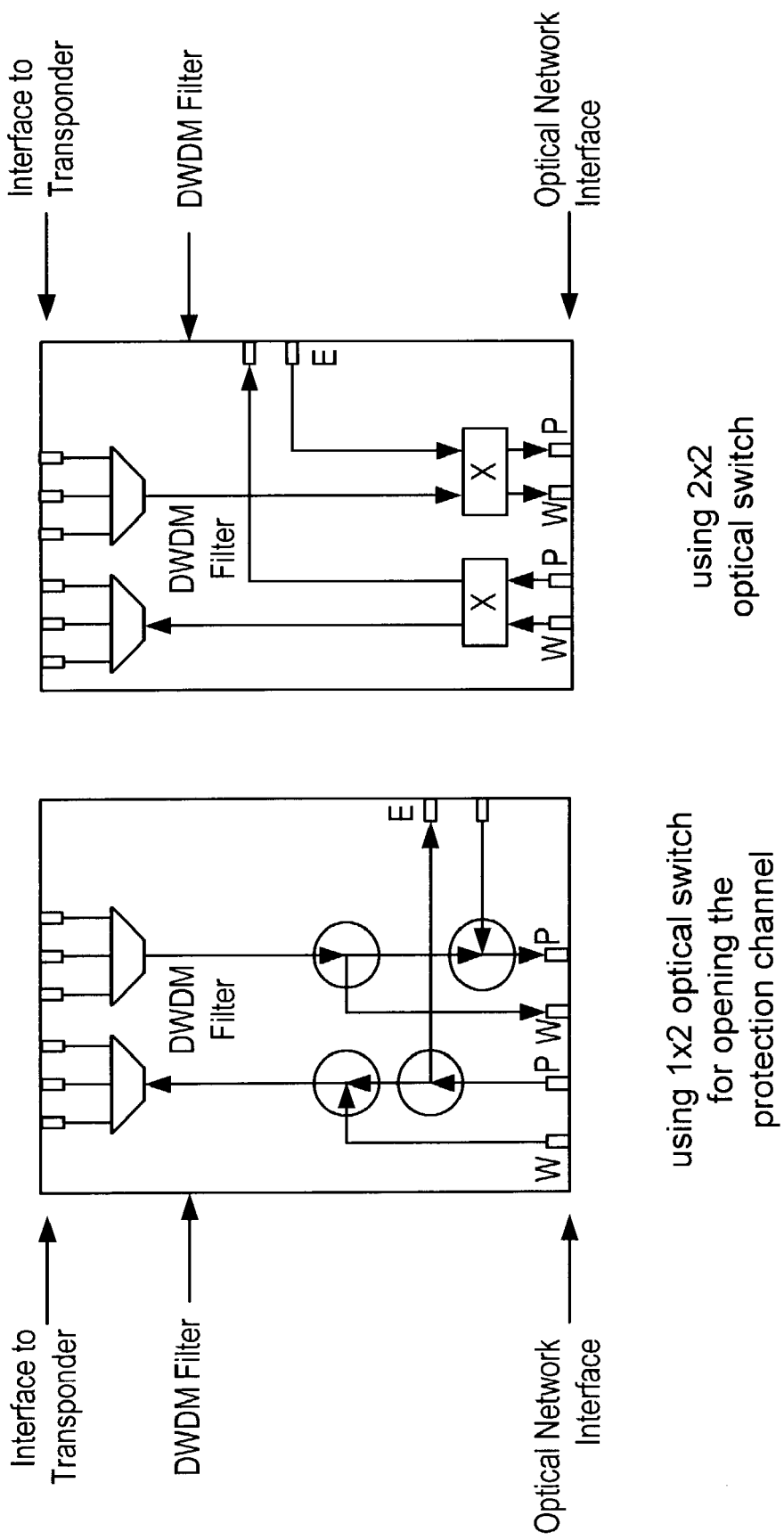
FIG. 51 is a simplified diagram illustrating exemplary embodiments of a DWDM filter having switching functions incorporated therein in accordance with the present invention.

The BPSR can also be implemented to support a group of wavelengths if the switching functions are located next to a layer of optical demultiplexing. If the AODM provides a first layer of demultiplexing and multiple wavelengths on its interface instead of one wavelength, then the switching functions can be implemented in conjunction with the DWDM filter. FIG. 51 illustrates the two switching implementations using the DWDM filter module.

Figure 52:
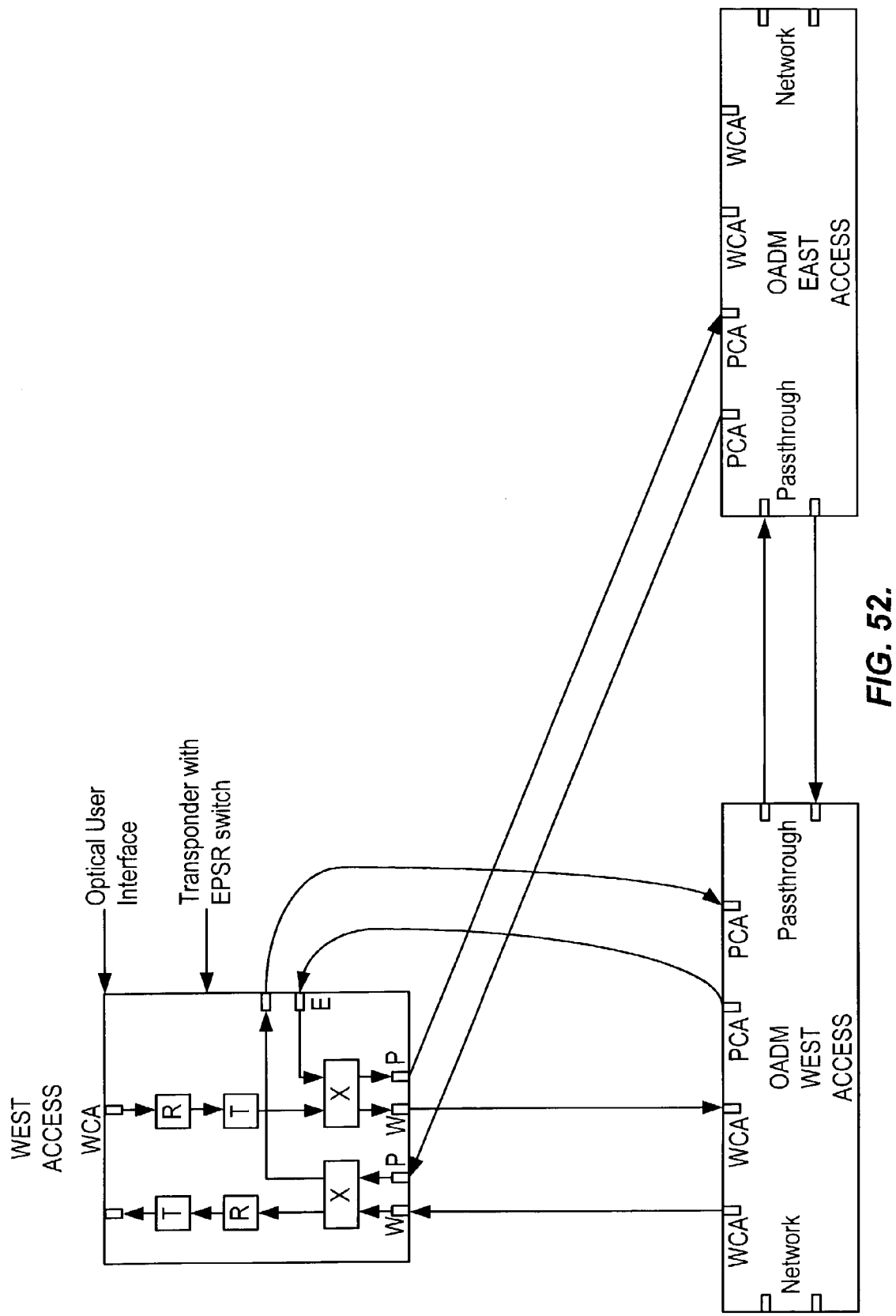
FIG. 52 is a simplified diagram illustrating an exemplary embodiment of system interconnections providing WCA on the west side in accordance with the present invention.

FIG. 52 illustrates an exemplary embodiment of the transponder having switching functions incorporated therein being coupled to other system equipment in accordance with the present invention. It should be understood that the transponder as shown in FIG. 52 can be replaced by a DWDM filter module.

FIG. 52 further illustrates interconnections for WCA on the west side in a shared-protection configuration in accordance with the present invention. As shown in FIG. 52, only the WCA of the west side is provided. It should be noted that when the transponder is not in the protection-switched mode (i.e., the optical switches are not directing the protection path to the internal transmitter/receiver), the protection path is directed to optically pass through the transponder. This pass-through capability provides the ability to share the protection capacity with other such transponders on the same wavelength.

Figure 53:
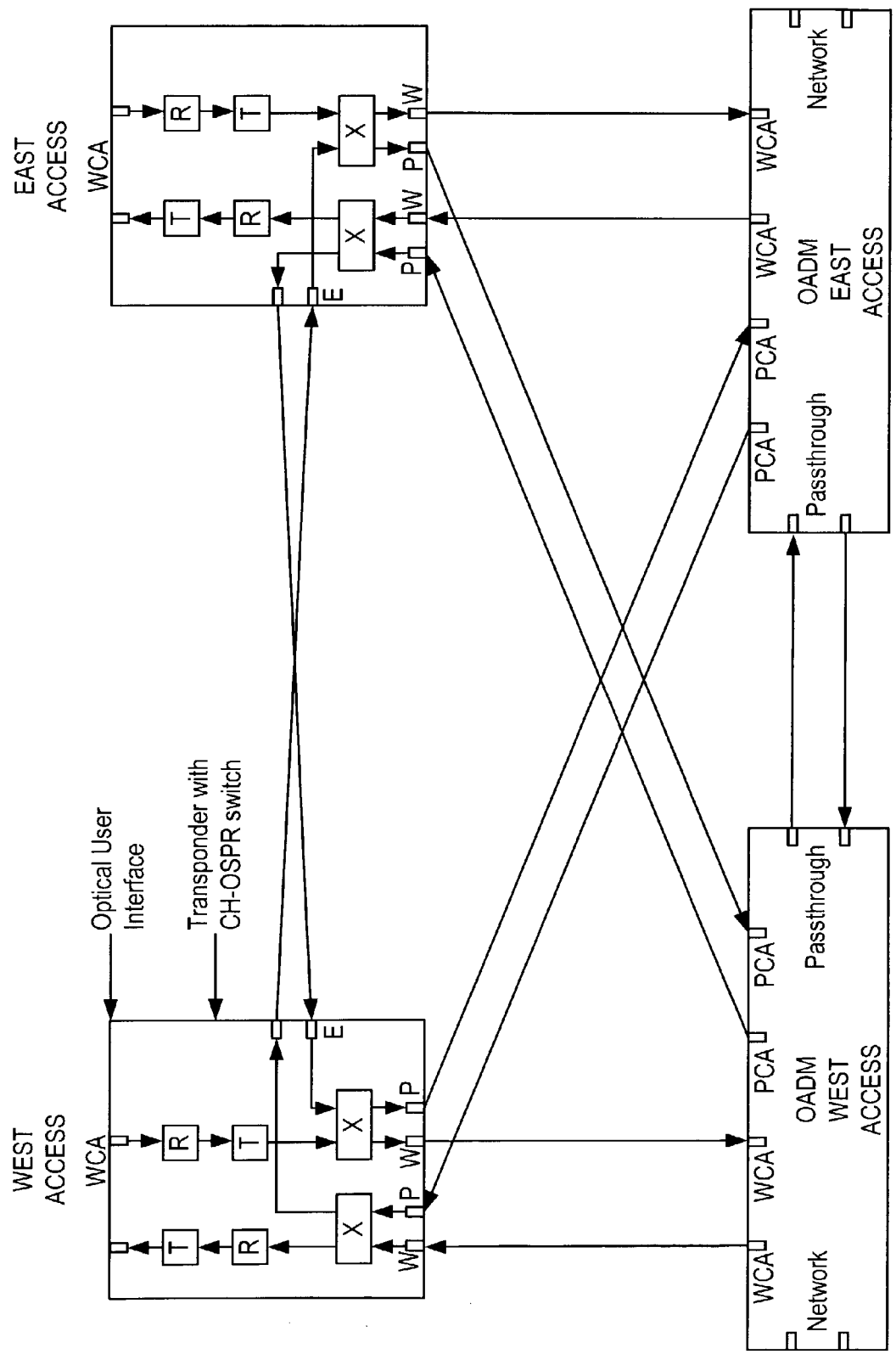
FIG. 53 is a simplified diagram illustrating an exemplary embodiment of system interconnections providing WCA on the east and the west side in accordance with the present invention.

FIG. 53 illustrates interconnections for WCA on both the east and the west side in a shared-protection configuration in accordance with the present invention. As shown in FIG. 53, two transponders are located in the node. In this case, each transponder terminates the WCA traffic, but in a different direction: the left-most transponder terminates traffic from a neighboring node to the west of the node, and the right-most transponder terminates traffic from a neighboring node somewhere to the east. Again, when both transponders are not in the protection-switched mode, then the protection capacity can pass through the node optically, to be utilized (if needed) by other, transponders on the same wavelength.

Figure 54:
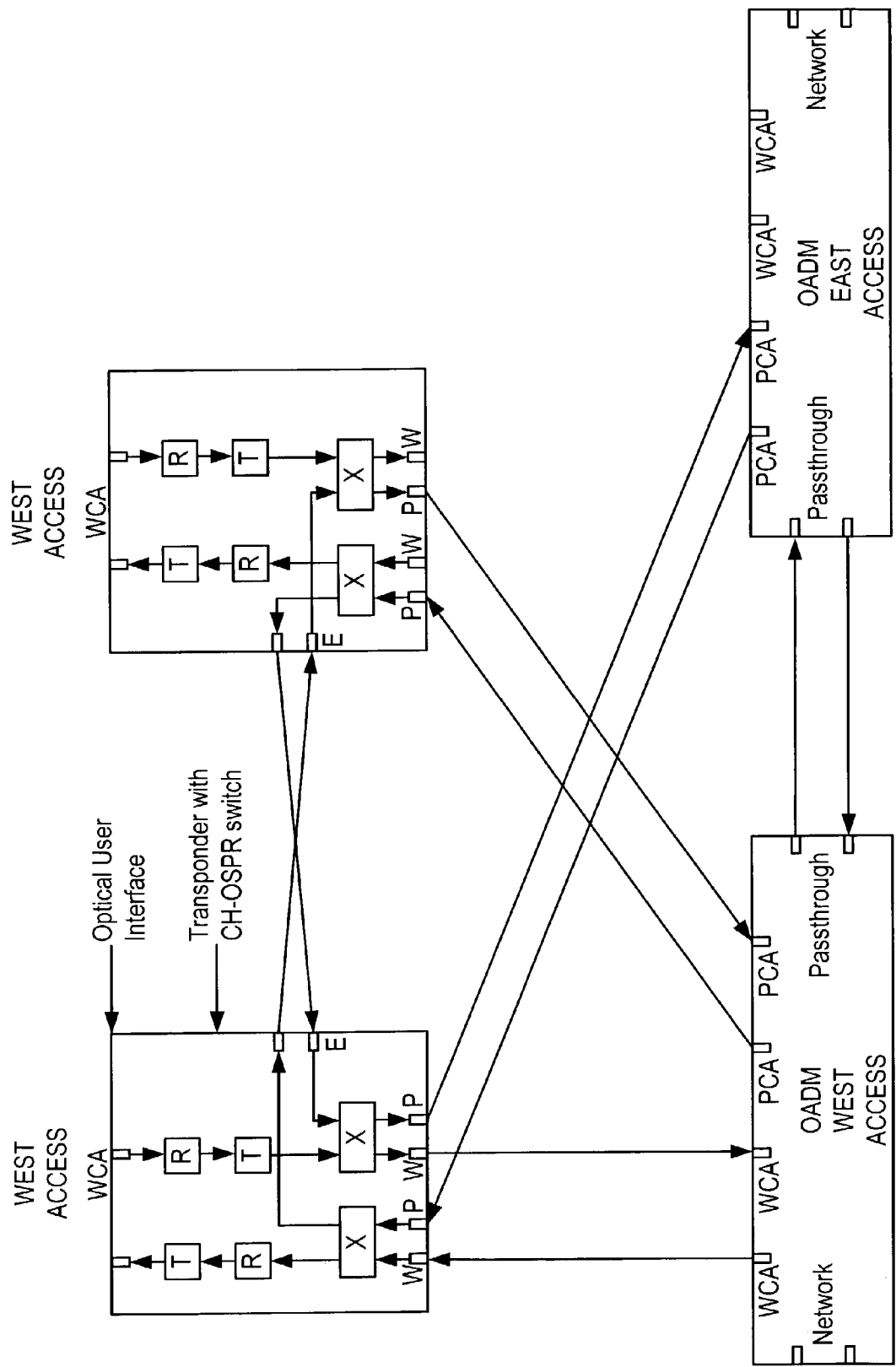
FIG. 54 is a simplified diagram illustrating an exemplary embodiment of system interconnections providing WCA and PCA in accordance with the present invention.

FIG. 54 illustrates interconnections for WCA and PCA in accordance with the present invention. As shown in FIG. 54 PCA traffic is provided at the node. The PCA and the WCA provide access to the west of the node. If a failure occurs on the ring and affect the WCA traffic, the WCA transponder will perform a switch on the opposite direction causing the PCA traffic to be dropped. If the failure does not affect the WCA traffic on that node, the PCA transponder will drop its traffic and bridge the protected wavelength.

The PCA is connected to the protection wavelength and provide extra traffic. The node can include four (4) transponders to provide two (2) WCA (east and west) and two (2) PCA (east and west). The PCA traffic will be pre-empted during a protection-switching operation.

Figure 55:
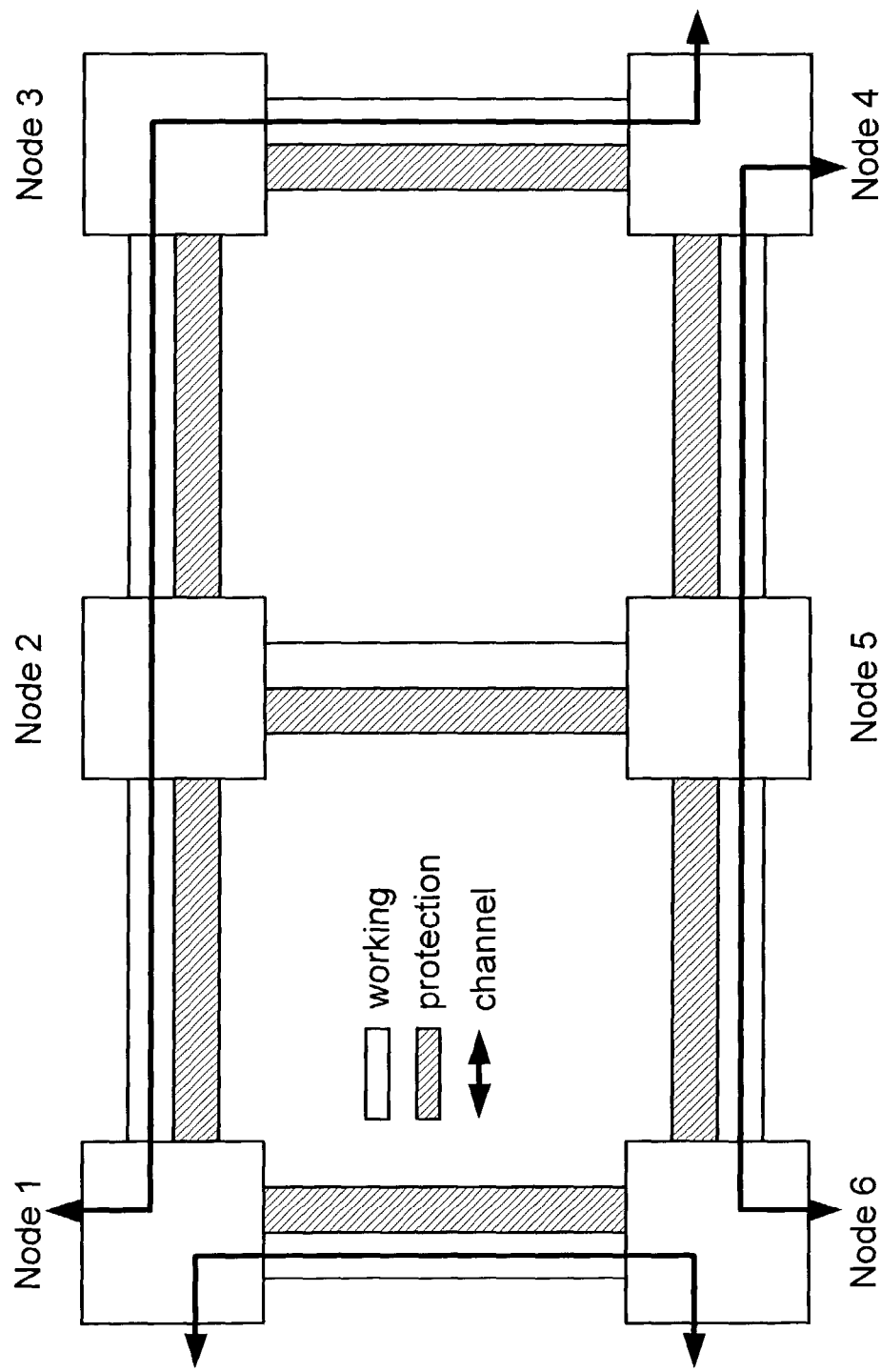
FIG. 55 is a simplified diagram illustrating an exemplary embodiment of two interconnected rings sharing protection bandwidth between two nodes in accordance with the present invention.

According to another aspect of the present invention, while the BPSR switch is most often used and described for a ring configuration, the BPSR switch and the locations at the terminal points of the service can be generalized to any collection of communications paths whether they are in a ring, multiple interconnected rings, or a mesh, as long as there is an identifiable shared protection path for the corresponding working wavelength. Therefore, whether implemented optically or electrically, a network element which is connected to more than two neighboring nodes, as in a mesh or multiple interconnected rings, may send the traffic along a protection path, which is part of a virtual ring, which is defined for each working wavelength. FIG. 55 illustrating an exemplary embodiment of two interconnected rings sharing protection bandwidth between two nodes.

Figure 56:
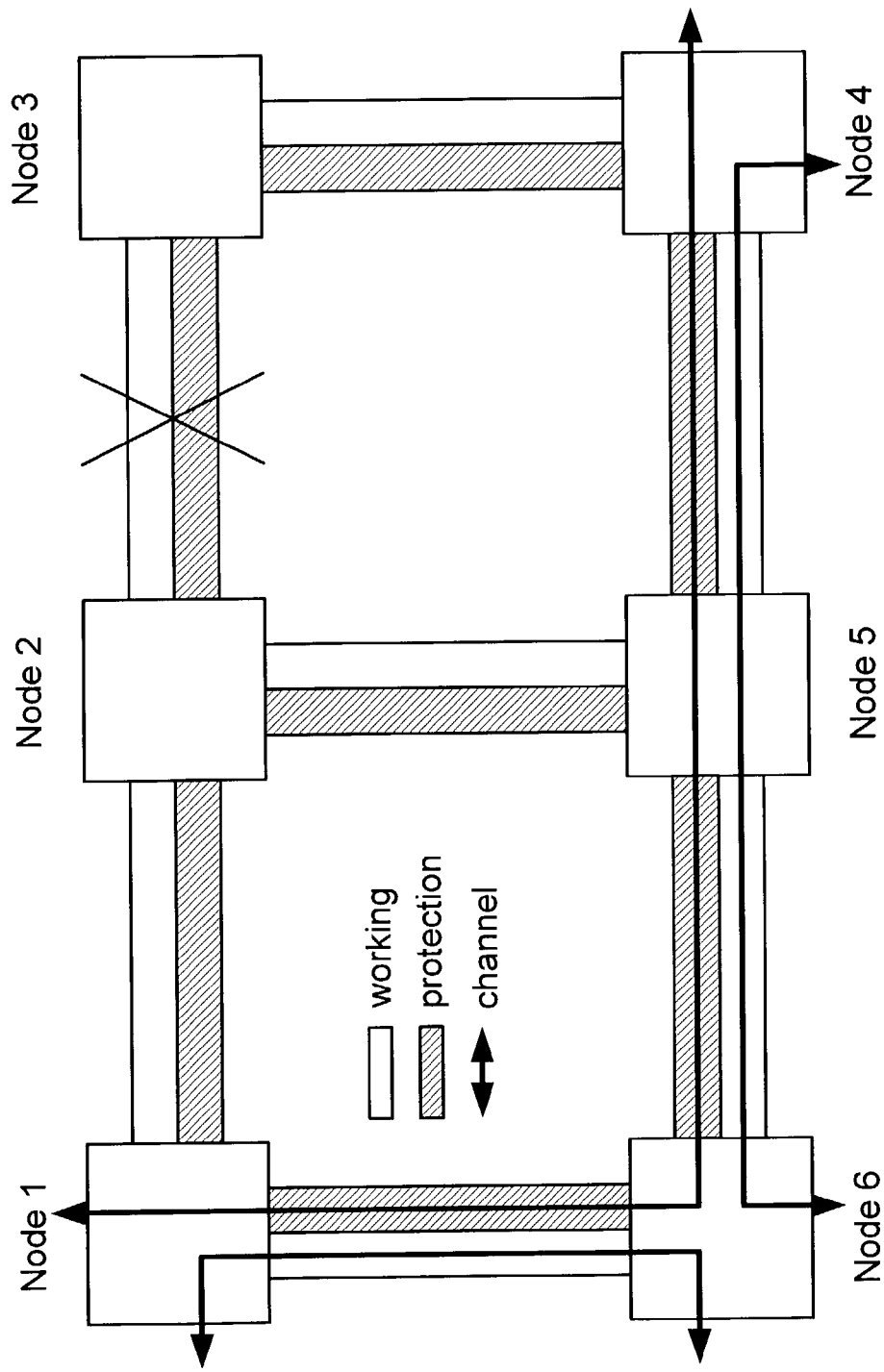
FIG. 56 is a simplified diagram illustrating a situation in which there is a failure between two nodes in the two interconnected rings shown in FIG. 55 where a path is part of a single virtual ring.

FIG. 56 illustrates a situation in which there is a failure between two nodes in the two interconnected rings shown in FIG. 55 where a path is part of a single virtual ring. As shown in FIG. 56, for example, if the path along N1-N2-N3-N4 is part of a single virtual ring N1-N2-N3-N4-N5-N6, then a span failure along N2-N3 is routed along N1-N6-N5-N4.

Figure 57:
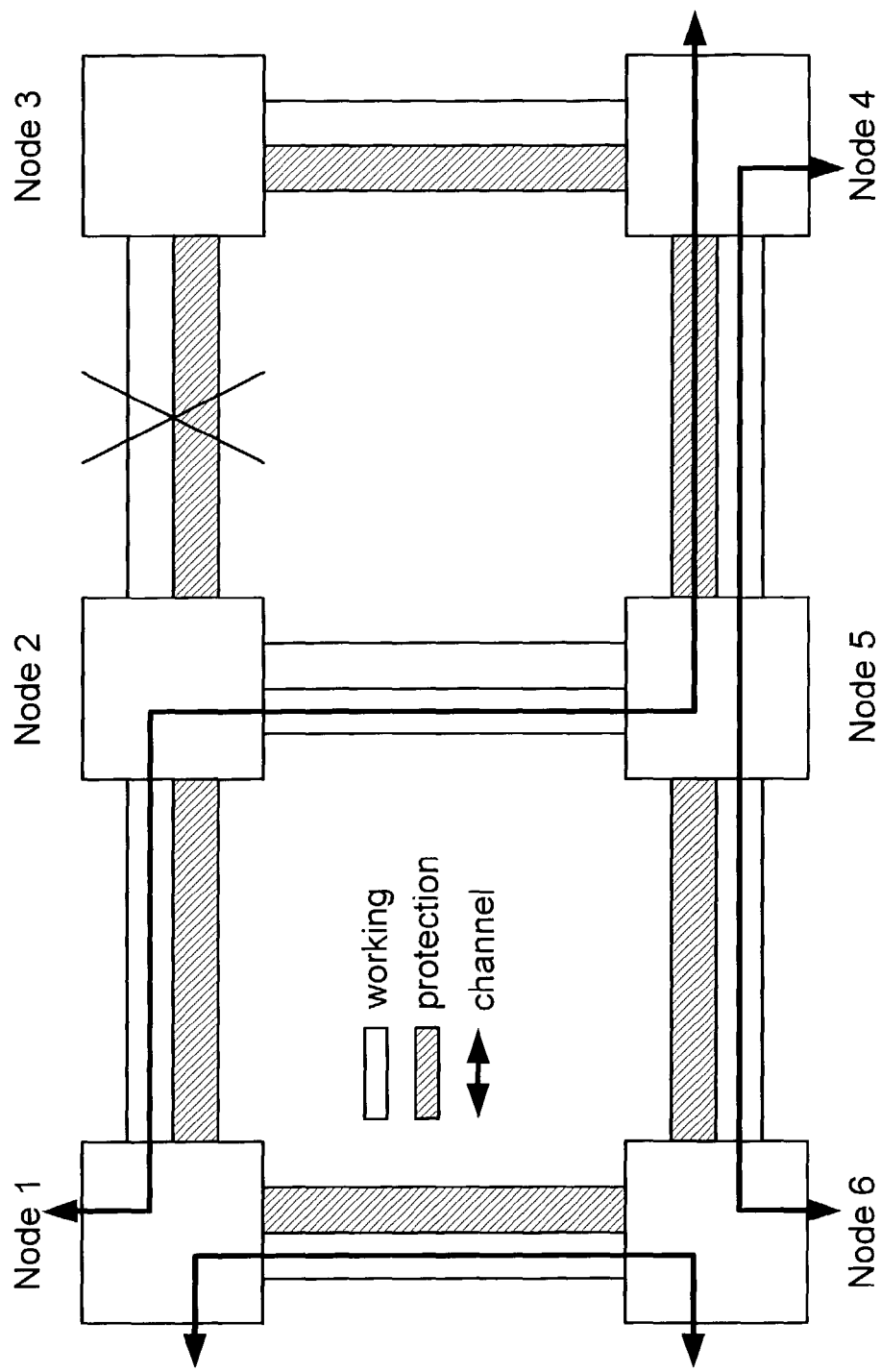
FIG. 57 is a simplified diagram illustrating a situation in which there is a failure between two nodes in the two interconnected rings shown in FIG. 55 where a path is part of two virtual rings.

FIG. 57 illustrates a situation in which there is a failure between two nodes in the two interconnected rings shown in FIG. 55 where a path is part of two virtual rings. As shown in FIG. 57, the path along N1-N2-N3-N4 can also be part of two interconnected virtual rings - ring one N1-N2-N5-N6 contains part of the path N1-N2 and ring two N2-N3-N4-N5 contains the other part of the path N2-N3-4. Then, a failure along the path N2-N3 would reroute only the traffic in the affected ring N2-N3-N4-N5 along the path N2-N5-N4.

COMMUNICATION CHANNEL

According to one aspect of the present invention, in order to support the protection mechanism of BPSR a communication channel is implemented to support the protection switching protocol. The communication channel can be implemented using either in-band signaling or out-of-band signaling.

In-Band Signaling

In in-band signaling, the communication channel is included in the wavelengths used to transport the working and the protection traffic. Since the communication channel uses the wavelength associated with the traffic, the communication channel is aware of the underlying protocol. There are different implementations that can be defined depending on the traffic protocol. For example, for SONET traffic on the wavelength, the communication channel can use the K1/K2 that belong to the SONET signal as a bit oriented protocol or the SONET Data Communication Channel (DCC) as a message oriented protocol, or if the signal is a digital wrapper, it can use the automatic protection switching (APS) bytes as a bit oriented protocol or the Digital wrapper DCC as a message oriented protocol.

Out-of-Band Signaling

In out-of-band signaling, the communication channel is independent of the wavelengths used to transport the working traffic and the protection traffic. For a DWDM system, an additional wavelength is used as a communication channel between the nodes in the ring. Every node in the ring terminates the communication channel, or an "optical supervisory channel" (OSC). The OSC provides support for either a bit-oriented switching protocol or a message-oriented protocol.

It is understood that the examples and embodiments described herein are for illustrative purposes only and that various modifications, alternative constructions, and equivalents in light thereof will become apparent or be suggested to persons skilled in the art and are to be included within the spirit and purview of this application. Therefore, the above description should not be taken as limiting the scope of the invention as defined by the claims.

What is claimed is:

1. A system for re-routing signals from an affected optical path in an optical network, comprising:
    a first node configured to generate a message upon detecting a condition indicating that the signals from the affected optical path need to be re-routed via a protection path to the first node, the first node is further configured to, upon generating the message, reserve a wavelength in the protection path, wherein the wavelength corresponds to the signals from the affected optical path so as to allow the signals from the affected optical path to be re-routed via the protection path;

at least one intermediate node configured to receive the message;

a second node configured to receive the message from the at least one intermediate node and reserve the wavelength in the protection path based on the information provided in the message, the second node is further configured to, upon receiving the message, generate an acknowledgment message to be transmitted to the first node via the at least one intermediate node; and contention control logic configured to resolve priority between the message and a second message with respect to reserving the wavelength in the protection path.

2. The system according to claim 1 wherein the at least one intermediate node is further configured to reserve the wavelength in the protection path based on information provided in the message.

3. The system according to claim 1 wherein the contention control logic is associated with the first node, the at least one intermediate node and the second node.

4. The system according to claim 3 wherein:

if the contention control logic determines at the first node that the message does not have priority over the second message, the first node is caused to store the message in a queue for subsequent processing;

if the contention control logic determines at the at least one intermediate node that the message does not have priority over the second message, the at least one intermediate node is caused to generate and transmit a first reject message to the first node; and if the contention control logic determines at the second node that the message does not have priority over the second message, the second node is caused to generate and transmit a second reject message to the first node.

5. The system according to claim 1 wherein upon receiving the acknowledgment message, the at least one intermediate node and the first node are ready to carry the signals re-routed from the affected optical path via the protection path using the reserved wavelength.

6. The system according to claim 5 wherein upon receiving the acknowledgment message and prior to the at least one intermediate node and the first node become ready to carry the signals re-routed from the affected optical path, the at least one intermediate node and the first node each check to determine whether the message is still valid.

7. The system according to claim 1 wherein the message includes a message type field, a first node ID field, a second node ID field, a wavelength ID field, and a failure type field.

8. The system according to claim 7 wherein the message further includes a priority field.

9. The system according to claim 1 wherein the optical network is a bi-directional path switched ring network.

10. The system according to claim 1 wherein the condition is caused by a failure relating to the affected optical path.

11. The system according to claim 1 wherein the condition is caused by network maintenance to be performed on the affected optical path.

12. A system for re-routing signals from an affected optical path, comprising:

a first node configured to generate a message upon detecting a condition indicating that the signals from the affected optical path need to be re-routed via a protection path to the first node;

first contention control logic associated with the first node and configured to, upon generation of the message by the first node, determine whether a wavelength in the protection path is available, wherein the wavelength corresponds to the signals from the affected optical path so as to allow the signals from the affected optical path to be re-routed via the protection path, and wherein if it is determined that the wavelength is available, the first contention control logic causes the first node to reserve the wavelength and forward the message, and if it is determined that the wavelength is not available, the first contention control logic causes the first node to store the message in a queue for subsequent processing;

at least one intermediate node configured to receive the message;

intermediate contention control logic associated with the at least one intermediate node and configured to determine whether the wavelength is available, wherein if it is determined that the wavelength is available, the intermediate contention control logic causes the at least one intermediate node to reserve the wavelength and forward the message, and if it is determined that the wavelength is not available, the intermediate contention control logic causes the at least one intermediate node to generate and transmit a first reject message to the first node; and a second node configured to receive the message from the at least one intermediate node; and second contention control logic associated with the second node and configured to, upon receiving the message, determine whether the wavelength is available, wherein if it is determined that the wavelength is available, the second contention control logic causes the second node to reserve the wavelength and generate an acknowledgment message to be transmitted to the first node via the at least one intermediate node, and if it is determined that the wavelength is not available, the second contention control logic causes the second node to generate and transmit a second reject message to the first node;

wherein:

upon transmitting the acknowledgment message, the second node is ready to re-route the signals from the affected optical path to the protection path using the wavelength; and upon receiving the acknowledgment message, the at least one intermediate node and the first node each check to determine whether the message is still valid and, if the message is still valid, the at least one intermediate node and the first become ready to carry the signals re-routed from the affected optical path via the protection path using the wavelength.

13. The system according to claim 12 wherein the message includes a message type field, a first node ID field, a second node ID field, a wavelength ID field, and a failure type field.

14. The system according to claim 13 wherein the message further includes a priority field.

15. The system according to claim 12 wherein the optical network is a bi-directional path switched ring network.

16. The system according to claim 12 wherein the condition is caused by a failure relating to the affected optical path.

17. The system according to claim 12 wherein the condition is caused by network maintenance to be performed on the affected optical path.

18. An optical network, comprising:
a destination node configured to receive signals transmitted via an optical path, and generate a message upon detecting a condition indicating that the signals transmitted via the optical path need to be re-routed via a protection path, the destination node is further configured to, upon generating the message, reserve a wavelength in the protection path, wherein the wavelength corresponds to the signals so as to allow the signals to be re-routed from the optical path to the protection path;
one or more intermediate nodes each configured to receive and transmit the message and reserve the wavelength in the protection path based on information provided in the message;
a source node configured to transmit the signals via the optical path and, upon receiving the message from an intermediate node, reserve the wavelength in the protection path so as to allow the signals to be re-routed from the optical path to the protection path and generate an acknowledgment message to be transmitted to the destination node via the one or more intermediate nodes,
wherein the message includes a priority field, a message type field, a first node ID field, a second node ID field, a wavelength ID field, and a failure type field.

19. The optical network according to claim 18 further comprising:
contention control logic configured to resolve priority between the message and a second message with respect to reserving the wavelength in the protection path.

20. The optical network according to claim 19 wherein the contention control logic is associated with the destination node, the one or more intermediate nodes and the source node.

21. The optical network according to claim 18 wherein:
upon transmitting the acknowledgment message, the source node is ready to re-route the signals from the optical path to the protection path using the reserved wavelength; and
upon receiving the acknowledgment message, the one or more intermediate nodes and the destination node are ready to carry the signals re-routed from the optical path via the protection path using the reserved wavelength.

22. The optical network according to claim 21 wherein upon receiving the acknowledgment message and prior to the one or more intermediate nodes and the destination node become ready to carry the signals re-routed from the optical path, the one or more intermediate nodes and the destination node each check to determine whether the message is still valid.

23. The optical network according to claim 18 wherein the optical network is a bi-directional path switched ring network.

24. The optical network according to claim 18 wherein the condition is caused by a failure relating to the optical path.

25. The optical network according to claim 18 wherein the condition is caused by network maintenance to be performed on the optical path.

26. A node for use in an optical network, comprising: first control logic configured to:
detect a condition indicating that signals from a first optical path to the node need to be re-routed via a first protection path in order to reach the node;
upon detecting the condition, generate a message;
upon generating the message, reserve a first wavelength in the first protection path, wherein the first wavelength corresponds to the signals from the first optical path so as to allow the signals from the first optical path to be re-routed via the first protection path; and
forward the message to a first neighboring node; and
second control logic configured to:
receive an incoming message from a second neighboring node;
examine the incoming message and reserve a second wavelength in a second protection path, wherein the second wavelength corresponds to signals from a second optical path so as to allow the signals from the second optical path to be re-routed via the second protection path; and
if the signals from the second optical path are originated from the node, generate and transmit an acknowledgment message to the second neighboring node, and if the signals from the second optical path are not originated from the node, forward the incoming message to an adjacent node; and
contention control logic configured to resolve contention arising out of reservation of the first wavelength and the second wavelength respectively.

27. The node according to claim 26 wherein the optical network is a bi-directional path switched ring network.

28. The node according to claim 26 wherein the condition is caused by a failure relating to the first optical path.

29. The node according to claim 26 wherein the condition is caused by network maintenance to be performed on the first optical path.

30. A method for re-routing signals from an affected optical path in an optical network, comprising:
detecting a condition at a destination node that is to receive the signals, the condition indicating that the signals need to be re-routed via a protection path in order to reach the destination node;
generating a message that includes information relating to the signals;
directing the destination node to reserve a wavelength in the protection path, wherein the wavelength corresponds to the signals so as to allow the signals to be re-routed via the protection path;
forwarding the message via one or more intermediate nodes to a source node that originates the signals;
directing each intermediate node which receives the message to reserve the wavelength in the protection path;
upon receiving the message at the source node, directing the source node to reserve the wavelength in the protection path and generate and transmit an acknowledgment message to the destination node via the one or more intermediate nodes, and
resolving priority between the message and a second message with respect to reserving the wavelength in the protection path.

31. The method according to claim 30 further comprising:
upon receiving the acknowledgment message, direction the one or more intermediate nodes and the destination node to check whether the message remains valid.

32. The method according to claim 30 wherein the optical network is a bi-directional path switched ring network.

33. The method according to claim 30 wherein the condition is caused by a failure relating to the affected optical path.

34. The method according to claim 30 wherein the condition is caused by network maintenance to be performed on the affected optical path.

* * * * *